(12) United States Patent
Tran et al.

(10) Patent No.: US 12,442,046 B1
(45) Date of Patent: Oct. 14, 2025

(54) METHOD FOR IDENTIFYING A SHARED NEOANTIGEN-REACTIVE T CELL RECEPTOR

(71) Applicant: Le Son Tran, Ho Chi Minh (VN)

(72) Inventors: Le Son Tran, Ho Chi Minh (VN); Bui Que Tran Nguyen, Ho Chi Minh (VN); Thi Phuong Diem Tran, Ho Chi Minh (VN); Thi Mong Quynh Pham, Ho Chi Minh (VN); Hoai Nghia Nguyen, Ho Chi Minh (VN); Hoa Giang, Ho Chi Minh (VN); Minh Duy Phan, Brisbane (AU)

(73) Assignee: NEXCALIBUR THERAPEUTICS, CORP., Lewes, DE (US)

( * ) Notice: Subject to any disclaimer, the term of this patent is extended or adjusted under 35 U.S.C. 154(b) by 0 days.

(21) Appl. No.: 19/059,303

(22) Filed: Feb. 21, 2025

(51) Int. Cl.
*C12Q 1/6886* (2018.01)
*C07K 14/725* (2006.01)
*G01N 33/50* (2006.01)

(52) U.S. Cl.
CPC ........ *C12Q 1/6886* (2013.01); *C07K 14/7051* (2013.01); *G01N 33/505* (2013.01); *C12Q 2600/156* (2013.01); *C12Q 2600/158* (2013.01); *G01N 2333/7051* (2013.01)

(58) Field of Classification Search
CPC .................................................... C12Q 1/6886
USPC ......................................................... 435/7.23
See application file for complete search history.

*Primary Examiner* — Sean E Aeder

(57) ABSTRACT

A method for identifying a shared neoantigen-reactive T cell receptor comprising steps performed in the following specific order: (A) collecting and processing sample of a subject with a cancer; (B) obtaining a shared neoantigen by filtered the mutation sequences based on a collection of 67 off-the-shelf peptides; (C) synthesizing a long peptide corresponding to a panel of shared neoantigen and its corresponding of wild type peptides; (D) stimulating the PBMCs with the long synthetic peptides to obtain a stimulated PBMC; (E) screening the stimulated PBMC based on response of T cells is measured by interferon-γ secretion to mutant peptides and wild type peptides; (F) isolating a neoantigen-specific T cell from the screened stimulated PBMC to identify a clonotype-purified cell; (G) identifying a TCR candidate for shared neoantigen; and (H) evaluating antigenic specificity of the TCR candidate for shared neoantigen to identify a shared neoantigen-reactive TCR.

16 Claims, 27 Drawing Sheets

Specification includes a Sequence Listing.

| Cell Statistics | | |
|---|---|---|
| Physical library ID | Estimated number of cells | Mean reads per cell |
| gex | 14,087 | 16,893 |

| Sequencing Metrics | | | | | | |
|---|---|---|---|---|---|---|
| Fastq ID | Number of reads | Number of short reads skipped | Q30 barcodes | Q30 UMI | Q30 RNA read | Q30 RNA read 2 |
| 6-ZNC3548GEX | 237.968.757 | 23,813 | 96.5% | 96.3% | 92.2% | 86.2% |

| Mapping Metrics (Amongst All Reads in Library) | | | | | | | | |
|---|---|---|---|---|---|---|---|---|
| Physical library ID | Number of reads in the library | Mapped to genome | Confidently mapped to genome | Confidently mapped to transcriptome | Confidently mapped to intronic regions | Confidently mapped to exonic regions | Confidently mapped to intergenic regions | Confidently mapped antisense |
| gex | 237.968.757 | 73.74% | 63.69% | 48.21% | 7.05% | 52.23% | 4.42% | 10.65% |

| Metrics Per Physical Library | | | | | | |
|---|---|---|---|---|---|---|
| Physical library ID | Number of reads | Valid barcodes | Valid UMIs | Sequencing saturation | Confidently mapped reads in cell | Mean reads per cell |
| gex | 237.968.757 | 87.81% | 99.81% | 45.64% | 51.21% | 16.893 |

FIG. 8A

| Cell Statistics | | |
|---|---|---|
| Physical library ID | Estimated number of cells | Mean reads per cell |
| vcj_t | 5.973 | 6,961 |

| Enrichment | | | |
|---|---|---|---|
| Physical library ID | Reads mapped to any V(D)J gene | Reads mapped to TRA | Reads mapped to TRB |
| vcj_t | 14.99% | 5.80% | 91.7% |

| Sequencing Metrics | | | | | | |
|---|---|---|---|---|---|---|
| Fastq ID | Number of reads | Number of short reads skipped | Q30 barcodes | Q30 UMI | Q30 RNA read | Q30 RNA read 2 |
| 2-ZNC3548TCR | 41.575.073 | 25.935 | 96.5% | 96.4% | 92.5% | 91.7% |

| Metrics Per Physical Library | | | | | |
|---|---|---|---|---|---|
| Physical library ID | Number of reads | Valid barcodes | Mean reads per cell | Mean used reads per cell | Fraction reads in cell |
| vcj_t | 41.575.073 | 82.22% | 6.961 | 209 | 18.00% |

FIG. 8B

| Cell Statistics | | | |
|---|---|---|---|
| Physical library ID | | Estimated number of cells | Mean reads per cell |
| gex | | 7,738 | 28,802 |

| Sequencing Metrics | | | | | | | |
|---|---|---|---|---|---|---|---|
| | Fastq ID | Number of reads | Number of short reads skipped | Q30 barcodes | Q30 UMI | Q30 RNA read | Q30 RNA read 2 |
| | 6-ZNL4901GEX | 222.867.454 | 3.048 | 97.5% | 97.2% | 93.3% | 92.2% |

| Mapping Metrics (Amongst All Reads in Library) | | | | | | | | |
|---|---|---|---|---|---|---|---|---|
| Physical library ID | Number of reads in the library | Mapped to genome | Confidently mapped to genome | Confidently mapped to transcriptome | Confidently mapped to intronic regions | Confidently mapped to exonic regions | Confidently mapped to intergenic regions | Confidently mapped antisense |
| gex | 222.867.454 | 93.64% | 84.73% | 62.41% | 9.25% | 69.97% | 5.51% | 16.36% |

| Metrics Per Physical Library | | | | | | |
|---|---|---|---|---|---|---|
| Physical library ID | Number of reads | Valid barcodes | Valid UMIs | Sequencing saturation | Confidently mapped reads in cell | Mean reads per cell |
| gex | 222.867.454 | 85.34% | 99.95% | 43.75% | 94.25% | 28.802 |

FIG. 10A

| Cell Statistics | | |
|---|---|---|
| Physical library ID | Estimated number of cells | Mean reads per cell |
| vcj_t | 5.220 | 7.866 |

| Enrichment | | | |
|---|---|---|---|
| Physical library ID | Reads mapped to any V(D)J gene | Reads mapped to TRA | Reads mapped to TRB |
| vcj_t | 74.94% | 27.55% | 46.61% |

| Sequencing Metrics | | | | | | |
|---|---|---|---|---|---|---|
| Fastq ID | Number of reads | Number of short reads skipped | Q30 barcodes | Q30 UMI | Q30 RNA read | Q30 RNA read 2 |
| 2-ZNL4901TCR | 41.061.320 | 18.474 | 97.3% | 97.0% | 93.6% | 93.4% |

| Metrics Per Physical Library | | | | | |
|---|---|---|---|---|---|
| Physical library ID | Number of reads | Valid barcodes | Mean reads per cell | Mean used reads per cell | Fraction reads in cell |
| vcj_t | 41.061.320 | 82.22% | 7.866 | 4.103 | 74.76% |

FIG. 10B

SEQUENCE LISTING

```
Sequence total quantity: 164
SEQ ID NO: 1            moltype = AA  length = 25
FEATURE                 Location/Qualifiers
source                  1..25
                        mol_type = protein
                        organism = Homo sapiens
SEQUENCE: 1
MTEYKLVVVG AGDVGKSALT IQLIQ                                              25

SEQ ID NO: 2            moltype = AA  length = 24
FEATURE                 Location/Qualifiers
source                  1..24
                        mol_type = protein
                        organism = Homo sapiens
SEQUENCE: 2
MTEYKLVVVG AVGVGKSALT IQLI                                               24
```

-continued

```
SEQ ID NO: 3              moltype = AA   length = 24
FEATURE                   Location/Qualifiers
source                    1..24
                          mol_type = protein
                          organism = Homo sapiens
SEQUENCE: 3
MTEYKLVVVG AAGVGKSALT IQLI                                              24

SEQ ID NO: 4              moltype = AA   length = 24
FEATURE                   Location/Qualifiers
source                    1..24
                          mol_type = protein
                          organism = Homo sapiens
SEQUENCE: 4
MTEYKLVVVG ADGVGKSALT IQLI                                              24

SEQ ID NO: 5              moltype = AA   length = 24
FEATURE                   Location/Qualifiers
source                    1..24
                          mol_type = protein
                          organism = Homo sapiens
SEQUENCE: 5
MTEYKLVVVG ACGVGKSALT IQLI                                              24

SEQ ID NO: 6              moltype = AA   length = 13
FEATURE                   Location/Qualifiers
source                    1..13
                          mol_type = protein
                          organism = Homo sapiens
SEQUENCE: 6
GSVPGVLGPT GGC                                                          13

SEQ ID NO: 7              moltype = AA   length = 25
FEATURE                   Location/Qualifiers
source                    1..25
                          mol_type = protein
                          organism = Homo sapiens
SEQUENCE: 7
ARHPQRKRRG VPPSPPLALG PRMQL                                             25

SEQ ID NO: 8              moltype = AA   length = 25
FEATURE                   Location/Qualifiers
source                    1..25
                          mol_type = protein
                          organism = Homo sapiens
SEQUENCE: 8
FEVRVCACPG RDWRTEEENL RKKGE                                             25

SEQ ID NO: 9              moltype = AA   length = 25
FEATURE                   Location/Qualifiers
source                    1..25
                          mol_type = protein
                          organism = Homo sapiens
SEQUENCE: 9
SGNLLGRNSF EVHVCACPGR DRRTE                                             25

SEQ ID NO: 10             moltype = AA   length = 25
FEATURE                   Location/Qualifiers
source                    1..25
                          mol_type = protein
                          organism = Homo sapiens
SEQUENCE: 10
YMCNSSCMGG MNQRPILTII TLEDS                                             25

SEQ ID NO: 11             moltype = AA   length = 25
FEATURE                   Location/Qualifiers
source                    1..25
                          mol_type = protein
                          organism = Homo sapiens
SEQUENCE: 11
YKQSQHMTEV VRHCPHHERC SDSDG                                             25

SEQ ID NO: 12             moltype = AA   length = 25
FEATURE                   Location/Qualifiers
source                    1..25
                          mol_type = protein
                          organism = Homo sapiens
SEQUENCE: 12
```

```
DYVPSDQDLL RCHVLTSGIF ETKFQ                                            25

SEQ ID NO: 13              moltype = AA   length = 25
FEATURE                    Location/Qualifiers
source                     1..25
                           mol_type = protein
                           organism = Homo sapiens
SEQUENCE: 13
AISTRDPLSE ITKQEKDFLW SHRHY                                            25

SEQ ID NO: 14              moltype = AA   length = 25
FEATURE                    Location/Qualifiers
source                     1..25
                           mol_type = protein
                           organism = Homo sapiens
SEQUENCE: 14
LTVKIGDFGL ATEKSRWSGS HQFEQ                                            25

SEQ ID NO: 15              moltype = AA   length = 25
FEATURE                    Location/Qualifiers
source                     1..25
                           mol_type = protein
                           organism = Homo sapiens
SEQUENCE: 15
WCKPCRRKKK CVCYIQGEGS CLSPP                                            25

SEQ ID NO: 16              moltype = AA   length = 20
FEATURE                    Location/Qualifiers
source                     1..20
                           mol_type = protein
                           organism = Homo sapiens
SEQUENCE: 16
SEWQLEEAQV FWAKRSRVLP                                                  20

SEQ ID NO: 17              moltype = AA   length = 25
FEATURE                    Location/Qualifiers
source                     1..25
                           mol_type = protein
                           organism = Homo sapiens
SEQUENCE: 17
EPVLQDMEDP RRVASSLTID KLLLE                                            25

SEQ ID NO: 18              moltype = AA   length = 24
FEATURE                    Location/Qualifiers
source                     1..24
                           mol_type = protein
                           organism = Homo sapiens
SEQUENCE: 18
MTEYKLVVVG ASGVGKSALT IQLI                                             24

SEQ ID NO: 19              moltype = AA   length = 25
FEATURE                    Location/Qualifiers
source                     1..25
                           mol_type = protein
                           organism = Homo sapiens
SEQUENCE: 19
RDPKIPKSKR QKRSVCSYAG SWGTA                                            25

SEQ ID NO: 20              moltype = AA   length = 25
FEATURE                    Location/Qualifiers
source                     1..25
                           mol_type = protein
                           organism = Homo sapiens
SEQUENCE: 20
VCACPGRDRR TEKENLRKKG EPHHE                                            25

SEQ ID NO: 21              moltype = AA   length = 25
FEATURE                    Location/Qualifiers
source                     1..25
                           mol_type = protein
                           organism = Homo sapiens
SEQUENCE: 21
DRNTFRHSVV VPCEPPEVGS DCTTI                                            25

SEQ ID NO: 22              moltype = AA   length = 25
FEATURE                    Location/Qualifiers
source                     1..25
                           mol_type = protein
                           organism = Homo sapiens
```

```
SEQUENCE: 22
KQSQHMTEVV RRFPHHERCS DSDGL                                              25

SEQ ID NO: 23           moltype = AA  length = 25
FEATURE                 Location/Qualifiers
source                  1..25
                        mol_type = protein
                        organism = Homo sapiens
SEQUENCE: 23
VDSTPPPGTR VRPMAIYKQS QHMTE                                              25

SEQ ID NO: 24           moltype = AA  length = 25
FEATURE                 Location/Qualifiers
source                  1..25
                        mol_type = protein
                        organism = Homo sapiens
SEQUENCE: 24
LWVDSTPPPG TRFRAMAIYK QSQHM                                              25

SEQ ID NO: 25           moltype = AA  length = 25
FEATURE                 Location/Qualifiers
source                  1..25
                        mol_type = protein
                        organism = Homo sapiens
SEQUENCE: 25
AGGITQVQYI LPMLPQQLQV APAPA                                              25

SEQ ID NO: 26           moltype = AA  length = 18
FEATURE                 Location/Qualifiers
source                  1..18
                        mol_type = protein
                        organism = Homo sapiens
SEQUENCE: 26
SLPTASLTPA FFHRHPSY                                                      18

SEQ ID NO: 27           moltype = AA  length = 25
FEATURE                 Location/Qualifiers
source                  1..25
                        mol_type = protein
                        organism = Homo sapiens
SEQUENCE: 27
KEIGGLTQVN KNKNGGNLQP TSMWA                                              25

SEQ ID NO: 28           moltype = AA  length = 25
FEATURE                 Location/Qualifiers
source                  1..25
                        mol_type = protein
                        organism = Homo sapiens
SEQUENCE: 28
SKASVQTQPA IKKMQVLSKT HMNLF                                              25

SEQ ID NO: 29           moltype = AA  length = 25
FEATURE                 Location/Qualifiers
source                  1..25
                        mol_type = protein
                        organism = Homo sapiens
SEQUENCE: 29
SALRIKILCA TYGNVNIRDI DKIYV                                              25

SEQ ID NO: 30           moltype = AA  length = 25
FEATURE                 Location/Qualifiers
source                  1..25
                        mol_type = protein
                        organism = Homo sapiens
SEQUENCE: 30
QLKAISTRDP LSKITEQEKD FLWSH                                              25

SEQ ID NO: 31           moltype = AA  length = 25
FEATURE                 Location/Qualifiers
source                  1..25
                        mol_type = protein
                        organism = Homo sapiens
SEQUENCE: 31
AQRSSIDNEN LVSEREGAFR GAGST                                              25

SEQ ID NO: 32           moltype = AA  length = 25
FEATURE                 Location/Qualifiers
source                  1..25
                        mol_type = protein
```

```
                                    organism = Homo sapiens
SEQUENCE: 32
NKVPVVQHPH HVHPSRLLSR TAMNT                                               25

SEQ ID NO: 33           moltype = AA  length = 25
FEATURE                 Location/Qualifiers
source                  1..25
                        mol_type = protein
                        organism = Homo sapiens
SEQUENCE: 33
DSKQGKYLNW DAVLDFYRNI FRKKQ                                               25

SEQ ID NO: 34           moltype = AA  length = 22
FEATURE                 Location/Qualifiers
source                  1..22
                        mol_type = protein
                        organism = Homo sapiens
SEQUENCE: 34
EGGPPAQAPP PPSSHPRPLP AG                                                  22

SEQ ID NO: 35           moltype = AA  length = 25
FEATURE                 Location/Qualifiers
source                  1..25
                        mol_type = protein
                        organism = Homo sapiens
SEQUENCE: 35
LKQLKQRAAA IPPSRSPKSM SPPGR                                               25

SEQ ID NO: 36           moltype = AA  length = 25
FEATURE                 Location/Qualifiers
source                  1..25
                        mol_type = protein
                        organism = Homo sapiens
SEQUENCE: 36
ARSYGIPFIE TSTKTRQGVD DAFYT                                               25

SEQ ID NO: 37           moltype = AA  length = 20
FEATURE                 Location/Qualifiers
source                  1..20
                        mol_type = protein
                        organism = Homo sapiens
SEQUENCE: 37
SGIEPVLKNV EDQKTLVFPK                                                     20

SEQ ID NO: 38           moltype = AA  length = 25
FEATURE                 Location/Qualifiers
source                  1..25
                        mol_type = protein
                        organism = Homo sapiens
SEQUENCE: 38
SKPVKKEKEQ RTCHLLTDLP LPPEL                                               25

SEQ ID NO: 39           moltype = AA  length = 25
FEATURE                 Location/Qualifiers
source                  1..25
                        mol_type = protein
                        organism = Homo sapiens
SEQUENCE: 39
SGNLLGRNSF EVCVCACPGR DRRTE                                               25

SEQ ID NO: 40           moltype = AA  length = 14
FEATURE                 Location/Qualifiers
source                  1..14
                        mol_type = protein
                        organism = Homo sapiens
SEQUENCE: 40
SIVHSLMCHR QGGE                                                           14

SEQ ID NO: 41           moltype = AA  length = 25
FEATURE                 Location/Qualifiers
source                  1..25
                        mol_type = protein
                        organism = Homo sapiens
SEQUENCE: 41
TVDGYVDPSG GDHFCLGQLS NVHRT                                               25

SEQ ID NO: 42           moltype = AA  length = 25
FEATURE                 Location/Qualifiers
source                  1..25
```

```
                        mol_type = protein
                        organism = Homo sapiens
SEQUENCE: 42
GLVNTLLAND PTFLRKNLSI QRYAV                                         25

SEQ ID NO: 43           moltype = AA   length = 25
FEATURE                 Location/Qualifiers
source                  1..25
                        mol_type = protein
                        organism = Homo sapiens
SEQUENCE: 43
TPEWIKFCRQ LFGGSQCYCG LERFF                                         25

SEQ ID NO: 44           moltype = AA   length = 25
FEATURE                 Location/Qualifiers
source                  1..25
                        mol_type = protein
                        organism = Homo sapiens
SEQUENCE: 44
YMQRNPQMPQ YSSPPARLSL ISASA                                         25

SEQ ID NO: 45           moltype = AA   length = 25
FEATURE                 Location/Qualifiers
source                  1..25
                        mol_type = protein
                        organism = Homo sapiens
SEQUENCE: 45
EFDSGLLHWR IGGGTPLSIS RPTSR                                         25

SEQ ID NO: 46           moltype = AA   length = 25
FEATURE                 Location/Qualifiers
source                  1..25
                        mol_type = protein
                        organism = Homo sapiens
SEQUENCE: 46
HCHREAATTA IGGGVARVEV AAGPP                                         25

SEQ ID NO: 47           moltype = AA   length = 25
FEATURE                 Location/Qualifiers
source                  1..25
                        mol_type = protein
                        organism = Homo sapiens
SEQUENCE: 47
DYVPSDQDLL RCCVLTSGIF ETKFQ                                         25

SEQ ID NO: 48           moltype = AA   length = 25
FEATURE                 Location/Qualifiers
source                  1..25
                        mol_type = protein
                        organism = Homo sapiens
SEQUENCE: 48
PPALPVTSSS FFCCPKPILE FTNWG                                         25

SEQ ID NO: 49           moltype = AA   length = 25
FEATURE                 Location/Qualifiers
source                  1..25
                        mol_type = protein
                        organism = Homo sapiens
SEQUENCE: 49
SMPKPKKGLK GFLAVSAVTG RARSL                                         25

SEQ ID NO: 50           moltype = AA   length = 25
FEATURE                 Location/Qualifiers
source                  1..25
                        mol_type = protein
                        organism = Homo sapiens
SEQUENCE: 50
QLSTHTHVVD ITHTSPAAKS PSAQL                                         25

SEQ ID NO: 51           moltype = AA   length = 25
FEATURE                 Location/Qualifiers
source                  1..25
                        mol_type = protein
                        organism = Homo sapiens
SEQUENCE: 51
EAEREEFFDE TRQLCDLRLF QPFLK                                         25

SEQ ID NO: 52           moltype = AA   length = 25
FEATURE                 Location/Qualifiers
```

```
source                  1..25
                        mol_type = protein
                        organism = Homo sapiens
SEQUENCE: 52
NVNIRDIDKI YVQTGIYHGG EPLCD                                              25

SEQ ID NO: 53           moltype = AA   length = 25
FEATURE                 Location/Qualifiers
source                  1..25
                        mol_type = protein
                        organism = Homo sapiens
SEQUENCE: 53
AISTRDPLSE ITAQEKDFLW SHRHY                                              25

SEQ ID NO: 54           moltype = AA   length = 25
FEATURE                 Location/Qualifiers
source                  1..25
                        mol_type = protein
                        organism = Homo sapiens
SEQUENCE: 54
QDFLIVISKG AQKCTKTREF ERFQE                                              25

SEQ ID NO: 55           moltype = AA   length = 15
FEATURE                 Location/Qualifiers
source                  1..15
                        mol_type = protein
                        organism = Homo sapiens
SEQUENCE: 55
MDVAPDRATG RPWLP                                                         15

SEQ ID NO: 56           moltype = AA   length = 25
FEATURE                 Location/Qualifiers
source                  1..25
                        mol_type = protein
                        organism = Homo sapiens
SEQUENCE: 56
TGNCIHTLTG HQLLTSGMEL KDNIL                                              25

SEQ ID NO: 57           moltype = AA   length = 25
FEATURE                 Location/Qualifiers
source                  1..25
                        mol_type = protein
                        organism = Homo sapiens
SEQUENCE: 57
CIHTLYGHTS TVHCMHLHEK RVVSG                                              25

SEQ ID NO: 58           moltype = AA   length = 25
FEATURE                 Location/Qualifiers
source                  1..25
                        mol_type = protein
                        organism = Homo sapiens
SEQUENCE: 58
IVEDDDSAII PCHTTDPETP VTLHN                                              25

SEQ ID NO: 59           moltype = AA   length = 13
FEATURE                 Location/Qualifiers
source                  1..13
                        mol_type = protein
                        organism = Homo sapiens
SEQUENCE: 59
IASSVQSEPC SGM                                                           13

SEQ ID NO: 60           moltype = AA   length = 25
FEATURE                 Location/Qualifiers
source                  1..25
                        mol_type = protein
                        organism = Homo sapiens
SEQUENCE: 60
AQTKREVPKN KAPTAEKRVD LSKLQ                                              25

SEQ ID NO: 61           moltype = AA   length = 14
FEATURE                 Location/Qualifiers
source                  1..14
                        mol_type = protein
                        organism = Homo sapiens
SEQUENCE: 61
ICVKVGEKSL TCKK                                                          14

SEQ ID NO: 62           moltype = AA   length = 13
```

```
FEATURE                 Location/Qualifiers
source                  1..13
                        mol_type = protein
                        organism = Homo sapiens
SEQUENCE: 62
APPSKGPTVR TKK                                                          13

SEQ ID NO: 63           moltype = AA  length = 25
FEATURE                 Location/Qualifiers
source                  1..25
                        mol_type = protein
                        organism = Homo sapiens
SEQUENCE: 63
IFLHEDLTVK IGNFGLATVK SRWSG                                             25

SEQ ID NO: 64           moltype = AA  length = 25
FEATURE                 Location/Qualifiers
source                  1..25
                        mol_type = protein
                        organism = Homo sapiens
SEQUENCE: 64
ITVGQRIGSG SFVTVYKGKW HGDVA                                             25

SEQ ID NO: 65           moltype = AA  length = 25
FEATURE                 Location/Qualifiers
source                  1..25
                        mol_type = protein
                        organism = Homo sapiens
SEQUENCE: 65
KTPQHVKITD FGRAKLLGAE EKEYH                                             25

SEQ ID NO: 66           moltype = AA  length = 25
FEATURE                 Location/Qualifiers
source                  1..25
                        mol_type = protein
                        organism = Homo sapiens
SEQUENCE: 66
AQSDGQSPSK KQKKREKRQA VNMMC                                             25

SEQ ID NO: 67           moltype = AA  length = 25
FEATURE                 Location/Qualifiers
source                  1..25
                        mol_type = protein
                        organism = Homo sapiens
SEQUENCE: 67
LEPPRFAQLA LECVLQDWNA LKSMI                                             25

SEQ ID NO: 68           moltype = AA  length = 25
FEATURE                 Location/Qualifiers
source                  1..25
                        mol_type = protein
                        organism = Homo sapiens
SEQUENCE: 68
MTEYKLVVVG AGGVGKSALT IQLIQ                                             25

SEQ ID NO: 69           moltype = AA  length = 24
FEATURE                 Location/Qualifiers
source                  1..24
                        mol_type = protein
                        organism = Homo sapiens
SEQUENCE: 69
MTEYKLVVVG AGGVGKSALT IQLI                                              24

SEQ ID NO: 70           moltype = AA  length = 24
FEATURE                 Location/Qualifiers
source                  1..24
                        mol_type = protein
                        organism = Homo sapiens
SEQUENCE: 70
MTEYKLVVVG AGGVGKSALT IQLI                                              24

SEQ ID NO: 71           moltype = AA  length = 24
FEATURE                 Location/Qualifiers
source                  1..24
                        mol_type = protein
                        organism = Homo sapiens
SEQUENCE: 71
MTEYKLVVVG AGGVGKSALT IQLI                                              24
```

-continued

```
SEQ ID NO: 72          moltype = AA   length = 24
FEATURE                Location/Qualifiers
source                 1..24
                       mol_type = protein
                       organism = Homo sapiens
SEQUENCE: 72
MTEYKLVVVG AGGVGKSALT IQLI                                             24

SEQ ID NO: 73          moltype = AA   length = 20
FEATURE                Location/Qualifiers
source                 1..20
                       mol_type = protein
                       organism = Homo sapiens
SEQUENCE: 73
GSVPGVLGPT GGVLNPTVTQ                                                  20

SEQ ID NO: 74          moltype = AA   length = 24
FEATURE                Location/Qualifiers
source                 1..24
                       mol_type = protein
                       organism = Homo sapiens
SEQUENCE: 74
LSARHPQRRR GGPSEPTPGS RPQD                                             24

SEQ ID NO: 75          moltype = AA   length = 25
FEATURE                Location/Qualifiers
source                 1..25
                       mol_type = protein
                       organism = Homo sapiens
SEQUENCE: 75
FEVRVCACPG RDRRTEEENL RKKGE                                            25

SEQ ID NO: 76          moltype = AA   length = 25
FEATURE                Location/Qualifiers
source                 1..25
                       mol_type = protein
                       organism = Homo sapiens
SEQUENCE: 76
SGNLLGRNSF EVRVCACPGR DRRTE                                            25

SEQ ID NO: 77          moltype = AA   length = 25
FEATURE                Location/Qualifiers
source                 1..25
                       mol_type = protein
                       organism = Homo sapiens
SEQUENCE: 77
YMCNSSCMGG MNRRPILTII TLEDS                                            25

SEQ ID NO: 78          moltype = AA   length = 25
FEATURE                Location/Qualifiers
source                 1..25
                       mol_type = protein
                       organism = Homo sapiens
SEQUENCE: 78
YKQSQHMTEV VRRCPHHERC SDSDG                                            25

SEQ ID NO: 79          moltype = AA   length = 25
FEATURE                Location/Qualifiers
source                 1..25
                       mol_type = protein
                       organism = Homo sapiens
SEQUENCE: 79
DYVPSDQDLL RCRVLTSGIF ETKFQ                                            25

SEQ ID NO: 80          moltype = AA   length = 25
FEATURE                Location/Qualifiers
source                 1..25
                       mol_type = protein
                       organism = Homo sapiens
SEQUENCE: 80
AISTRDPLSE ITEQEKDFLW SHRHY                                            25

SEQ ID NO: 81          moltype = AA   length = 25
FEATURE                Location/Qualifiers
source                 1..25
                       mol_type = protein
                       organism = Homo sapiens
SEQUENCE: 81
LTVKIGDFGL ATVKSRWSGS HQFEQ                                            25
```

```
SEQ ID NO: 82            moltype = AA   length = 25
FEATURE                  Location/Qualifiers
source                   1..25
                         mol_type = protein
                         organism = Homo sapiens
SEQUENCE: 82
WCKPCRRKKK CVRYIQGEGS CLSPP                                               25

SEQ ID NO: 83            moltype = AA   length = 25
FEATURE                  Location/Qualifiers
source                   1..25
                         mol_type = protein
                         organism = Homo sapiens
SEQUENCE: 83
SEWQLEEAQV FWAKKEQSLA LSILK                                               25

SEQ ID NO: 84            moltype = AA   length = 25
FEATURE                  Location/Qualifiers
source                   1..25
                         mol_type = protein
                         organism = Homo sapiens
SEQUENCE: 84
EPVLQDMEDP RRAASSLTID KLLLE                                               25

SEQ ID NO: 85            moltype = AA   length = 24
FEATURE                  Location/Qualifiers
source                   1..24
                         mol_type = protein
                         organism = Homo sapiens
SEQUENCE: 85
MTEYKLVVVG AGGVGKSALT IQLI                                                24

SEQ ID NO: 86            moltype = AA   length = 25
FEATURE                  Location/Qualifiers
source                   1..25
                         mol_type = protein
                         organism = Homo sapiens
SEQUENCE: 86
RDPKIPKSKR QKKERMLLCR QLGDS                                               25

SEQ ID NO: 87            moltype = AA   length = 25
FEATURE                  Location/Qualifiers
source                   1..25
                         mol_type = protein
                         organism = Homo sapiens
SEQUENCE: 87
VCACPGRDRR TEEENLRKKG EPHHE                                               25

SEQ ID NO: 88            moltype = AA   length = 25
FEATURE                  Location/Qualifiers
source                   1..25
                         mol_type = protein
                         organism = Homo sapiens
SEQUENCE: 88
DRNTFRHSVV VPYEPPEVGS DCTTI                                               25

SEQ ID NO: 89            moltype = AA   length = 25
FEATURE                  Location/Qualifiers
source                   1..25
                         mol_type = protein
                         organism = Homo sapiens
SEQUENCE: 89
KQSQHMTEVV RRCPHHERCS DSDGL                                               25

SEQ ID NO: 90            moltype = AA   length = 25
FEATURE                  Location/Qualifiers
source                   1..25
                         mol_type = protein
                         organism = Homo sapiens
SEQUENCE: 90
VDSTPPPGTR VRAMAIYKQS QHMTE                                               25

SEQ ID NO: 91            moltype = AA   length = 25
FEATURE                  Location/Qualifiers
source                   1..25
                         mol_type = protein
                         organism = Homo sapiens
SEQUENCE: 91
```

```
LWVDSTPPPG TRVRAMAIYK QSQHM                                          25

SEQ ID NO: 92           moltype = AA  length = 25
FEATURE                 Location/Qualifiers
source                  1..25
                        mol_type = protein
                        organism = Homo sapiens
SEQUENCE: 92
AGGITQVQYI LPTLPQQLQV APAPA                                          25

SEQ ID NO: 93           moltype = AA  length = 25
FEATURE                 Location/Qualifiers
source                  1..25
                        mol_type = protein
                        organism = Homo sapiens
SEQUENCE: 93
SLPTASLTPA FFSQTPIILT PSPLL                                          25

SEQ ID NO: 94           moltype = AA  length = 25
FEATURE                 Location/Qualifiers
source                  1..25
                        mol_type = protein
                        organism = Homo sapiens
SEQUENCE: 94
KEIGGLTQVN KNKKWRELAT NLNVG                                          25

SEQ ID NO: 95           moltype = AA  length = 25
FEATURE                 Location/Qualifiers
source                  1..25
                        mol_type = protein
                        organism = Homo sapiens
SEQUENCE: 95
SKASVQTQPA IKKDASAQQD SYEFV                                          25

SEQ ID NO: 96           moltype = AA  length = 25
FEATURE                 Location/Qualifiers
source                  1..25
                        mol_type = protein
                        organism = Homo sapiens
SEQUENCE: 96
SALRIKILCA TYVNVNIRDI DKIYV                                          25

SEQ ID NO: 97           moltype = AA  length = 25
FEATURE                 Location/Qualifiers
source                  1..25
                        mol_type = protein
                        organism = Homo sapiens
SEQUENCE: 97
QLKAISTRDP LSEITEQEKD FLWSH                                          25

SEQ ID NO: 98           moltype = AA  length = 25
FEATURE                 Location/Qualifiers
source                  1..25
                        mol_type = protein
                        organism = Homo sapiens
SEQUENCE: 98
AQRSSIDNEN LVSERERVLL EELEA                                          25

SEQ ID NO: 99           moltype = AA  length = 25
FEATURE                 Location/Qualifiers
source                  1..25
                        mol_type = protein
                        organism = Homo sapiens
SEQUENCE: 99
NKVPVVQHPH HVHPLTPLIT YSNEH                                          25

SEQ ID NO: 100          moltype = AA  length = 25
FEATURE                 Location/Qualifiers
source                  1..25
                        mol_type = protein
                        organism = Homo sapiens
SEQUENCE: 100
DSKQGKYLNW DAVFRFLQKY IQKET                                          25

SEQ ID NO: 101          moltype = AA  length = 25
FEATURE                 Location/Qualifiers
source                  1..25
                        mol_type = protein
                        organism = Homo sapiens
```

```
SEQUENCE: 101
EGGPPAQAPP PPQQPPTAPP SGLKK                                          25

SEQ ID NO: 102          moltype = AA  length = 25
FEATURE                 Location/Qualifiers
source                  1..25
                        mol_type = protein
                        organism = Homo sapiens
SEQUENCE: 102
LKQLKQRAAA IPPIQVTKVH EPPRE                                          25

SEQ ID NO: 103          moltype = AA  length = 25
FEATURE                 Location/Qualifiers
source                  1..25
                        mol_type = protein
                        organism = Homo sapiens
SEQUENCE: 103
ARSYGIPFIE TSAKTRQGVD DAFYT                                          25

SEQ ID NO: 104          moltype = AA  length = 25
FEATURE                 Location/Qualifiers
source                  1..25
                        mol_type = protein
                        organism = Homo sapiens
SEQUENCE: 104
SGIEPVLKNV EDQKNTSFSK VISNV                                          25

SEQ ID NO: 105          moltype = AA  length = 25
FEATURE                 Location/Qualifiers
source                  1..25
                        mol_type = protein
                        organism = Homo sapiens
SEQUENCE: 105
SKPVKKEKEQ RTRHLLTDLP LPPEL                                          25

SEQ ID NO: 106          moltype = AA  length = 25
FEATURE                 Location/Qualifiers
source                  1..25
                        mol_type = protein
                        organism = Homo sapiens
SEQUENCE: 106
SGNLLGRNSF EVRVCACPGR DRRTE                                          25

SEQ ID NO: 107          moltype = AA  length = 25
FEATURE                 Location/Qualifiers
source                  1..25
                        mol_type = protein
                        organism = Homo sapiens
SEQUENCE: 107
SIVHSLMCHR QGGESETFAK RAIES                                          25

SEQ ID NO: 108          moltype = AA  length = 25
FEATURE                 Location/Qualifiers
source                  1..25
                        mol_type = protein
                        organism = Homo sapiens
SEQUENCE: 108
TVDGYVDPSG GDRFCLGQLS NVHRT                                          25

SEQ ID NO: 109          moltype = AA  length = 25
FEATURE                 Location/Qualifiers
source                  1..25
                        mol_type = protein
                        organism = Homo sapiens
SEQUENCE: 109
GLVNTLLAND PTSLRKNLSI QRYAV                                          25

SEQ ID NO: 110          moltype = AA  length = 25
FEATURE                 Location/Qualifiers
source                  1..25
                        mol_type = protein
                        organism = Homo sapiens
SEQUENCE: 110
TPEWIKFCRQ LFGGFSMLLW IGAIL                                          25

SEQ ID NO: 111          moltype = AA  length = 25
FEATURE                 Location/Qualifiers
source                  1..25
                        mol_type = protein
```

```
                              organism = Homo sapiens
SEQUENCE: 111
YMQRNPQMPQ YSSPQPGSAL SPRQP                                              25

SEQ ID NO: 112           moltype = AA  length = 25
FEATURE                  Location/Qualifiers
source                   1..25
                         mol_type = protein
                         organism = Homo sapiens
SEQUENCE: 112
EFDSGLLHWR IGGGDTTEHI QTHFE                                              25

SEQ ID NO: 113           moltype = AA  length = 25
FEATURE                  Location/Qualifiers
source                   1..25
                         mol_type = protein
                         organism = Homo sapiens
SEQUENCE: 113
HCHREAATTA IGGGGGPGGG GGGAT                                              25

SEQ ID NO: 114           moltype = AA  length = 25
FEATURE                  Location/Qualifiers
source                   1..25
                         mol_type = protein
                         organism = Homo sapiens
SEQUENCE: 114
DYVPSDQDLL RCRVLTSGIF ETKFQ                                              25

SEQ ID NO: 115           moltype = AA  length = 25
FEATURE                  Location/Qualifiers
source                   1..25
                         mol_type = protein
                         organism = Homo sapiens
SEQUENCE: 115
PPALPVTSSS FFAAPNPYWN SPTGG                                              25

SEQ ID NO: 116           moltype = AA  length = 25
FEATURE                  Location/Qualifiers
source                   1..25
                         mol_type = protein
                         organism = Homo sapiens
SEQUENCE: 116
SMPKPKKGLK GFFSSIRRHR KSKVT                                              25

SEQ ID NO: 117           moltype = AA  length = 25
FEATURE                  Location/Qualifiers
source                   1..25
                         mol_type = protein
                         organism = Homo sapiens
SEQUENCE: 117
QLSTHTHVVD ITRTSPAAKS PSAQL                                              25

SEQ ID NO: 118           moltype = AA  length = 25
FEATURE                  Location/Qualifiers
source                   1..25
                         mol_type = protein
                         organism = Homo sapiens
SEQUENCE: 118
EAEREEFFDE TRRLCDLRLF QPFLK                                              25

SEQ ID NO: 119           moltype = AA  length = 25
FEATURE                  Location/Qualifiers
source                   1..25
                         mol_type = protein
                         organism = Homo sapiens
SEQUENCE: 119
NVNIRDIDKI YVRTGIYHGG EPLCD                                              25

SEQ ID NO: 120           moltype = AA  length = 25
FEATURE                  Location/Qualifiers
source                   1..25
                         mol_type = protein
                         organism = Homo sapiens
SEQUENCE: 120
AISTRDPLSE ITEQEKDFLW SHRHY                                              25

SEQ ID NO: 121           moltype = AA  length = 25
FEATURE                  Location/Qualifiers
source                   1..25
```

```
                              mol_type = protein
                              organism = Homo sapiens
SEQUENCE: 121
QDFLIVISKG AQECTKTREF ERFQE                                          25

SEQ ID NO: 122            moltype = AA  length = 15
FEATURE                   Location/Qualifiers
source                    1..15
                          mol_type = protein
                          organism = Homo sapiens
SEQUENCE: 122
MDLAPDRATG RPWLP                                                     15

SEQ ID NO: 123            moltype = AA  length = 25
FEATURE                   Location/Qualifiers
source                    1..25
                          mol_type = protein
                          organism = Homo sapiens
SEQUENCE: 123
TGNCIHTLTG HQSLTSGMEL KDNIL                                          25

SEQ ID NO: 124            moltype = AA  length = 25
FEATURE                   Location/Qualifiers
source                    1..25
                          mol_type = protein
                          organism = Homo sapiens
SEQUENCE: 124
CIHTLYGHTS TVRCMHLHEK RVVSG                                          25

SEQ ID NO: 125            moltype = AA  length = 25
FEATURE                   Location/Qualifiers
source                    1..25
                          mol_type = protein
                          organism = Homo sapiens
SEQUENCE: 125
IVEDDDSAII PCRTTDPETP VTLHN                                          25

SEQ ID NO: 126            moltype = AA  length = 25
FEATURE                   Location/Qualifiers
source                    1..25
                          mol_type = protein
                          organism = Homo sapiens
SEQUENCE: 126
IASSVQSEPC SGMVSGIISP SDLPD                                          25

SEQ ID NO: 127            moltype = AA  length = 25
FEATURE                   Location/Qualifiers
source                    1..25
                          mol_type = protein
                          organism = Homo sapiens
SEQUENCE: 127
REVPKNKAPT AEKRESGPKQ AAVNA                                          25

SEQ ID NO: 128            moltype = AA  length = 25
FEATURE                   Location/Qualifiers
source                    1..25
                          mol_type = protein
                          organism = Homo sapiens
SEQUENCE: 128
ICVKVGEKSL TCKKIDLTTI VKPEA                                          25

SEQ ID NO: 129            moltype = AA  length = 25
FEATURE                   Location/Qualifiers
source                    1..25
                          mol_type = protein
                          organism = Homo sapiens
SEQUENCE: 129
APPSKGPTVR TKKVGKNEAV LEWDQ                                          25

SEQ ID NO: 130            moltype = AA  length = 25
FEATURE                   Location/Qualifiers
source                    1..25
                          mol_type = protein
                          organism = Homo sapiens
SEQUENCE: 130
IFLHEDLTVK IGDFGLATVK SRWSG                                          25

SEQ ID NO: 131            moltype = AA  length = 25
FEATURE                   Location/Qualifiers
```

```
source                    1..25
                          mol_type = protein
                          organism = Homo sapiens
SEQUENCE: 131
ITVGQRIGSG SFGTVYKGKW HGDVA                                          25

SEQ ID NO: 132            moltype = AA  length = 25
FEATURE                   Location/Qualifiers
source                    1..25
                          mol_type = protein
                          organism = Homo sapiens
SEQUENCE: 132
KTPQHVKITD FGLAKLLGAE EKEYH                                          25

SEQ ID NO: 133            moltype = AA  length = 25
FEATURE                   Location/Qualifiers
source                    1..25
                          mol_type = protein
                          organism = Homo sapiens
SEQUENCE: 133
AQSDGQSPSK KQKKKRKTSS SKHDV                                          25

SEQ ID NO: 134            moltype = AA  length = 25
FEATURE                   Location/Qualifiers
source                    1..25
                          mol_type = protein
                          organism = Homo sapiens
SEQUENCE: 134
LEPPRFAQLA LERVLQDWNA LKSMI                                          25

SEQ ID NO: 135            moltype = AA  length = 266
FEATURE                   Location/Qualifiers
source                    1..266
                          mol_type = protein
                          organism = Homo sapiens
SEQUENCE: 135
MAMLLGASVL ILWLQPDWVN SQQKNDDQQV KQNSPSLSVQ EGRISILNCD YTNSMFDYFL     60
WYKKYPAEGP TFLISISSIK DKNEDGRFTV FLNKSAKHLS LHIVPSQPGD SAVYFCAASD    120
NDMRFGAGTR LTVKPMSIGL LCCVAFSLLW ASPVNAGVTQ TPKFQVLKTG QSMTLQCAQD    180
MNHNSMYWYR QDPGMGLRLI YYSASEGTTD KGEVPNGYNV SRLNKREFSL RLESAAPSQT    240
SVYFCATKSS LTYEQYFGPG TRLTVT                                        266

SEQ ID NO: 136            moltype = AA  length = 268
FEATURE                   Location/Qualifiers
source                    1..268
                          mol_type = protein
                          organism = Homo sapiens
SEQUENCE: 136
MAMLLGASVL ILWLQPDWVN SQQKNDDQQV KQNSPSLSVQ EGRISILNCD YTNSMFDYFL     60
WYKKYPAEGP TFLISISSIK DKNEDGRFTV FLNKSAKHLS LHIVPSQPGD SAVYFCAASD    120
NDMRFGAGTR LTVKPMGFRL LCCVAFCLLG AGPVDSGVTQ TPKHLITATG QRVTLRCSPR    180
SGDLSVYWYQ QSLDQGLQFL IQYYNGEERA KGNILERFSA QQFPDLHSEL NLSSLELGDS    240
ALYFCASSVQ GGAQETQYFG PGTRLLVL                                      268

SEQ ID NO: 137            moltype = AA  length = 574
FEATURE                   Location/Qualifiers
source                    1..574
                          mol_type = protein
                          organism = Homo sapiens
SEQUENCE: 137
MKTFAGFSFL FLWLQLDCMS RGEDVEQSLF LSVREGDSSV INCTYTDSSS TYLYWYKQEP     60
GAGLQLLTYI FSNMDMKQDQ RLTVLLNKKD KHLSLRIADT QTGDSAIYFC AESQGSARQL    120
TFGSGTQLTV LPIQNPEPAV YQLKDPRSQD STLCLFTDFD SQINVPKTME SGTFITDKTV    180
LDMKAMDSKS NGAIAWSNQT SFTCQDIFKE TNATYPSSDV PCDATLTEKS FETDMNLNFQ    240
NLSVMGLRIL LLKVAGFNLL MTLRLWSSMG IRRLLCRVAFC FLAVGLVDVK VTQSSRYLVK    300
RTGEKVFLEC VQDMDHENMF WYRQDPGLGL RLIYFSYDVK MKEKGDIPEG YSVSREKKER    360
FSLILESAST NQTSMYLCAS RALTGNTGEL FFGEGSRLTV LEDLRNVTPP KVSLFEPSKA    420
EIANKQATL VCLARGFFPD HVELSWWVNG KEVHSGVSTD PQAYKESNYS YCLSSRLRVS     480
ATFWHNPRNH FRCQVQFHGL SEEDKWPEGS PKPVTQNISA EAWGRADCGI TSASYHQGVL    540
SATILYEILL GKATLYAVLV SGLVLMAMVK KKNS                                574

SEQ ID NO: 138            moltype = AA  length = 589
FEATURE                   Location/Qualifiers
source                    1..589
                          mol_type = protein
                          organism = Homo sapiens
SEQUENCE: 138
MDKILGASFL VLWLQLCWVS GQQKEKSDQQ QVKQSPQSLI VQKGGIPIIN CAYENTAFDY     60
FPWYQQFPGK GPALLIAIRP DVSEKKEGRF TISFNKSAKQ FSLHIMDSQP GDSATYFCAA    120
```

```
SSGAGSYQLT  FGKGTKLSVI  PIQNPEPAVY  QLKDPRSQDS  TLCLFTDFDS  QINVPKTMES   180
GTFITDKTVL  DMKAMDSKSN  GAIAWSNQTS  FTCQDIFKET  NATYPSSDVP  CDATLTEKSF   240
ETDMNLNFQN  LSVMGLRILL  LKVAGFNLLM  TLRLWSSMGP  QLLGYVVLCL  LGAGPLEAQV   300
TQNPRYLITV  TGKKLTVTCS  QNMNHEYMSW  YRQDPGLGLR  QIYYSMNVEV  TDKGDVPEGY   360
KVSRKEKRNF  PLILESPSPN  QTSLYFCASS  PKISFTGTGK  LNTEAFFGQG  TRLTVVEDLR   420
NVTPPKVSLF  EPSKAEIANK  QKATLVCLAR  GFFPDHVELS  WWVNGKEVHS  GVSTDPQAYK   480
ESNYSYCLSS  RLRVSATFWH  NPRNHFRCQV  QFHGLSEEDK  WPEGSPKPVT  QNISAEAWGR   540
ADCGITSASY  HQGVLSATIL  YEILLGKATL  YAVLVSGLVL  MAMVKKKNS                589

SEQ ID NO: 139              moltype = AA   length = 576
FEATURE                     Location/Qualifiers
source                      1..576
                            mol_type = protein
                            organism = Homo sapiens
SEQUENCE: 139
MLLELIPLLG  IHFVLRTARA  QSVTQPDIHI  TVSEGASLEL  RCNYSYGATP  YLFWYVQSPG    60
QGLQLLLKYF  SGDTLVQGIK  GFEAEFKRSQ  SSFNLRKPSV  HWSDAAEYFC  AVGALYGNKL   120
VFGAGTILRV  KSIQNPEPAV  YQLKDPRSQD  STLCLFTDFD  SQINVPKTME  SGTFITDKTV   180
LDMKAMDSKS  NGAIAWSNQT  SFTCQDIFKE  TNATYPSSDV  PCDATLTEKS  FETDMNLNFQ   240
NLSVMGLRIL  LLKVAGFNLL  MTLRLWSSMS  LGLLCCGAFS  LLWAGPVNAG  VTQTPKFRVL   300
KTGQSMTLLC  AQDMNHEYMY  WYRQDPGMGL  RLIHYSVGEG  TTAKGEVPDG  YNVSRLKKQN   360
FLLGLESAAP  SQTSVYFCAS  SYDDRGSSNG  ELFFGEGSRL  TVLEDLRNVT  PPKVSLFEPS   420
KAEIANKQKA  TLVCLARGFF  PDHVELSWWV  NGKEVHSGVS  TDPQAYKESN  YSYCLSSRLR   480
VSATFWHNPR  NHFRCQVQFH  GLSEEDKWPE  GSPKPVTQNI  SAEAWGRADC  GITSASYHQG   540
VLSATILYEI  LLGKATLYAV  LVSGLVLMAM  VKKKNS                               576

SEQ ID NO: 140              moltype = AA   length = 589
FEATURE                     Location/Qualifiers
source                      1..589
                            mol_type = protein
                            organism = Homo sapiens
SEQUENCE: 140
MAFWLRSLGL  HFRPHLGRRM  ESFLGGVLLI  LWLQVDWVKS  QKIEQNSEAL  NIQEGKTATL    60
TCNYTNYSPA  YLQWYRQDPG  RGPVFLLLIR  ENEKEKRKER  LKVTFDTTLK  QSLFHITASQ   120
PADSATYLCA  LFSTSGTYKY  IFGTGTRLKV  LAIQNPEPAV  YQLKDPRSQD  STLCLFTDFD   180
SQINVPKTME  SGTFITDKTV  LDMKAMDSKS  NGAIAWSNQT  SFTCQDIFKE  TNATYPSSDV   240
PCDATLTEKS  FETDMNLNFQ  NLSVMGLRIL  LLKVAGFNLL  MTLRLWSSML  CSLLALLLGT   300
FFGVRSQTIH  QWPATLVQPV  GSPLSLECTV  EGTSNPNLYW  YRQAAGRGLQ  LLFYSVGIGQ   360
ISSEVPQNLS  ASRPDRQFI  LSSKKLLLSD  SGFYLCAWSG  DNYEQYFGPG  TRLTVTEDLR   420
NVTPPKVSLF  EPSKAEIANK  QKATLVCLAR  GFFPDHVELS  WWVNGKEVHS  GVSTDPQAYK   480
ESNYSYCLSS  RLRVSATFWH  NPRNHFRCQV  QFHGLSEEDK  WPEGSPKPVT  QNISAEAWGR   540
ADCGITSASY  HQGVLSATIL  YEILLGKATL  YAVLVSGLVL  MAMVKKKNS                589

SEQ ID NO: 141              moltype = AA   length = 579
FEATURE                     Location/Qualifiers
source                      1..579
                            mol_type = protein
                            organism = Homo sapiens
SEQUENCE: 141
MASAPISMLA  MLFTLSGLRA  QSVAQPEDQV  NVAEGNPLTV  KCTYSVSGNP  YLFWYVQYPN    60
RGLQFLLKYI  TGDNLVKGSY  GFEAEFNKSQ  TSFHLKKPSA  LVSDSALYFC  AVSIRLMNTG   120
FQKLVFGTGT  RLLVSPIQNP  EPAVYQLKDP  RSQDSTLCLF  TDFDSQINVP  KTMESGTFIT   180
DKTVLDMKAM  DSKSNGAIAW  SNQTSFTCQD  IFKETNATYP  SSDVPCDATL  TEKSFETDMN   240
LNFQNLSVMG  LRILLLKVAG  FNLLMTLRLW  SSMGCRLLCC  AVLCLLGAVP  METGVTQTPR   300
HLVMGMTNKK  SLKCEQHLGH  NAMYWYKQSA  KKPLELMFVY  NFKEQTENNS  VPSRFSPECP   360
NSSHLFLHLH  TLQPEDSALY  LCASSEGAPN  SIDEAFFGQG  TRLTVVEDLR  NVTPPKVSLF   420
EPSKAEIANK  QKATLVCLAR  GFFPDHVELS  WWVNGKEVHS  GVSTDPQAYK  ESNYSYCLSS   480
RLRVSATFWH  NPRNHFRCQV  QFHGLSEEDK  WPEGSPKPVT  QNISAEAWGR  ADCGITSASY   540
HQGVLSATIL  YEILLGKATL  YAVLVSGLVL  MAMVKKKNS                            579

SEQ ID NO: 142              moltype = AA   length = 573
FEATURE                     Location/Qualifiers
source                      1..573
                            mol_type = protein
                            organism = Homo sapiens
SEQUENCE: 142
MALQSTLGAV  WLGLLLNSLW  KVAESKDQVF  QPSTVASSEG  AVVEIFCNHS  VSNAYNFFWY    60
LHFPGCAPRL  LVKGSKPSQQ  GRYNMTYERF  SSSLLILQVR  EADAAVYYCA  VEDRNRDDKI   120
IFGKGTRLHI  LPIQNPEPAV  YQLKDPRSQD  STLCLFTDFD  SQINVPKTME  SGTFITDKTV   180
LDMKAMDSKS  NGAIAWSNQT  SFTCQDIFKE  TNATYPSSDV  PCDATLTEKS  FETDMNLNFQ   240
NLSVMGLRIL  LLKVAGFNLL  MTLRLWSSMG  SRLLCWVLLC  LLGAGPVKAG  VTQTPRYLIK   300
TRGQQVTLSC  SPISGHRSVS  WYQQTPGQGL  QFLFEYFSET  QRNKGNFPGR  FSGRQFSNSR   360
SEMNVSTLEL  GDSALYLCAS  SLRTASKVAF  FGQGTRLTVV  EDLRNVTPPK  VSLFEPSKAE   420
IANKQKATLV  CLARGFFPDH  VELSWWVNGK  EVHSGVSTDP  QAYKESNYSY  CLSSRLRVSA   480
TFWHNPRNHF  RCQVQFHGLS  EEDKWPEGSP  KPVTQNISAE  AWGRADCGIT  SASYHQGVLS   540
ATILYEILLG  KATLYAVLVS  GLVLMAMVKK  KNS                                  573

SEQ ID NO: 143              moltype = AA   length = 135
FEATURE                     Location/Qualifiers
```

```
                        source          1..135
                                        mol_type = protein
                                        organism = Homo sapiens
SEQUENCE: 143
MAMLLGASVL ILWLQPDWVN SQQKNDDQQV KQNSPSLSVQ EGRISILNCD YTNSMFDYFL    60
WYKKYPAEGP TFLISISSIK DKNEDGRFTV FLNKSAKHLS LHIVPSQPGD SAVYFCAASD   120
NDMRFGAGTR LTVKP                                                    135

SEQ ID NO: 144          moltype = AA   length = 131
FEATURE                 Location/Qualifiers
source                  1..131
                        mol_type = protein
                        organism = Homo sapiens
SEQUENCE: 144
MSIGLLCCVA FSLLWASPVN AGVTQTPKFQ VLKTGQSMTL QCAQDMNHNS MYWYRQDPGM    60
GLRLIYYSAS EGTTDKGEVP NGYNVSRLNK REFSLRLESA APSQTSVYFC ATKSSLTYEQ   120
YFGPGTRLTV T                                                        131

SEQ ID NO: 145          moltype = AA   length = 135
FEATURE                 Location/Qualifiers
source                  1..135
                        mol_type = protein
                        organism = Homo sapiens
SEQUENCE: 145
MAMLLGASVL ILWLQPDWVN SQQKNDDQQV KQNSPSLSVQ EGRISILNCD YTNSMFDYFL    60
WYKKYPAEGP TFLISISSIK DKNEDGRFTV FLNKSAKHLS LHIVPSQPGD SAVYFCAASD   120
NDMRFGAGTR LTVKP                                                    135

SEQ ID NO: 146          moltype = AA   length = 133
FEATURE                 Location/Qualifiers
source                  1..133
                        mol_type = protein
                        organism = Homo sapiens
SEQUENCE: 146
MGFRLLCCVA FCLLGAGPVD SGVTQTPKHL ITATGQRVTL RCSPRSGDLS VYWYQQSLDQ    60
GLQFLIQYYN GEERAKGNIL ERFSAQQFPD LHSELNLSSL ELGDSALYFC ASSVQGGAQE   120
TQYFGPGTRL LVL                                                      133

SEQ ID NO: 147          moltype = AA   length = 268
FEATURE                 Location/Qualifiers
source                  1..268
                        mol_type = protein
                        organism = Homo sapiens
SEQUENCE: 147
MKTFAGFSFL FLWLQLDCMS RGEDVEQSLF LSVREGDSSV INCTYTDSSS TYLYWYKQEP    60
GAGLQLLTYI FSNMDMKQDQ RLTVLLNKKD KHLSLRIADT QTGDSAIYFC AESQGSARQL   120
TFGSGTQLTV LPIQNPEPAV YQLKDPRSQD STLCLFTDFD SQINVPKTME SGTFITDKTV   180
LDMKAMDSKS NGAIAWSNQT SFTCQDIFKE TNATYPSSDV PCDATLTEKS FETDMNLNFQ   240
NLSVMGLRIL LLKVAGFNLL MTLRLWSS                                      268

SEQ ID NO: 148          moltype = AA   length = 306
FEATURE                 Location/Qualifiers
source                  1..306
                        mol_type = protein
                        organism = Homo sapiens
SEQUENCE: 148
MGIRLLCRVA FCFLAVGLVD VKVTQSSRYL VKRTGEKVFL ECVQDMDHEN MFWYRQDPGL    60
GLRLIYFSYD VKMKEKGDIP EGYSVSREKK ERFSLILESA STNQTSMYLC ASRALTGNTG   120
ELFFGEGSRL TVLEDLRNVT PPKVSLFEPS KAEIANKQKA TLVCLARGFF PDHVELSWWV   180
NGKEVHSGVS TDPQAYKESN YSYCLSSRLR VSATFWHNPR NHFRCQVQFH GLSEEDKWPE   240
GSPKPVTQNI SAEAWGRADC GITSASYHQG VLSATILYEI LLGKATLYAV LVSGLVLMAM   300
VKKKNS                                                              306

SEQ ID NO: 149          moltype = AA   length = 277
FEATURE                 Location/Qualifiers
source                  1..277
                        mol_type = protein
                        organism = Homo sapiens
SEQUENCE: 149
MDKILGASFL VLWLQLCWVS GQQKEKSDQQ QVKQSPQSLI VQKGGIPIIN CAYENTAFDY    60
FPWYQQFPGK GPALLIAIRP DVSEKKEGRF TISFNKSAKQ FSLHIMDSQP GDSATYFCAA   120
SSGAGSYQLT FGKGTKLSVI PIQNPEPAVY QLKDPRSQDS TLCLFTDFDS QINVPKTMES   180
GTFITDKTVL DMKAMDSKSN GAIAWSNQTS FTCQDIFKET NATYPSSDVP CDATLTEKSF   240
ETDMNLNFQN LSVMGLRILL LKVAGFNLLM TLRLWSS                            277

SEQ ID NO: 150          moltype = AA   length = 312
FEATURE                 Location/Qualifiers
source                  1..312
                        mol_type = protein
```

```
                            organism = Homo sapiens
SEQUENCE: 150
MGPQLLGYVV  LCLLGAGPLE  AQVTQNPRYL  ITVTGKKLTV  TCSQNMNHEY  MSWYRQDPGL    60
GLRQIYYSMN  VEVTDKGDVP  EGYKVSRKEK  RNFPLILESP  SPNQTSLYFC  ASSPKISFTG   120
TGKLNTEAFF  GQGTRLTVVE  DLRNVTPPKV  SLFEPSKAEI  ANKQKATLVC  LARGFFPDHV   180
ELSWWVNGKE  VHSGVSTDPQ  AYKESNYSYC  LSSRLRVSAT  FWHNPRNHFR  CQVQFHGLSE   240
EDKWPEGSPK  PVTQNISAEA  WGRADCGITS  ASYHQGVLSA  TILYEILLGK  ATLYAVLVSG   300
LVLMAMVKKK  NS                                                          312

SEQ ID NO: 151         moltype = AA   length = 268
FEATURE                Location/Qualifiers
source                 1..268
                       mol_type = protein
                       organism = Homo sapiens
SEQUENCE: 151
MLLELIPLLG  IHFVLRTARA  QSVTQPDIHI  TVSEGASLEL  RCNYSYGATP  YLFWYVQSPG    60
QGLQLLLKYF  SGDTLVQGIK  GFEAEFKRSQ  SSFNLRKPSV  HWSDAAEYFC  AVGALYGNKL   120
VFGAGTILRV  KSIQNPEPAV  YQLKDPRSQD  STLCLFTDFD  SQINVPKTME  SGTFITDKTV   180
LDMKAMDSKS  NGAIAWSNQT  SFTCQDIFKE  TNATYPSSDV  PCDATLTEKS  FETDMNLNFQ   240
NLSVMGLRIL  LLKVAGFNLL  MTLRLWSS                                        268

SEQ ID NO: 152         moltype = AA   length = 308
FEATURE                Location/Qualifiers
source                 1..308
                       mol_type = protein
                       organism = Homo sapiens
SEQUENCE: 152
MSLGLLCCGA  FSLLWAGPVN  AGVTQTPKFR  VLKTGQSMTL  LCAQDMNHEY  MYWYRQDPGM    60
GLRLIHYSVG  EGTTAKGEVP  DGYNVSRLKK  QNFLLGLESA  APSQTSVYFC  ASSYDDRGSS   120
NGELFFGEGS  RLTVLEDLRN  VTPPKVSLFE  PSKAEIANKQ  KATLVCLARG  FFPDHVELSW   180
WVNGKEVHSG  VSTDPQAYKE  SNYSYCLSSR  LRVSATFWHN  PRNHFRCQVQ  FHGLSEEDKW   240
PEGSPKPVTQ  NISAEAWGRA  DCGITSASYH  QGVLSATILY  EILLGKATLY  AVLVSGLVLM   300
AMVKKNS                                                                 308

SEQ ID NO: 153         moltype = AA   length = 288
FEATURE                Location/Qualifiers
source                 1..288
                       mol_type = protein
                       organism = Homo sapiens
SEQUENCE: 153
MAFWLRSLGL  HFRPHLGRRM  ESFLGGVLLI  LWLQVDWVKS  QKIEQNSEAL  NIQEGKTATL    60
TCNYTNYSPA  YLQWYRQDPG  RGPVFLLLIR  ENEKEKRKER  LKVTFDTTLK  QSLFHITASQ   120
PADSATYLCA  LFSTSGTYKY  IFGTGTRLKV  LAIQNPEPAV  YQLKDPRSQD  STLCLFTDFD   180
SQINVPKTME  SGTFITDKTV  LDMKAMDSKS  NGAIAWSNQT  SFTCQDIFKE  TNATYPSSDV   240
PCDATLTEKS  FETDMNLNFQ  NLSVMGLRIL  LLKVAGFNLL  MTLRLWSS                 288

SEQ ID NO: 154         moltype = AA   length = 301
FEATURE                Location/Qualifiers
source                 1..301
                       mol_type = protein
                       organism = Homo sapiens
SEQUENCE: 154
MLCSLLALLL  GTFFGVRSQT  IHQWPATLVQ  PVGSPLSLEC  TVEGTSNPNL  YWYRQAAGRG    60
LQLLLFYSVGI  GQISSEVPQN  LSASRPQDRQ  FILSSKKLLL  SDSGFYLCAW  SGDNYEQYFG   120
PGTRLTVTED  LRNVTPPKVS  LFEPSKAEIA  NKQKATLVCL  ARGFFPDHVE  LSWWVNGKEV   180
HSGVSTDPQA  YKESNYSYCL  SSRLRVSATF  WHNPRNHFRC  QVQFHGLSEE  DKWPEGSPKP   240
VTQNISAEAW  GRADCGITSA  SYHQGVLSAT  ILYEILLGKA  TLYAVLVSGL  VLMAMVKKKN   300
S                                                                       301

SEQ ID NO: 155         moltype = AA   length = 272
FEATURE                Location/Qualifiers
source                 1..272
                       mol_type = protein
                       organism = Homo sapiens
SEQUENCE: 155
MASAPISMLA  MLFTLSGLRA  QSVAQPEDQV  NVAEGNPLTV  KCTYSVSGNP  YLFWYVQYPN    60
RGLQFLLKYI  TGDNLVKGSY  GFEAEFNKSQ  TSFHLKKPSA  LVSDSALYFC  AVSIRLMNTG   120
FQKLVFGTGT  RLLVSPIQNP  EPAVYQLKDP  RSQDSTLCLF  TDFDSQINVP  KTMESGTFIT   180
DKTVLDMKAM  DSKSNGAIAW  SNQTSFTCQD  IFKETNATYP  SSDVPCDATL  TEKSFETDMN   240
LNFQNLSVMG  LRILLLKVAG  FNLLMTLRLW  SS                                  272

SEQ ID NO: 156         moltype = AA   length = 307
FEATURE                Location/Qualifiers
source                 1..307
                       mol_type = protein
                       organism = Homo sapiens
SEQUENCE: 156
MGCRLLCCAV  LCLLGAVPME  TGVTQTPRHL  VMGMTNKKSL  KCEQHLGHNA  MYWYKQSAKK    60
PLELMFVYNF  KEQTENNSVP  SRFSPECPNS  SHLFLHLHTL  QPEDSALYLC  ASSEGAPNSI   120
```

```
DEAFFGQGTR LTVVEDLRNV TPPKVSLFEP SKAEIANKQK ATLVCLARGF FPDHVELSWW      180
VNGKEVHSGV STDPQAYKES NYSYCLSSRL RVSATFWHNP RNHFRCQVQF HGLSEEDKWP      240
EGSPKPVTQN ISAEAWGRAD CGITSASYHQ GVLSATILYE ILLGKATLYA VLVSGLVLMA      300
MVKKNS                                                                 307

SEQ ID NO: 157          moltype = AA   length = 268
FEATURE                 Location/Qualifiers
source                  1..268
                        mol_type = protein
                        organism = Homo sapiens
SEQUENCE: 157
MALQSTLGAV WLGLLLNSLW KVAESKDQVF QPSTVASSEG AVVEIFCNHS VSNAYNFFWY       60
LHFPGCAPRL LVKGSKPSQQ GRYNMTYERF SSSLLILQVR EADAAVYYCA VEDRNRDDKI      120
IFGKGTRLHI LPIQNPEPAV YQLKDPRSQD STLCLFTDFD SQINVPKTME SGTFITDKTV      180
LDMKAMDSKS NGAIAWSNQT SFTCQDIFKE TNATYPSSDV PCDATLTEKS FETDMNLNFQ      240
NLSVMGLRIL LLKVAGFNLL MTLRLWSS                                         268

SEQ ID NO: 158          moltype = AA   length = 305
FEATURE                 Location/Qualifiers
source                  1..305
                        mol_type = protein
                        organism = Homo sapiens
SEQUENCE: 158
MGSRLLCWVL LCLLGAGPVK AGVTQTPRYL IKTRGQQVTL SCSPISGHRS VSWYQQTPGQ       60
GLQFLFEYFS ETQRNKGNFP GRFSGRQFSN SRSEMNVSTL ELGDSALYLC ASSLRTASKV      120
AFFGQGTRLT VVEDLRNVTP PKVSLFEPSK AEIANKQKAT LVCLARGFFP DHVELSWWVN      180
GKEVHSGVST DPQAYKESNY SYCLSSRLRV SATFWHNPRN HFRCQVQFHG LSEEDKWPEG      240
SPKPVTQNIS AEAWGRADCG ITSASYHQGV LSATILYEIL LGKATLYAVL VSGLVLMAMV      300
KKKNS                                                                  305

SEQ ID NO: 159          moltype = AA   length = 10
FEATURE                 Location/Qualifiers
source                  1..10
                        mol_type = protein
                        organism = Homo sapiens
SEQUENCE: 159
EVRVCACPGR                                                              10

SEQ ID NO: 160          moltype = AA   length = 10
FEATURE                 Location/Qualifiers
source                  1..10
                        mol_type = protein
                        organism = Homo sapiens
SEQUENCE: 160
EVHVCACPGR                                                              10

SEQ ID NO: 161          moltype = AA   length = 11
FEATURE                 Location/Qualifiers
source                  1..11
                        mol_type = protein
                        organism = Homo sapiens
SEQUENCE: 161
VRVCACPGRD R                                                            11

SEQ ID NO: 162          moltype = AA   length = 11
FEATURE                 Location/Qualifiers
source                  1..11
                        mol_type = protein
                        organism = Homo sapiens
SEQUENCE: 162
VHVCACPGRD R                                                            11

SEQ ID NO: 163          moltype = AA   length = 11
FEATURE                 Location/Qualifiers
source                  1..11
                        mol_type = protein
                        organism = Homo sapiens
SEQUENCE: 163
RVCACPGRDR R                                                            11

SEQ ID NO: 164          moltype = AA   length = 11
FEATURE                 Location/Qualifiers
source                  1..11
                        mol_type = protein
                        organism = Homo sapiens
SEQUENCE: 164
HVCACPGRDR R                                                            11
```

METHOD FOR IDENTIFYING A SHARED NEOANTIGEN-REACTIVE T CELL RECEPTOR

FIELD OF THE INVENTION

The present invention relates to the field of cancer immunotherapy. In particular, this invention provides a method for identifying a shared neoantigen-reactive T cell receptor. The invention encompasses a comprehensive workflow that integrates neoantigen identification, TCR prioritization, and functional validation.

INCORPORATION BY REFERENCE OF MATERIAL SUBMITTED ELECTRONICALLY

This application contains, as a separate part of disclosure, a sequence listing in computer-readable form (filename: GENS_005_Seqlisting.xml; 151,525 bytes; created Feb. 3, 2025), which is incorporated by reference in its entirety.

BACKGROUND ART

Cancer immunotherapy has emerged as a promising approach that uses the immune system to target and destroy cancer cells. Among these strategies, therapies based on T-cell receptors (TCRs) have gained significant attention because they can recognize tumor antigens presented by major histocompatibility complex (MHC) molecules. Identifying tumor-specific TCRs and validating their ability to target cancer cells effectively is crucial for advancing personalized cancer treatments.

Neoantigens, generated from somatic mutations found only in tumor cells, are desirable targets for T-cell responses. Unlike tumor-associated antigens, which are also expressed in normal tissues and can cause off-target effects, neoantigens are tumor-specific, reducing the risk of toxicity. This makes them ideal candidates for immunotherapy. As a result, finding and characterizing TCRs that recognize neoantigens has become a key focus in developing next-generation cancer treatments.

Various studies have employed high-throughput DNA and RNA sequencing to detect tumor-specific mutations and predict neoantigen candidates. Computational tools like pVAC-Seq have been widely used to indicate the ability of these neoantigens to bind MHC molecules and trigger immune responses.

According to patent application No. WO 2024197072 A2 refers to a method for identifying a neoantigen-reactive TCR, comprising: (i) obtaining single-cell gene expression profiles from a population of tumor infiltrating lymphocytes (TIL) isolated from a patient sample; (ii) performing bioinformatics analyses on the single cell gene expression data to identify TCR clonotypes of interests; (iii) creating recombinant TCR sequences; (iv) preparing a reporter T cell comprising a TCR expression cassette encoding a TCR sequence reconstructed from paired TCR α and β chain sequences identified from the clonotype of interest in step ii; (v) preparing a tandem minigene (TMG) expression vector; (vi) analyzing the patient sequencing data to identify class I and class IIHLA alleles and preparing HLA expression vectors comprising the class IHLA and class IIHLA allele sequences; (vii) preparing an antigen presenting cell (APC) comprising transfecting the TMG expression vector and one or more HLA expression vectors into a cell wherein each transection condition comprises a TMG and one or two HLA types; (viii) co-culturing the reporter T cell in step iii with the APC of step vii; and (ix) identifying a positive reporter activity in the reporter T cell to identify a neoantigen-reactive TCR.

According to patent No. U.S. Ser. No. 11/898,207 B2 refers to a method of isolating paired T cell receptor (TCR) alpha and beta chain sequences or an antigen-binding portion thereof. Also disclosed are methods of automatically identifying the TCR alpha and beta chain V segment sequences and CDR3 sequences of a TCR having antigenic specificity for a mutated amino acid sequence encoded by a cancer-specific mutation. Methods of preparing a population of cells expressing paired TCR alpha and beta chain sequences, or an antigen-binding portion, are also disclosed. Isolated pairs of TCR alpha and beta chain sequences and isolated populations of cells prepared by the methods are also disclosed.

According to patent application No. US 20240052010 A1 refers to a method of obtaining a plurality of T cell receptors (TCRs) specifically recognizing a target tumor antigen peptide, comprising: (a) a first co-culturing step comprising co-culturing a first population of dendritic cells (DCs) loaded with the target tumor antigen peptide with a population of T cells from an individual to obtain a first co-culture; (b) an enrichment step comprising subjecting the first co-culture to an enrichment process to obtain enriched activated T cells; (c) a second co-culturing step comprising co-culturing the enriched activated T cells with a second population of DCs loaded with the target tumor antigen peptide to obtain a population of tumor antigen-specific T cells, wherein at least about 10% of the tumor antigen-specific T cells specifically responds to the target tumor antigen peptide; and (d) a sequencing step, comprising subjecting the tumor antigen-specific T cells to next-generation sequencing to identify a plurality of pairs of genes encoding TCRα and TCRβ, thereby providing the plurality of T cell receptors based on paired genes encoding TCRα and TCRβ; wherein the individual has clinically benefitted from a Multiple Antigen Specific Cell Therapy (MASCT) comprising administering to the individual an effective amount of activated T cells prepared by co-culturing a population of T cells with a population of dendritic cells loaded with a plurality of tumor antigen peptides comprising the target tumor antigen peptide.

The above inventions meet the specific purposes and requirements of a technical solution. However, existing approaches often fail to provide integrated workflows seamlessly combining neoantigen discovery, TCR prioritization, and functional validation within a unified process. Furthermore, many current methods prioritize sequence identification while placing insufficient emphasis on functional testing.

It is necessary to create a more comprehensive workflow that combines neoantigen identification, TCR prioritization, and functional validation.

Therefore, the invention provides isolated and purified T cell receptors (TCRs) with antigenic specificity for a panel of mutated human shared neoantigen (previously identified public neoantigen).

Furthermore, further embodiments of the invention provide a strategy for priming shared neoantigen-specific TCRs, isolating TCRs, and identifying neoantigen-specific TCRs.

Finally, still further embodiments of the invention provide related polypeptides and proteins, along with associated nucleic acids, recombinant expression vectors, host cells, cell populations, and pharmaceutical compositions linked to the TCRs described in the invention.

SUMMARY OF THE INVENTION

This invention provides solutions to achieve the above goals.

Accordingly, an objective of the present invention is to provide a method for identifying a shared neoantigen-reactive T cell receptor (TCR), comprising steps performed in the following specific order:
- (A) collecting and processing sample of a subject with a cancer, comprising:
  - isolating peripheral blood mononuclear cells (PBMCs) from peripheral blood sample from the subject with cancer; and
  - employing next-generation genomic and transcriptomic sequencing on this sample of tumor tissue and white blood cells, and using bioinformatic analysis to extract subject's profile including a plurality of mutation sequences and its corresponding a plurality of wild-type sequences;
- (B) obtaining a shared neoantigen by filtered the mutation sequences at step (A) based on a collection of 67 off-the-shelf peptides consists of KRAS_p.G13D, KRAS_p.G12V, KRAS_p.G12A, KRAS_p.G12D, KRAS_p.G12C, CDX2_p.V306X, RNF43_p.G659X, TP53_p.R282W, TP53_p.R273H, TP53_p.R248Q, TP53_p.R175H, GNAS_p.R201H, PIK3CA_p.E545K, BRAF_p.V640E, TCF7L2_p.R471C, ATM_p.A2301X, POU2AF1_p.A226V, KRAS_p.G12S, CHD4_p.K73X, TP53_p.E286K, TP53_p.Y220C, TP53_p.C176F, TP53_p.A159P, TP53_p.V157F, CIC_p.T1740M, ELK4_p.S359X, ARID1A_p.K1071X, BARD1_p.K171X, PIK3CA_p.V344G, PIK3CA_p.E542K, AKAP9_p.SE1650-1651 SX, TCF7L2_p.H198X, ATM_p.V60X, BCL9L_p.Q452X, NCOR2_p.P975X, KRAS_p.A146T, BRCA2_p.Q1782X, CDK12_p.R663C, TP53_p.R273C, SMAD4_p.G30X, SMAD4_p.R361H, MTOR_p.S2215F, ATP1A1_p.G98X, ARID1A_p.S764SX, ARID1A_p.G1848X, ASXL1_p.G643X, GNAS_p.R201C, ERG_p.446-447X, AMER1_p.F173X, DCTN1_p.R1173H, PIK3CA_p.R88Q, PIK3CA_p.R357Q, PIK3CA_p.E545A, PIK3CA_p.E970K, FAT4_p.L3V, FBXW7_p.S582L, FBXW7_p.R465H, PDGFRA_p.R151H, APC_p.M1413X, APC_p.KR1462-1463X, IL7R_p.K119X, IL6ST_p.K529X, BRAF_p.D634N, BRAF_p.G509V, EGFR_p.L858R, AKAP9_p.K37X, and UBR5_p.R1331C;
- (C) synthesizing a long peptide corresponding to a panel of shared neoantigen and its corresponding of wild type peptides;
- (D) stimulating the PBMCs with the long synthetic peptides to obtain a stimulated PBMC, comprising the following steps:
  - (i) thawing frozen PBMCs in AIM-V media supplemented with 10% fetal bovine serum (FBS) and 1 μg/mL deoxyribonuclease I (DNase I) solution;
  - (ii) allowing $10^5$ PBMCs to rest in 96-round bottom well-plate containing AIM-V media supplemented with 10% FBS, 10 mM N-2-hydroxyethylpiperazine-N'-2-ethanesulfonic acid (HEPES), and 50 μM β-mercaptoethanol overnight before stimulation with synthesized long peptide at a concentration of 5 μM in a humidified incubator at 37° C. with 5% $CO_2$;
  - (iii) further stimulating PBMCs with 2000 IU/mL granulocyte-macrophage colony-stimulating factor (GM-CSF) and 1000 IU/mL interleukin-4 (IL-4) for 24 hours;
  - (iv) adding 100 ng/mL LPS and 10 ng/mL IFN-γ to the PBMCs along with the peptides for an additional 12 hours; and
  - (v) restimulating PBMCs by adding 10 ng/mL interleukin-7 (IL-7), 10 ng/mL interleukin-15 (IL-15), and 10 ng/mL interleukin-21 (IL-21) to the PBMCs on the following day, in which a restimulation frequency of 3 days/time and the number of restimulations is three times;
- (E) screening the stimulated PBMC based on response of T cells is measured by interferon-γ (IFN-γ) secretion to mutant peptides and wild type peptides, which is more than twofold higher compared to its corresponding wild-type peptides;
- (F) isolating a neoantigen-specific T cell from the screened stimulated PBMC to identify a clonotype-purified cell, comprising steps (a1) to (a7):
  - (a1) determining the viability of the stimulated PBMC using a hemocytometer to ensure viability above 90%, and adjusting the cell concentration to between 700-1,200 cells per microliter to obtain a uniform PBMC suspension;
  - (a2) mixing the uniform PBMC suspension at step (a1) with a reverse transcription (RT) master mix to obtain a cell-master mix solution, then loading the cell-master mix solution onto a microfluidic device configured to partition individual cells into emulsions for unique nucleic acid barcoding, wherein the loading is performed along with barcoded 5' gel beads and partitioning oil to obtain a single-cell gel bead in emulsion (GEMs); and
  - (a3) performing cell lysis and barcoded reverse transcription of RNA within each the GEMs to obtain a barcoded complementary DNA (cDNA);
  - (a4) producing and validating cDNA of gene expression library and VDJ library, comprising:
    - recovering the barcoded cDNA from the GEMs at step (a4) to obtain a cDNA sample;
    - amplifying the cDNA sample using polymerase chain reaction (PCR) to obtain an amplified cDNA; and
    - assessing the quality of the amplified cDNA using sensitivity-based screening systems to obtain a validated cDNA;
  - (a5) constructing sequencing libraries, comprising:
    - utilizing the validated cDNA at step (a5) to prepare 5' gene expression libraries;
    - indexing each library with a sample indexing system to obtain an indexed gene expression library; and
    - sequencing the indexed gene expression library on a sequencing platform to generate at least 30,000 read pairs per cell with paired-end reads of 2×300 base pairs;
  - (a6) enriching and sequencing V(D)J regions, and RNA transcriptomic profile comprising:
    - using the libraries generated in step (a6) to amplify full-length variable (V), diversity (D), and joining (J) segments of T cell receptor (TCR) alpha and beta chains using an enrichment system to obtain an enriched TCR product;

quantifying the enriched TCR product obtained from the amplification using sensitivity-based quantification systems to produce a quantified enriched TCR product;

preparing sequencing libraries using 50 ng of the quantified enriched TCR product to produce a TCR sequencing library; and sequencing the TCR sequencing library on a sequencing platform to generate paired-end reads of 2×300 base pairs with a depth of 5,000 read pairs per cell; and (a7) performing bioinformatics analyses on the single cell gene expression data to identify the clonotype-purified cell, comprising:

retaining cells with available clonotype information; and excluding cells with mitochondrial genome-derived reads exceeding 15%, more than 7,000 detected genes, or more than two TRA (T-cell receptor alpha locus) or TRB (T-cell receptor beta locus) sequences to obtain the clonotype-purified cell;

(G) identifying a TCR candidate for shared neoantigen by performing steps (b1) to (b5):

(b1) isolating CD3+ T cells from both mutant and wild-type groups, wherein each isolated cell includes a number of genes detected values in each cell between 200 and 6000, and a mitochondrial gene expression percentage below 15%;

(b2) defining the T cell activation score based on the average expression of 10 genes associated with T cell activation for each T cell, in which the 10 genes associated consisting of interferon gamma (IFNG), interleukin 2 (IL2), tumor necrosis factor (TNF), interleukin-2 receptor alpha (IL2RA), cluster of differentiation 69 (CD69), TNF receptor superfamily member 9 (TNFRSF9), granzyme B (GZMB), granzyme A (GZMA), granzyme K (GZMK), and perforin 1 (PRF1);

(b3) normalizing the size of TCR clonotypes stimulated by mutant sequences relative to the corresponding wild-type sequences; wherein, if any TCR clonotype is stimulated only by mutant sequences and is not found in the sample stimulated by the corresponding wild-type sequences, its size is calculated by taking the smallest size of the TCR clonotype stimulated by the wild-type sequences;

(b4) calculating a ratio size of each TCR clonotype from group which is stimulated by mutant sequences compared to the corresponding wild-type sequences; and (b5) ranking the clonotypes based on their IFNG expression and T cell activation score at step (b2), and their ratio size at step (b4) to identify the TCR candidate for shared neoantigen;

(H) evaluating antigenic specificity of the TCR candidate for shared neoantigen through T cell activation bioassay using Nuclear Factor of Activated T cells (NFAT) system and using PBMCs or jurkat (JKT) del beta/CD8 to identify a shared neoantigen-reactive TCR, comprising the following steps:

(c1) co-culturing a) a reporter T cell comprising the TCR candidate for shared neoantigen expression cassette, and b) an antigen presenting cell (APC) that expresses the shared neoantigen sequence and a human leukocyte antigen (HLA) sequence extracted from subject's profile;

wherein the reporter T cell is a jurkat del beta cell; and wherein the TCR candidate for shared neoantigen expression cassette comprises a TCR candidate sequence reconstructed from TCR α and β chain sequences;

(c2) identifying a positive reporter signal in the reporter T cell to identify the neoantigen-reactive TCR; wherein the shared neoantigen-reactive TCR comprises a sequence selected from the group consisting of SEQ ID NOs:135 to 142.

Another objective of the present invention is to provide a neoantigen-reactive T cell receptor TCR comprising a sequence selected from the group consisting of SEQ ID NOs:135 to 142, wherein the shared neoantigen-reactive TCR bind to a shared neoantigen/HLA complex;

in which the shared neoantigen comprises TP53_pR273H, and TP53_p.V157F;

in which the HLA is selected from the group consisting of HLA-A1101, HLA-A0206, HLA-B5401, HLA-C0102, HLA-B0705, HLA-C1203, HLA-B1532, and HLA-C0702.

Yet another objective of the present invention is to provide a method of preparing a medicament for the treatment or prevention of a cancer, the method comprising preparing a population of cells that comprise a recombinant vector expressing the shared neoantigen-reactive T cell receptor comprising a sequence selected from the group consisting of SEQ ID NOs:135 to 142;

wherein the cancer includes lung cancer, and colorectal cancer;

wherein the shared neoantigen-reactive TCR bind to a shared neoantigen/HLA complex;

wherein the shared neoantigen comprises TP53_p.R273H, and TP53_p.V157F;

TP53_p.R273H comprises a sequence selected from the group consisting of SEQ ID NOs:9, 160, 162, 164, and 166;

TP53_p.V157F comprises a sequence selected from the group consisting of SEQ ID NOs:24, 168, 170, 172, and 174;

wherein the HLA is selected from the group consisting of HLA-A1101, HLA-A0206, HLA-B5401, HLA-C0102, HLA-B0705, HLA-C1203, HLA-B1532, and HLA-C0702.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWING

The accompanying drawings, which are incorporated in and form a part of this specification, illustrate embodiments of the invention and, together with the description, serve to explain the principles of the invention.

FIG. 8A is an image showing the quality control (QC) results for the gene expression library following sequencing. Metrics such as library size, read quality, and cell number distribution were evaluated to ensure the integrity and reliability of the sequencing data from Patient ID ZNC35;

FIG. 8B is an image showing the quality control (QC) results for the VDJ library following sequencing. Metrics such as library size, read quality, and cell number distribution were evaluated to ensure the integrity and reliability of the sequencing data from Patient ID ZNC35;

FIG. 10A is an image showing the quality control (QC) results for the gene expression library following sequencing. Metrics such as library size, read quality, and cell number distribution were evaluated to ensure the integrity and reliability of the sequencing data from Patient ID ZNL49;

FIG. 10B is an image showing the quality control (QC) results for the VDJ library following sequencing. Metrics such as library size, read quality, and cell number distribution were evaluated to ensure the integrity and reliability of the sequencing data from Patient ID ZNL49;

Figure 1:
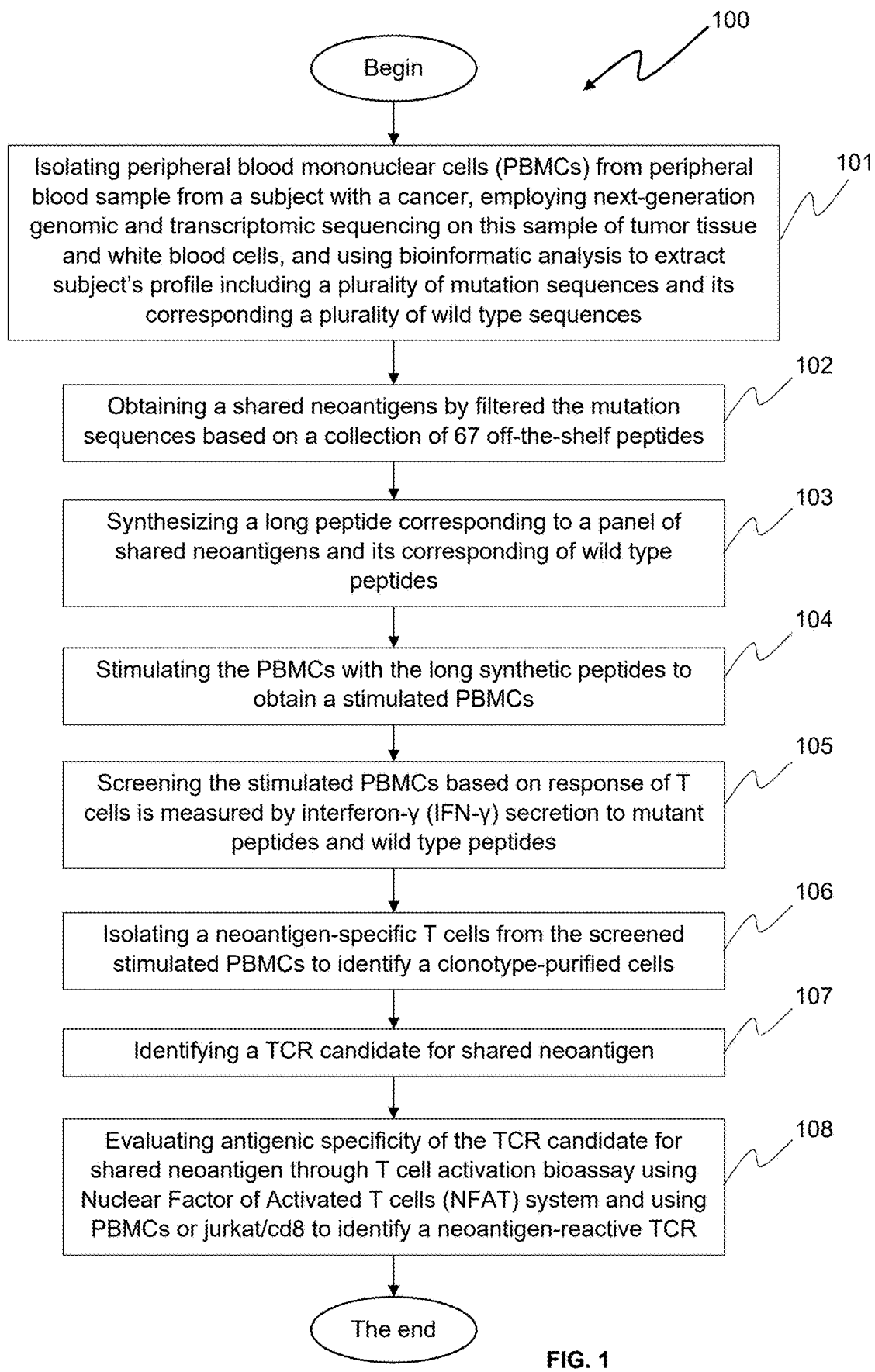
FIG. 1 is a flowchart illustrating the principle of a method for identifying the shared neoantigen-reactive TCR in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Reference will now be made in detail to the preferred embodiments of the invention, examples of which are illustrated in the accompanying drawings. While the invention will be described in conjunction with these preferred embodiments, it should be understood that they are not intended to limit the invention. On the contrary, the invention is intended to cover alternatives, modifications, and equivalents that may be included within the spirit and scope of the invention as defined by the appended claims. Furthermore, in the following detailed description of the present invention, numerous specific details are set forth to provide a thorough understanding. However, it will be obvious to one of ordinary skills in the art that the present invention may be practiced without these specific details. In other instances, well-known methods, procedures, components, and circuits have not been described in detail so as not to unnecessarily obscure aspects of the present invention.

It should be noted that the terms "comprises" and "comprising", as well as "the" and "these", are intended to cover a non-exclusive inclusion. For example, a process, method, system, product, or device that comprises a series of steps or units is not necessarily limited to those explicitly listed and may include other steps or units not explicitly mentioned or inherent to such processes, methods, products, or devices.

In the following, to facilitate the understanding of the present solution, some proper nouns appearing in the subsequent embodiments of the present application are explained.

"Subject" and "patient" refer to either a human or non-human, such as primates, mammals, and vertebrates. In particular embodiments, the subject is a human.

Within the scope of the present invention, the term "T-cell receptor (TCR)" meaning is a protein complex found on the surface of T cells, or T lymphocytes, that is responsible for recognizing fragments of antigen as peptides bound to major histocompatibility complex (MHC) molecules. The binding between TCR and antigen peptides is of relatively low affinity and is degenerate: that is, many TCRs recognize the same antigen peptide, and many antigen peptides are recognized by the same TCR.

Within the scope of the present invention, the term "human leukocyte antigen (HLA)" refers to the expression product of the Major Histocompatibility Complex (MHC) in humans.

The term "Peripheral blood mononuclear cells (PBMC)" refers to the group of mononuclear cells retrievable from a subject's blood, including T cells.

Here, the term "peptide" refers to a polypeptide composed of multiple amino acids. An immune system exists in a living organism to remove foreign materials that are not derived from the living organism itself, and particularly, there exist immunogenic peptides among exogenously derived peptides triggering responses from the immune system. Alternations in the subject's genetic materials (so-called mutations) during cancer development also provide a source of immunogenic peptides (shared neoantigen) triggering immune response against the tumor. More specifically, the shared neoantigen are eluted and presented by the subject's HLA (either HLA-1 or HLA-II), attract and trigger T cells (including CD8+ T cells and/or CD4+ T cells), thereafter lead to immune response through a complex intracellular and intercellular cascade process. The shared neoantigen contains at least one mutated amino acid, and its length depends on specific peptide-presenting HLA, usually 8-11 amino acid long for HLA-1 and 25 amino acid long for HLA-II, but is not limited thereto and may be of various lengths.

The term "mutant peptide" or "MT" refers to a peptide that comprises at least one mutated amino acid exclusively present in a tumor and not in a normal tissue.

By "wild-type" or "WT" and grammatical equivalents thereof herein is meant the typical form of an amino acid sequence or a nucleotide sequence including normal allelic variations; that is, an amino acid sequence or a nucleotide sequence that has not been modified in cancer cells.

The phrase "immunogenic neoantigens" refers to long peptide carrying shared recurrent mutations that can stimulate a T-cell response to the mutant peptide.

One embodiment of the invention is now described with reference to FIG. 1. FIG. 1 illustrated a rapid, comprehensive and sensitive method for neoantigen screening from recurrent cancer mutations 100 ("method 100") based on the above principle in accordance with an exemplary embodiment of the present invention. In particular, method 100 includes the following three steps: step 101, step 102, step 103, step 104, step 105, step 106, step 107 and step 108.

At step 101, collecting and processing sample of a subject with a cancer, comprising:

isolating peripheral blood mononuclear cells (PBMCs) from peripheral blood sample from the subject with cancer; and employing next-generation genomic and transcriptomic sequencing on this sample of tumor tissue and white blood cells, and using bioinformatic analysis to extract the subject's profile including a plurality of mutation sequences and its corresponding a plurality of wild-type sequences.

At step 102, obtaining a shared neoantigen by filtered the mutation sequences at step 101 based on a collection of 67 off-the-shelf peptides consists of KRAS_p.G13D, KRAS_p.G12V, KRAS_p.G12A, KRAS_p.G12D, KRAS_p.G12C, CDX2_p.V306X, RNF43_p.G659X, TP53_p.R282W, TP53_p.R273H, TP53_p.R248Q, TP53_p.R175H, GNAS_p.R201H, PIK3CA_p.E545K, BRAF_p.V640E, TCF7L2_p.R471C, ATM_p.A2301X, POU2AF1_p.A226V, KRAS_p.G12S, CHD4_p.K73X, TP53_p.E286K, TP53_p.Y220C, TP53_p.C176F, TP53_p.A159P, TP53_p.V157F, CIC_p.T1740M, ELK4_p.S359X, ARID1A_p.K1071X, BARD1_p.K171X, PIK3CA_p.V344G, PIK3CA_p.E542K, AKAP9_p.SE1650-1651 SX, TCF7L2_p.H198X, ATM_p.V60X, BCL9L_p.Q452X, NCOR2_p.P975X, KRAS_p.A146T, BRCA2_p.Q1782X, CDK12_p.R663C, TP53_p.R273C, SMAD4_p.G30X, SMAD4_p.R361H, MTOR_p.S2215F, ATP1A1_p.G98X, ARID1A_p.S764SX, ARID1A_p.G1848X, ASXL1_p.G643X, GNAS_p.R201C, ERG_p.446-447X, AMER1_p.F173X, DCTN1_p.R1173H, PIK3CA_p.R88Q, PIK3CA_p.R357Q, PIK3CA_p.E545A, PIK3CA_p.E970K, FAT4_p.L3V, FBXW7_p.S582L, FBXW7_p.R465H, PDGFRA_p.R151H, APC_p.M1413X, APC_p.KR1462-1463X, IL7R_p.K119X, IL6ST_p.K529X, BRAF_p.D634N, BRAF_p.G509V, EGFR_p.L858R, AKAP9_p.K37X, and UBR5_p.R1331C.

According to the priority embodiment of the invention, the collection of 67 off-the-shelf peptides is referenced in patent application Ser. No. 18/492,794 filed Oct. 24, 2023. The sequences of mutant peptides and its corresponding wild-type peptides presented in the collection of 67 off-the-shelf peptides are listed in Table 1 below.

TABLE 1

The sequences of mutant peptides and its corresponding wild-type peptides presented in the collection of 67 off-the-shelf peptides according to the invention

| Off-the-shelf peptide | SEQ ID No. | Mutant sequence |
|---|---|---|
| KRAS_p.G13D | 1 | MTEYKLVVVGAGDVGKSALTIQLIQ |
| KRAS_p.G12V | 2 | MTEYKLVVVGAVGVGKSALTIQLI |
| KRAS_p.G12A | 3 | MTEYKLVVVGAAGVGKSALTIQLI |
| KRAS_p.G12D | 4 | MTEYKLVVVGADGVGKSALTIQLI |
| KRAS_p.G12C | 5 | MTEYKLVVVGACGVGKSALTIQLI |
| CDX2_p.V306X | 6 | GSVPGVLGPTGGC |
| RNF43_p.G659X | 7 | ARHPQRKRRGVPPSPPLALGPRMQL |
| TP53_p.R282W | 8 | FEVRVCACPGRDWRTEEENLRKKGE |
| TP53_p.R273H | 9 | SGNLLGRNSFEVHVCACPGRDRRTE |
| TP53_p.R248Q | 10 | YMCNSSCMGGMNQRPILTIITLEDS |
| TP53_p.R175H | 11 | YKQSQHMTEVVRHCPHHERCSDSDG |
| GNAS_p.R201H | 12 | DYVPSDQDLLRCHVLTSGIFETKFQ |
| PIK3CA_p.E545K | 13 | AISTRDPLSEITKQEKDFLWSHRHY |
| BRAF_p.V640E | 14 | LTVKIGDFGLATEKSRWSGSHQFEQ |
| TCF7L2_p.R471C | 15 | WCKPCRRKKCVCYIQGEGSCLSPP |
| ATM_p.A2301X | 16 | SEWQLEEAQVFWAKRSRVLP |
| POU2AF1_p.A226V | 17 | EPVLQDMEDPRRVASSLTIDKLLLE |
| KRAS_p.G12S | 18 | MTEYKLVVVGASGVGKSALTIQLI |
| CHD4_p.K73X | 19 | RDPKIPKSKRQKRSVCSYAGSWGTA |
| TP53_p.E286K | 20 | VCACPGRDRRTEKENLRKKGEPHHE |
| TP53_p.Y220C | 21 | DRNTFRHSVVVPCEPPEVGSDCTTI |
| TP53_p.C176F | 22 | KQSQHMTEVVRRFPHHERCSDSDGL |
| TP53_p.A159P | 23 | VDSTPPPGTRVRPMAIYKQSQHMTE |
| TP53_p.V157F | 24 | LWVDSTPPPGTRFRAMAIYKQSQHM |
| CIC_p.T1740M | 25 | AGGITQVQYILPMLPQQLQVAPAPA |
| ELK4_p.S359X | 26 | SLPTASLTPAFFHRHPSY |
| ARID1A_p.K1071X | 27 | KEIGGLTQVNKNGGNLQPTSMWA |
| BARD1_p.K171X | 28 | SKASVQTQPAIKKMQVLSKTHMNLF |
| PIK3CA_p.V344G | 29 | SALRIKILCATYGNVNIRDIDKIYV |
| PIK3CA_p.E542K | 30 | QLKAISTRDPLSKITEQEKDFLWSH |
| AKAP9_p.SE1650-1651SX | 31 | AQRSSIDNENLVSEREGAFRGAGST |
| TCF7L2_p.H198X | 32 | NKVPVVQHPHHVHPSRLLSRTAMNT |
| ATM_p.V60X | 33 | DSKQGKYLNWDAVLDFYRNIFRKKQ |
| BCL9L_p.Q452X | 34 | EGGPPAQAPPPPSSHPRPLPAG |
| NCOR2_p.P975X | 35 | LKQLKQRAAAIPPSRSPKSMSPPGR |
| KRAS_p.A146T | 36 | ARSYGIPFIETSTKTRQGVDDAFYT |
| BRCA2_p.Q1782X | 37 | SGIEPVLKNVEDQKTLVFPK |
| CDK12_p.R663C | 38 | SKPVKKEKEQRTCHLLTDLPLPPEL |
| TP53_p.R273C | 39 | SGNLLGRNSFEVCVCACPGRDRRTE |
| SMAD4_p.G30X | 40 | SIVHSLMCHRQGGE |
| SMAD4_p.R361H | 41 | TVDGYVDPSGGDHFCLGQLSNVHRT |
| MTOR_p.S2215F | 42 | GLVNTLLANDPTFLRKNLSIQRYAV |
| ATP1A1_p.G98X | 43 | TPEWIKFCRQLFGGSQCYCGLERFF |
| ARID1A_p.S764SX | 44 | YMQRNPQMPQYSSPPARLSLISASA |
| ARID1A_p.G1848X | 45 | EFDSGLLHWRIGGGTPLSISRPTSR |
| ASXL1_p.G643X | 46 | HCHREAATTAIGGGVARVEVAAGPP |
| GNAS_p.R201C | 47 | DYVPSDQDLLRCCVLTSGIFETKFQ |
| ERG_p.-446-447X | 48 | PPALPVTSSSFFCCPKPILEFTNWG |
| AMER1_p.F173X | 49 | SMPKPKKGLKGFLAVSAVTGRARSL |
| DCTN1_p.R1173H | 50 | QLSTHTHVVDITHTSPAAKSPSAQL |
| PIK3CA_p.R88Q | 51 | EAEREEFFDETRQLCDLRLFQPFLK |
| PIK3CA_p.R357Q | 52 | NVNIRDIDKIYVQTGIYHGGEPLCD |
| PIK3CA_p.E545A | 53 | AISTRDPLSEITAQEKDFLWSHRHY |
| PIK3CA_p.E970K | 54 | QDFLIVISKGAQKCTKTREFERFQE |
| FAT4_p.L3V | 55 | MDVAPDRATGRPWLP |
| FBXW7_p.S582L | 56 | TGNCIHTLTGHQLLTSGMELKDNIL |
| FBXW7_p.R465H | 57 | CIHTLYGHTSTVHCMHLHEKRVVSG |
| PDGFRA_p.R151H | 58 | IVEDDDSAIIPCHTTDPETPVTLHN |
| APC_p.M1413X | 59 | IASSVQSEPCSGM |
| APC_p.KR1462-1463X | 60 | AQTKREVPKNKAPTAEKRVDLSKLQ |
| IL7R_p.K119X | 61 | ICVKVGEKSLTCKK |
| IL6ST_p.K529X | 62 | APPSKGPTVRTKK |
| BRAF_p.D634N | 63 | IFLHEDLTVKIGNFGLATVKSRWSG |
| BRAF_p.G509V | 64 | ITVGQRIGSGSFVTVYKGKWHGDVA |
| EGFR_p.L858R | 65 | KTPQHVKITDFGRAKLLGAEEKEYH |
| AKAP9_p.K37X | 66 | AQSDGQSPSKKQKKREKRQAVNMMC |
| UBR5_p.R1331C | 67 | LEPPRFAQLALECVLQDWNALKSMI |
| | | Wild-type peptides sequence |
| KRAS_p.G13D | 68 | MTEYKLVVVGAGGVGKSALTIQLIQ |
| KRAS_p.G12V | 69 | MTEYKLVVVGAGGVGKSALTIQLI |

TABLE 1-continued

The sequences of mutant peptides and its corresponding wild-type peptides presented in the collection of 67 off-the-shelf peptides according to the invention

| Off-the-shelf peptide | SEQ ID No. | |
|---|---|---|
| KRAS_p.G12A | 70 | MTEYKLVVVGAGGVGKSALTIQLI |
| KRAS_p.G12D | 71 | MTEYKLVVVGAGGVGKSALTIQLI |
| KRAS_p.G12C | 72 | MTEYKLVVVGAGGVGKSALTIQLI |
| CDX2_p.V306X | 73 | GSVPGVLGPTGGVLNPTVTQ |
| RNF43_p.G659X | 74 | LSARHPQRRRGGPSEPTPGSRPQD |
| TP53_p.R282W | 75 | FEVRVCACPGRDRRTEEENLRKKGE |
| TP53_p.R273H | 76 | SGNLLGRNSFEVRVCACPGRDRRTE |
| TP53_p.R248Q | 77 | YMCNSSCMGGMNRRPILTIITLEDS |
| TP53_p.R175H | 78 | YKQSQHMTEVVRRCPHHERCSDSDG |
| GNAS_p.R201H | 79 | DYVPSDQDLLRCRVLTSGIFETKFQ |
| PIK3CA_p.E545K | 80 | AISTRDPLSEITEQEKDFLWSHRHY |
| BRAF_p.V640E | 81 | LTVKIGDFGLATVKSRWSGSHQFEQ |
| TCF7L2_p.R471C | 82 | WCKPCRRKKKCVRYIQGEGSCLSPP |
| ATM_p.A2301X | 83 | SEWQLEEAQVFWAKKEQSLALSILK |
| POU2AF1_p.A226V | 84 | EPVLQDMEDPRRAASSLTIDKLLLE |
| KRAS_p.G12S | 85 | MTEYKLVVVGAGGVGKSALTIQLI |
| CHD4_p.K73X | 86 | RDPKIPKSKRQKKERMLLCRQLGDS |
| TP53_p.E286K | 87 | VCACPGRDRRTEEENLRKKGEPHHE |
| TP53_p.Y220C | 88 | DRNTFRHSVVVPYEPPEVGSDCTTI |
| TP53_p.C176F | 89 | KQSQHMTEVVRRCPHHERCSDSDGL |
| TP53_p.A159P | 90 | VDSTPPPGTRVRAMAIYKQSQHMTE |
| TP53_p.V157F | 91 | LWVDSTPPPGTRVRAMAIYKQSQHM |
| CIC_p.T1740M | 92 | AGGITQVQYILPTLPQQLQVAPAPA |
| ELK4_p.S359X | 93 | SLPTASLTPAFFSQTPIILTPSPLL |
| ARID1A_p.K1071X | 94 | KEIGGLTQVNKNKKWRELATNLNVG |
| BARD1_p.K171X | 95 | SKASVQTQPAIKKDASAQQDSYEFV |
| PIK3CA_p.V344G | 96 | SALRIKILCATYVNVNIRDIDKIYV |
| PIK3CA_p.E542K | 97 | QLKAISTRDPLSEITEQEKDFLWSH |
| AKAP9_p.SE1650-1651SX | 98 | AQRSSIDNENLVSERERVLLEELEA |
| TCF7L2_p.H198X | 99 | NKVPVVQHPHHVHPLTPLITYSNEH |
| ATM_p.V60X | 100 | DSKQGKYLNWDAVFRFLQKYIQKET |
| BCL9L_p.Q452X | 101 | EGGPPAQAPPPPQQPPTAPPSGLKK |
| NCOR2_p.P975X | 102 | LKQLKQRAAAIPPIQVTKVHEPPRE |
| KRAS_p.A146T | 103 | ARSYGIPFIETSAKTRQGVDDAFYT |
| BRCA2_p.Q1782X | 104 | SGIEPVLKNVEDQKNTSFSKVISNV |
| CDK12_p.R663C | 105 | SKPVKKEKEQRTRHLLTDLPLPPEL |
| TP53_p.R273C | 106 | SGNLLGRNSFEVRVCACPGRDRRTE |
| SMAD4_p.G30X | 107 | SIVHSLMCHRQGGESETFAKRAIES |
| SMAD4_p.R361H | 108 | TVDGYVDPSGGDRFCLGQLSNVHRT |
| MTOR_p.S2215F | 109 | GLVNTLLANDPTSLRKNLSIQRYAV |
| ATP1A1_p.G98X | 110 | TPEWIKFCRQLFGGFSMLLWIGAIL |
| ARID1A_p.S764SX | 111 | YMQRNPQMPQYSSPQPGSALSPRQP |
| ARID1A_p.G1848X | 112 | EFDSGLLHWRIGGGDTTEHIQTHFE |
| ASXL1_p.G643X | 113 | HCHREAATTAIGGGGGPGGGGGGAT |
| GNAS_p.R201C | 114 | DYVPSDQDLLRCRVLTSGIFETKFQ |
| ERG_p.-446-447X | 115 | PPALPVTSSSFFAAPNPYWNSPTGG |
| AMER1_p.F173X | 116 | SMPKPKKGLKGFFSSIRRHRKSKVT |
| DCTN1_p.R1173H | 117 | QLSTHTHVVDITRTSPAAKSPSAQL |
| PIK3CA_p.R88Q | 118 | EAEREEFFDETRRLCDLRLFQPFLK |
| PIK3CA_p.R357Q | 119 | NVNIRDIDKIYVRTGIYHGGEPLCD |
| PIK3CA_p.E545A | 120 | AISTRDPLSEITEQEKDFLWSHRHY |
| PIK3CA_p.E970K | 121 | QDFLIVISKGAQECTKTREFERFQE |
| FAT4_p.L3V | 122 | MDLAPDRATGRPWLP |
| FBXW7_p.S582L | 123 | TGNCIHTLTGHQSLTSGMELKDNIL |
| FBXW7_p.R465H | 124 | CIHTLYGHTSTVRCMHLHEKRVVSG |
| PDGFRA_p.R151H | 125 | IVEDDDSAIIPCRTTDPETPVTLHN |
| APC_p.M1413X | 126 | IASSVQSEPCSGMVSGIISPSDLPD |
| APC_p.KR1462-1463X | 127 | REVPKNKAPTAEKRESGPKQAAVNA |
| IL7R_p.K119X | 128 | ICVKVGEKSLTCKKIDLTTIVKPEA |
| IL6ST_p.K529X | 129 | APPSKGPTVRTKKVGKNEAVLEWDQ |
| BRAF_p.D634N | 130 | IFLHEDLTVKIGDFGLATVKSRWSG |
| BRAF_p.G509V | 131 | ITVGQRIGSGSFGTVYKGKWHGDVA |
| EGFR_p.L858R | 132 | KTPQHVKITDFGLAKLLGAEEKEYH |
| AKAP9_p.K37X | 133 | AQSDGQSPSKKQKKKRKTSSSKHDV |
| UBR5_p.R1331C | 134 | LEPPRFAQLALERVLQDWNALKSMI |

At step 103, synthesizing a long peptide corresponding to a panel of shared neoantigen at step 102 and its corresponding of wild type peptides.

At step 104, stimulating the PBMCs with the long synthetic peptides at step 103 to obtain a stimulated PBMC, comprising the following steps:
  (i) thawing frozen PBMCs in AIM-V media supplemented with 10% fetal bovine serum (FBS) and 1 μg/mL deoxyribonuclease I (DNase I) solution;

(ii) allowing $10^5$ PBMCs to rest in 96-round bottom well-plate containing AIM-V media supplemented with 10% FBS, 10 mM N-2-hydroxyethylpiperazine-N'-2-ethanesulfonic acid (HEPES), and 50 μM β-mercaptoethanol overnight before stimulation with synthesized long peptide at a concentration of 5 μM in a humidified incubator at 37° C. with 5% $CO_2$;

(iii) further stimulating PBMCs with 2000 IU/mL granulocyte-macrophage colony-stimulating factor (GM-CSF) and 1000 IU/mL interleukin-4 (IL-4) for 24 hours;

(iv) adding 100 ng/mL LPS and 10 ng/mL IFN-γ to the PBMCs along with the peptides for an additional 12 hours; and (v) restimulating PBMCs by adding 10 ng/mL interleukin-7 (IL-7), 10 ng/mL interleukin-15 (IL-15), and 10 ng/mL interleukin-21 (IL-21) to the PBMCs on the following day, in which a restimulation frequency of 3 days/time and the number of restimulations is three times.

At step 105, screening the stimulated PBMC at step 104 based on response of T cells is measured by interferon-γ (IFN-γ) secretion to mutant peptides and wild type peptides, which is more than twofold higher compared to its corresponding wild-type peptides.

At step 106, isolating a neoantigen-specific T cell from the screened stimulated PBMC at step 105 to identify a clonotype-purified cell.

According to the priority embodiment of the invention, the clonotype-purified cell obtained from a method 200 will be described in detail later below.

At step 107, identifying a TCR candidate for shared neoantigen according to a method 300, which will be described in detail later below.

Finally, at step 108 evaluating antigenic specificity of the TCR candidate for shared neoantigen through T cell activation bioassay using Nuclear Factor of Activated T cells (NFAT) system and using PBMCs or jurkat (JKT) del beta/CD8 to identify a shared neoantigen-reactive TCR, comprising the following steps:

(c1) co-culturing a) a reporter T cell comprising the TCR candidate for shared neoantigen expression cassette, and b) an antigen presenting cell (APC) that expresses the shared neoantigen sequence and a human leukocyte antigen (HLA) sequence extracted from subject's profile;
wherein the reporter T cell is a jurkat del beta cell; and
wherein the TCR candidate for shared neoantigen expression cassette comprises a TCR candidate sequence reconstructed from TCR α and β chain sequences;

(c2) identifying a positive reporter signal in the reporter T cell to identify the neoantigen-reactive TCR; wherein the shared neoantigen-reactive TCR comprises a sequence selected from the group consisting of SEQ ID NOs:135 to 142.

According to the preferred embodiment of the present invention, each shared neoantigen-reactive TCR includes a TCR alpha chain and a TCR beta chain, in which the TCR alpha chain is generated by VJ recombination, whereas the beta chain is generated by VDJ recombination, all are listed in Table 2 below.

TABLE 2

The sequences of the TCR alpha and TCR beta chains of each neoantigen-reactive TCR is identified by method 100 according to the invention

| Neoantigen-reactive TCR name | Chain | SEQ ID No. | CDR3 | V_gene | J_gene | D_gene |
|---|---|---|---|---|---|---|
| TCR12.1_ZNC35348 | alpha (α) | 143 | CAASDNDMRF | TRAV29/DV5 | TRAJ43 | X |
|  | beta (β) | 144 | CATKSSLTYEQYF | TRBV6-1 | TRBJ2-7 | X |
| TCR32_ZNC3548 | alpha (α) | 145 | CATDQAGTALIF | TRAV17 | TRAJ15 | X |
|  | beta (β) | 146 | CASSVQGGAQETQYF | TRBV9 | TRBJ2-5 | X |
| TCR179_ZNL4901 | alpha (α) | 147 | CAESQGSARQLTF | TRAV5 | TRAJ22 | X |
|  | beta (β) | 148 | CASRALTGNTGELFF | TRBV28 | TRBJ2-2 | X |
| TCR314_ZNL4901 | alpha (α) | 149 | CAASSGAGSYQLTF | TRAV23/DV6 | TRAJ28 | X |
|  | beta (β) | 150 | CASSPKISFTGTGKLNTEAFF | TRBV27 | TRBJ1-1 | TRBD1 |
| TCR61_ZNL4901 | alpha (α) | 151 | CAVGALYGNKLVF | TRAV8-3 | TRAJ47 | X |
|  | beta (β) | 152 | CASSYDDRGSSNGELFF | TRBV6-2 | TRBJ2-2 | TRBD1 |
| TCR6_ZNL4901 | alpha (α) | 153 | CALFSTSGTYKYIF | TRAV6 | TRAJ40 | X |
|  | beta (β) | 154 | CAWSGDNYEQYF | TRBV30 | TRBJ2-7 | X |
| TCR1034_ZNL4901 | alpha (α) | 155 | CAVSIRLMNTGFQKLVF | TRAV3 | TRAJ8 | X |

TABLE 2-continued

The sequences of the TCR alpha and TCR beta chains of each neoantigen-reactive TCR is identified by method 100 according to the invention

| Neoantigen-reactive TCR name | Chain | SEQ ID No. | CDR3 | V_gene | J_gene | D_gene |
|---|---|---|---|---|---|---|
| | beta (β) | 156 | CASSEGAPNSIDEAFF | TRBV4-2 | TRBJ1-1 | X |
| TCR1_ZNL4901 | alpha (α) | 157 | CAVEDRNRDDKIIF | TRAV2 | TRAJ30 | X |
| | beta (β) | 158 | CASSLRTASKVAFF | TRBV5-1 | TRBJ1-1 | X |

X: Unknown

According to the embodiment of the invention, step 108, the HLA allele is encoded by any one of the following loci: HLA-A, HLA-B, and HLA-C.

According to the preferred embodiment of the present invention, step 108, the HLA allele is selected from the group consisting of HLA-A1101, HLA-A0206, HLA-B5401, HLA-C0102, HLA-B0705, HLA-C1203, HLA-B1532, and HLA-C0702.

According to the embodiment of the invention, step 108, the APC is a K562 cell which expresses a CD80 molecule.

According to the embodiment of the invention, step 108, the reporter T cell and the APC are co-cultured in a ratio of 2:1 or 0.5:1 with 5% $CO_2$ at 37° C. for 6 hours.

According to another embodiment of the invention, step 108, the reporter T cell and the APC are co-cultured in a ratio of 5:1 with 5% $CO_2$ at 37° C. for 6 hours.

According to another embodiment of the invention, step 108, the reporter T cell and the APC are co-cultured in a ratio of 5:1 with 5% $CO_2$ at 37° C. for 24 hours.

The shared neoantigen-reactive TCR is identified by method 100 which bind to a shared neoantigen/HLA complex. The shared neoantigen/HLA complex is the shared neoantigen presented by the HLA molecule, in which the shared neoantigen comprises TP53_pR273H, and TP53_p.V157F, and wherein the HLA is selected from the group consisting of HLA-A1101, HLA-A0206, HLA-B5401, HLA-C0102, HLA-B0705, HLA-C1203, HLA-B1532, and HLA-C0702.

According to the preferred embodiment of the invention, the shared neoantigen-reactive TCR is identified by method 100 which bind to a shared neoantigen/HLA complex, in which the shared neoantigen is TP53_p.R273H, and the HLA is selected from the group consisting of HLA-A1101, HLA-A0206, HLA-B5401, HLA-C0102, and HLA-C0702.

According to the preferred embodiment of the invention, the shared neoantigen-reactive TCR is identified by method 100 which bind to a shared neoantigen/HLA complex, in which the shared neoantigen is TP53_p.R273H, and the HLA is selected from the group consisting of HLA-A1101, and HLA-C0102.

According to the preferred embodiment of the invention, the shared neoantigen-reactive TCR is identified by method 100 which bind to a shared neoantigen/HLA complex, in which the shared neoantigen is TP53_p.V157F, and the HLA is selected from the group of HLA-A1101, HLA-B0705, HLA-C0702, HLA-C1203, and HLA-B11532.

According to the preferred embodiment of the invention, the shared neoantigen-reactive TCR is identified by method 100 which bind to a shared neoantigen/HLA complex, in which the shared neoantigen is TP53_p.V157F, and the HLA is HLA-A1101.

According to the preferred embodiment of the invention, TP53 wild-type p.R273H and mutant p.R273H peptides were designed based on the HLA-A*11:01 and HLA-C0102 bindings predictions to the TP53_p.R273H MUT 10 to 11, and 25mer sequences. The top predicted mutant epitopes and corresponding wild-type sequences are listed in Table 3 below.

TABLE 3

TP53_p.R273H peptides tested

| Peptide | SEQ ID No. | Sequence |
|---|---|---|
| TP53_p.R273H WT 25 mer | 76 | SGNLLGRNSFEVRVCACPGRDRRTE |
| TP53_p.R273H MT 25 mer | 9 | SGNLLGRNSFEVHVCACPGRDRRTE |
| TP53_p.R273H WT 10 mer | 159 | EVRVCACPGR |
| TP53_p.R273H MT 10 mer | 160 | EVHVCACPGR |
| TP53_p.R273H WT 11 mer | 161 | VRVCACPGRDR |
| TP53_p.R273H MT 11 mer | 162 | VHVCACPGRDR |
| TP53_p.R273H WT 11 mer | 163 | RVCACPGRDRR |
| TP53_p.R273H MT 11 mer | 164 | HVCACPGRDRR |

According to the preferred embodiment of the invention, TP53 wild-type p.V157F and mutant p.V157F peptides were designed based on the HLA-A*11:01, bindings predictions to the TP53_p.V157F MUT 25mer sequence. The top predicted mutant epitopes and corresponding wild-type sequences are listed in Table 4 below.

TABLE 4

TP53_p.V157F peptides tested

| Peptide | SEQ ID No. | Sequence |
|---|---|---|
| TP53_p.V157F WT 25 mer | 91 | LWVDSTPPPGTRVRAMAIYKQSQHM |
| TP53_p.V157F MT 25 mer | 24 | LWVDSTPPPGTRFRAMAIYKQSQHM |

According to the embodiment of the invention, the method 100 is applied to lung cancer, and colorectal cancer.

Colorectal cancer is a type of gastrointestinal cancer that starts in the colon or the rectum. These cancers are also called colon cancer or rectal cancer, depending on where they start. The colon is the large intestine or large bowel. The rectum is the passageway that connects the colon to the anus. Colon cancer and rectal cancer are often grouped together because they have many features in common. Sometimes abnormal growths, called polyps, form in the colon or rectum. Over time, some polyps may turn into cancer. Screening tests can find polyps so they can be removed before turning into cancer. Screening aids in the detection of colorectal cancer at early stages, when treatment is most successful at treating the cancer. The most common type of colorectal cancer is adenocarcinoma. Adenocarcinomas of the colon and rectum make up 95% of all colorectal cancer cases in the United States. In the gastrointestinal tract, rectal and colon adenocarcinomas develop in the cells of the lining inside the large intestine. These adenocarcinomas typically start as a polyp.

Lung cancer is cancer that forms in tissues of the lung, usually in the cells lining air passages. Lung cancers usually are grouped into two main types, small cell lung cancer and non-small cell lung cancer (including adenocarcinoma and squamous cell carcinoma). Non-small cell lung cancer is more common than small cell lung cancer.

Figure 2:
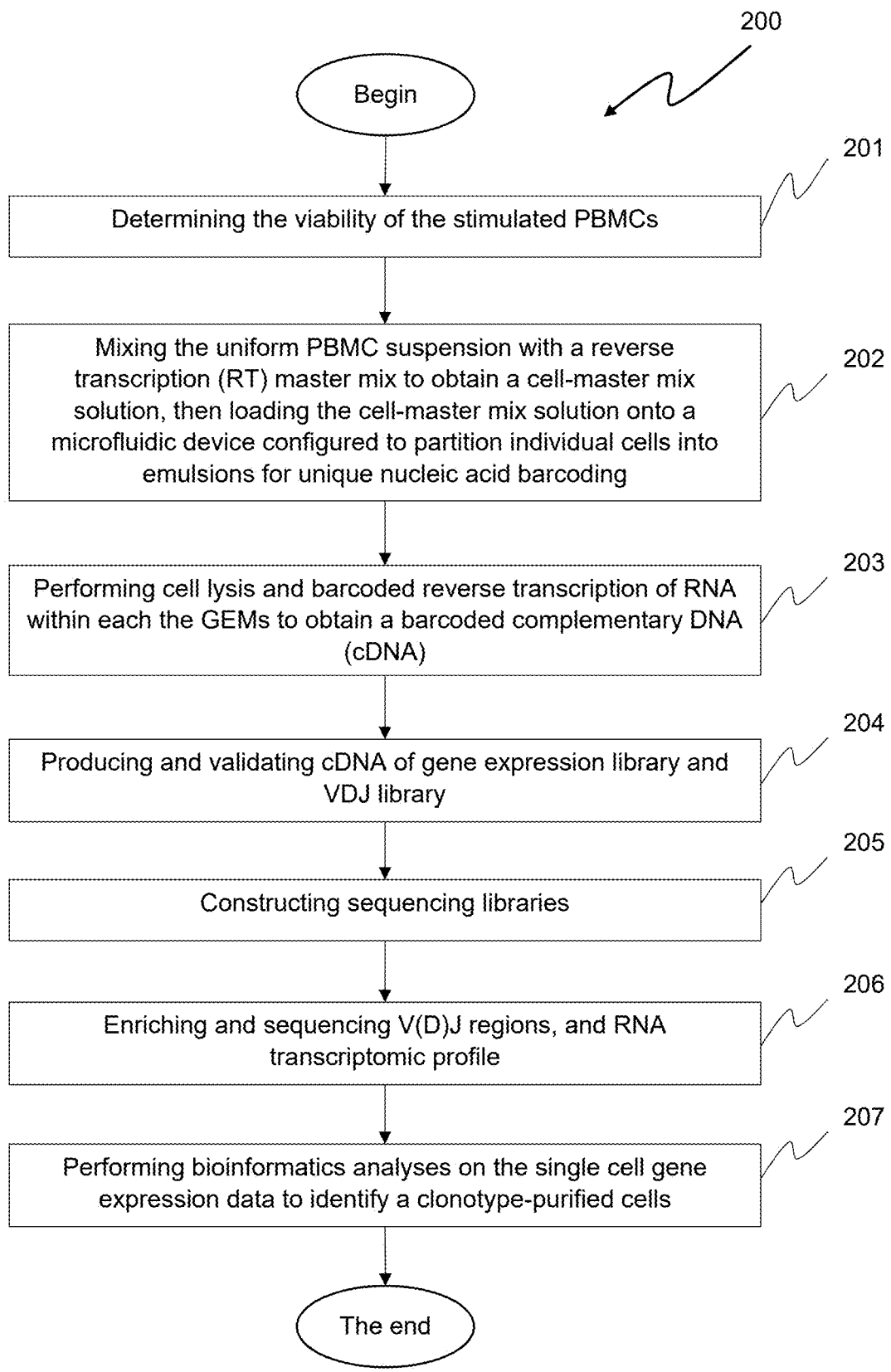
FIG. 2 is a flowchart illustrating the principle of a method for isolating the neoantigen-specific T cell from the screened stimulated PBMC to identify the clonotype-purified cell in accordance with an exemplary embodiment of the present invention.

Referring to FIG. 2, the method for isolating a neoantigen-specific T cell from the screened stimulated PBMC to identify the clonotype-purified cell 200 ("method 200") in accordance with the present invention. In particular, method 200 includes the following steps:

At step 201, determining the viability of the stimulated PBMC using a hemocytometer to ensure viability above 90%, and adjusting the cell concentration to between 700-1,200 cells per microliter to obtain a uniform PBMC suspension.

At step 202, mixing the uniform PBMC suspension at step 201 with a reverse transcription (RT) master mix to obtain a cell-master mix solution, then loading the cell-master mix solution onto a microfluidic device configured to partition individual cells into emulsions for unique nucleic acid barcoding, wherein the loading is performed along with barcoded 5' gel beads and partitioning oil to obtain a single-cell gel bead in emulsion (GEMs).

At step 203, performing cell lysis and barcoded reverse transcription of RNA within each the GEMs to obtain a barcoded complementary DNA (cDNA).

At step 204, producing and validating cDNA of gene expression library and VDJ library, comprising:
  recovering the barcoded cDNA from the GEMs at step 203 to obtain a cDNA sample;
  amplifying the cDNA sample using polymerase chain reaction (PCR) to obtain an amplified cDNA; and
  assessing the quality of the amplified cDNA using sensitivity-based screening systems to obtain a validated cDNA.

At step 205, constructing sequencing libraries, comprising:
  utilizing the validated cDNA at step 204 to prepare 5' gene expression libraries;
  indexing each library with a sample indexing system to obtain an indexed gene expression library; and
  sequencing the indexed gene expression library on a sequencing platform to generate at least 30,000 read pairs per cell with paired-end reads of 2×300 base pairs.

At step 206, enriching and sequencing V(D)J regions, and RNA transcriptomic profile comprising:
  using the libraries generated in step 205 to amplify full-length variable (V), diversity (D), and joining (J) segments of T cell receptor (TCR) alpha and beta chains using an enrichment system to obtain an enriched TCR product;
  quantifying the enriched TCR product obtained from the amplification using sensitivity-based quantification systems to produce a quantified enriched TCR product;
  preparing sequencing libraries using 50 ng of the quantified enriched TCR product to produce a TCR sequencing library; and
  sequencing the TCR sequencing library on a sequencing platform to generate paired-end reads of 2×300 base pairs with a depth of 5,000 read pairs per cell.

Finally, at step 207, performing bioinformatics analyses on the single cell gene expression data to identify a clonotype-purified cell, comprising:
  retaining cells with available clonotype information; and
  excluding cells with mitochondrial genome-derived reads exceeding 15%, more than 7,000 detected genes, or more than two TRA (T-cell receptor alpha locus) or TRB (T-cell receptor beta locus) sequences to obtain the clonotype-purified cell.

Figure 3:
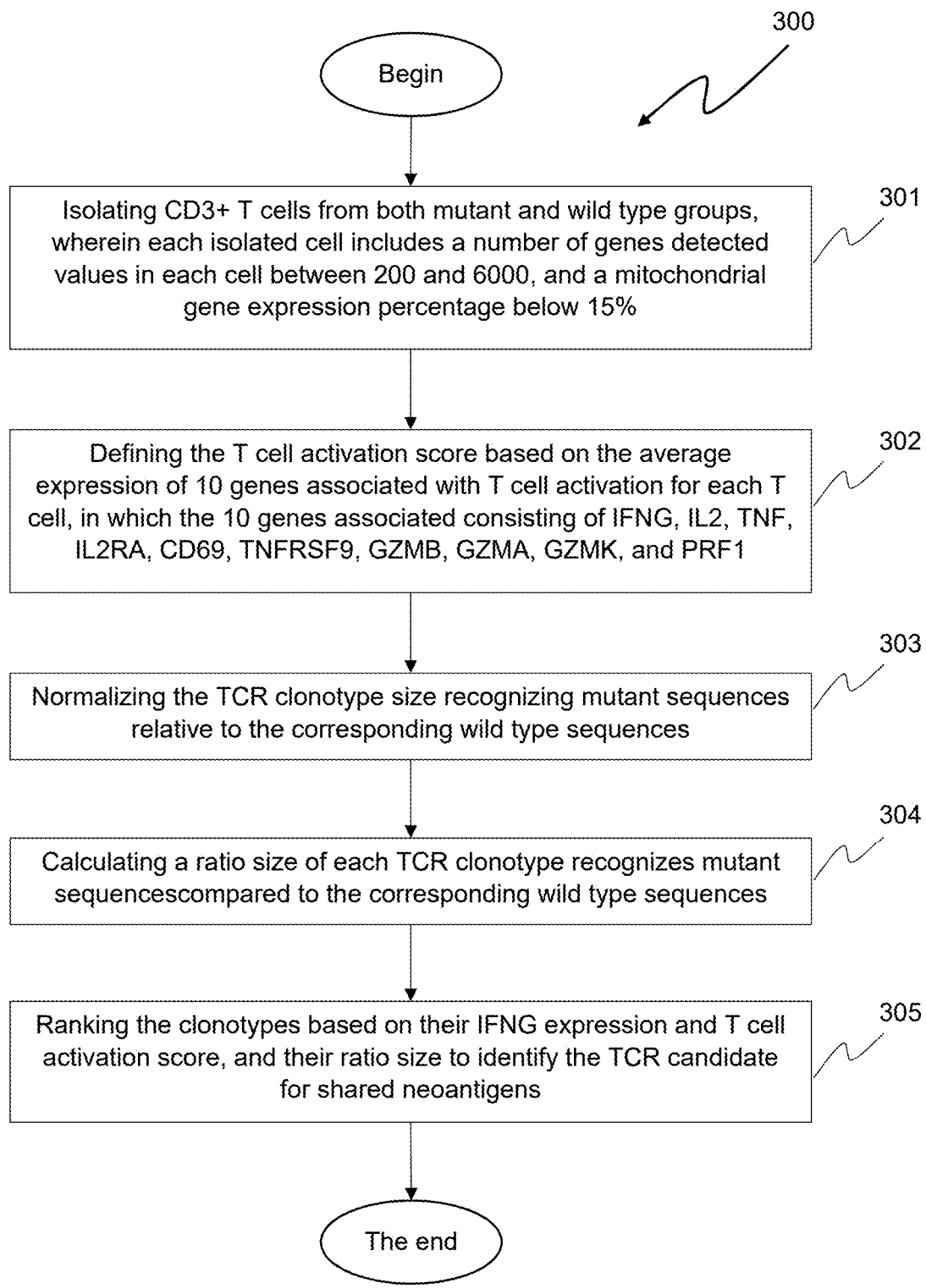
FIG. 3 is a flowchart illustrating the principle of a method for identifying the TCR candidates for shared neoantigen in accordance with an exemplary embodiment of the present invention.

Referring to FIG. 3, the method for identifying the TCR candidates for shared neoantigen 300 ("method 300") in accordance with the present invention. In particular, method 300 includes the following steps:

At step 301, isolating CD3+ T cells from both mutant and wild-type groups, wherein each isolated cell based on a number of genes detected values in each cell between 200 and 6000, and a mitochondrial gene expression percentage below 15%.

At step 302, defining the T cell activation score based on the average expression of 10 genes associated with T cell activation for each T cell, in which the 10 genes associated consisting of interferon gamma (IFNG), interleukin-2 (IL-2), tumor necrosis factor (TNF), interleukin-2 receptor alpha (IL2RA), cluster of differentiation 69 (CD69), TNF receptor superfamily member 9 (TNFRSF9), granzyme B (GZMB), granzyme A (GZMA), granzyme K (GZMK), and perforin 1 (PRF1).

At step 303, normalizing the size of TCR clonotypes stimulated by mutant sequences relative to the corresponding wild-type sequences; wherein, if any TCR clonotype is stimulated only by mutant sequences and is not found in the sample stimulated by the corresponding wild-type sequences, its size is calculated by taking the smallest size of the TCR clonotype stimulated by the wild-type sequences.

At step 304, calculating a ratio size of each TCR clonotype from group which is stimulated by mutant sequences compared to the corresponding wild-type sequences.

Finally, at step 305, ranking the clonotypes based on their IFNG expression and T cell activation score at step 302, and their ratio size at step 304 to identify the TCR candidates for shared neoantigen.

The present disclosure provides a shared neoantigen-reactive T cell receptor (TCR) comprising a sequence selected from the group consisting of SEQ ID NOs:135 to 142, wherein the shared neoantigen-reactive TCR is identified by the method 100 described above.

According to the priority embodiment of the invention, the shared neoantigen-reactive TCR bind to a shared neoantigen/HLA complex, wherein the neoantigen-reactive TCR bind to a shared neoantigen/HLA complex;

in which the shared neoantigen comprises TP53_p.R273H, and TP53_p.V157F;
  TP53_p.R273H comprises a sequence selected from the group consisting of SEQ ID NOs:9, 160, 162, 164, and 166;
  TP53_p.V157F comprises a sequence selected from the group consisting of SEQ ID NOs:24, 168, 170, 172, and 174;
  in which the HLA is selected from the group consisting of HLA-A1101, HLA-A0206, HLA-B5401, HLA-C0102, HLA-B0705, HLA-C1203, HLA-B1532, and HLA-C0702.

According to the priority embodiment of the invention, the shared neoantigen-reactive TCR bind to the shared neoantigen/HLA complex;
  in which the shared neoantigen is TP53_p.R273H; and
  in which the HLA is selected from the group consisting of HLA-A1101, HLA-A0206, HLA-B5401, HLA-C0102, and HLA-C0702.

According to the priority embodiment of the invention, the shared neoantigen-reactive TCR bind to the shared neoantigen/HLA complex;
  in which the shared neoantigen is TP53_p.R273H; and
  in which the HLA is selected from the group consisting of HLA-A1101, and HLA-C0102.

According to the priority embodiment of the invention, the shared neoantigen-reactive TCR bind to the shared neoantigen/HLA complex;
  in which the shared neoantigen is TP53_p.V157F; and
  in which the HLA is selected from the group consisting of HLA-A1101, HLA-B0705, HLA-C0702, HLA-C1203, and HLA-B1532.

According to the priority embodiment of the invention, the shared neoantigen-reactive TCR bind to the shared neoantigen/HLA complex;
  in which the shared neoantigen is TP53_p.V157F; and
  in which the HLA is HLA-A1101.

The present disclosure provides a method of preparing a medicament for the treatment or prevention of a cancer, the method comprising preparing a population of cells that comprise a recombinant vector expressing the shared neoantigen-reactive T cell receptor comprising a sequence selected from the group consisting of SEQ ID NOs:135 to 142;
  wherein the cancer includes lung cancer, and colorectal cancer;
  wherein the shared neoantigen comprises TP53_p.R273H, and TP53_p.V157F;
  TP53_p.R273H comprises a sequence selected from the group consisting of SEQ ID NOs:9, 160, 162, 164, and 166;
  TP53_p.V157F comprises a sequence selected from the group consisting of SEQ ID NOs:24, 168, 170, 172, and 174;
  wherein the HLA is selected from the group consisting of HLA-A1101, HLA-A0206, HLA-B5401, HLA-C0102, HLA-B0705, HLA-C1203, HLA-B1532, and HLA-C0702.

According to the preferred embodiment of the invention, the method of preparing a medicament for the treatment or prevention of a cancer, the method comprising preparing a population of cells that comprise a recombinant vector expressing the shared neoantigen-reactive T cell receptor comprising a sequence selected from the group consisting of SEQ ID NOs:135 to 142;
  in which the shared neoantigen is TP53_p.R273H; and
  in which the HLA is selected from the group consisting of HLA-A1101, HLA-A0206, HLA-B5401, HLA-C0102, and HLA-C0702.

According to the preferred embodiment of the invention, the method of preparing a medicament for the treatment or prevention of a cancer, the method comprising preparing a population of cells that comprise a recombinant vector expressing the shared neoantigen-reactive T cell receptor comprising a sequence selected from the group consisting of SEQ ID NOs:135 to 142;
  in which the shared neoantigen is TP53_p.R273H; and
  in which the HLA is selected from the group consisting of HLA-A1101, and HLA-C0102.

According to the preferred embodiment of the invention, the method of preparing a medicament for the treatment or prevention of a cancer, the method comprising preparing a population of cells that comprise a recombinant vector expressing the shared neoantigen-reactive T cell receptor comprising a sequence selected from the group consisting of SEQ ID NOs:135 to 142;
  in which the shared neoantigen is TP53_p.V157F; and
  in which the HLA is selected from the group consisting of HLA-A1101, HLA-B0705, HLA-C0702, HLA-C1203, and HLA-B1532.

According to the preferred embodiment of the invention, the method of preparing a medicament for the treatment or prevention of a cancer, the method comprising preparing a population of cells that comprise a recombinant vector expressing the shared neoantigen-reactive T cell receptor comprising a sequence selected from the group consisting of SEQ ID NOs:135 to 142;
  in which the shared neoantigen is TP53_p.V157F; and
  in which the HLA is HLA-A1101.

According to the preferred embodiment of the invention, the method of preparing a medicament for the treatment or prevention of cancer includes lung cancer and colorectal cancer.

Reference is now made to the following examples, which together with the above descriptions, illustrate the invention in a non limiting fashion.

Tissue samples from clinical patients include seven patients with colorectal cancer samples (ZNC34, ZNC35, ZNC39, ZNC41, ZNC42, ZNC46, and ZNC47) listed in Table 5 below and three patients with lung cancer (ZNL49, ZNL50, and ZNL64). All the human tissue samples were stored at −80° C. before RNA extraction.

TABLE 5

Information of the ten samples for determine the neoantigen-reactive TCR

| No. | Sample ID | Sex | Age | Cancer status | Histologic type |
|---|---|---|---|---|---|
| 1 | ZNC34 | Female | 69 | Colorectal cancer | Moderately differentiated adenocarcinoma, invading the serosal layer. Metastasis in 0/33 lymph nodes pT4aN0M0 |

TABLE 5-continued

Information of the ten samples for determine the neoantigen-reactive TCR

| No. | Sample ID | Sex | Age | Cancer status | Histologic type |
|---|---|---|---|---|---|
| 2 | ZNC35 | Female | 71 | Colorectal cancer | Moderately differentiated adenocarcinoma, invading the serosal layer, vascular and nerve invasion present. Metastasis in 1/10 lymph nodes pT4aN1M0 |
| 3 | ZNC39 | Male | 67 | Colorectal cancer | Moderately differentiated adenocarcinoma, invading the stomach. No vascular or nerve invasion. Metastasis in 0/9 lymph nodes pT4bN0M0 |
| 4 | ZNC41 | Male | 69 | Colorectal cancer | Moderately differentiated adenocarcinoma, invading the muscle layer. Metastasis in 0/12 lymph nodes pT2N0M0 |
| 5 | ZNC42 | Male | 60 | Colorectal cancer | Moderately differentiated adenocarcinoma, invading the serosal layer. No vascular or nerve invasion. Metastasis in 4/16 lymph nodes pT4aN2M0 |
| 6 | ZNC46 | Male | 78 | Colorectal cancer | Moderately differentiated adenocarcinoma, invading the subserosal layer. No vascular or nerve invasion. Metastasis in 0/6 lymph nodes pT4aN0M0 |
| 7 | ZNC47 | Female | 56 | Colorectal cancer | Moderately differentiated adenocarcinoma, invading subserosal fat tissue. No vascular, nerve, or lymphatic invasion. Metastasis in 3/13 lymph nodes pT4aN2M0 |

Isolating T cells from patients' tumor IDs ZNC34, ZNC35, ZNC39, ZNC41, ZNC42, ZNC46, ZNC47, ZNL49, ZNL50, ZNL64, and priming with long peptide containing mutations or corresponding wild-type proteins performed similarly to steps (101)-(104) described in method 100, in which the sequence of mutant and wild-type peptides used for PBMCs stimulation in patients IDs ZNC34, ZNC35, ZNC39, ZNC41, ZNC42, ZNC46, ZNC47, ZNL49, ZNL50, ZNL64 are listed in Table 6 below.

TABLE 6

Sequence of mutant and wild-type peptides used for PBMCs stimulation in patients IDs ZNC34, ZNC35, ZNC39, ZNC41, ZNC42, ZNC46, ZNC47, ZNL49, ZNL50, and ZNL64

| No. | Mutant peptide | SEQ ID No. | Wild-type peptide | SEQ ID No. |
|---|---|---|---|---|
| 1 | TP53_p.V157F_MT | 24 | TP53_p.V157F_WT | 91 |
| 2 | TP53_p.R273H_MT | 9 | TP53_p.R273H_WT | 76 |
| 3 | EGFR_p.L858R_MT | 65 | EGFR_p.L858R_WT | 132 |
| 4 | TP53_p.R273C_MT | 39 | TP53_p.R273C_WT | 106 |
| 5 | KRAS_p.G12C_MT | 5 | KRAS_p.G12C_WT | 72 |
| 6 | KRAS_p.G12D_MT | 4 | KRAS_p.G12D_WT | 71 |
| 7 | PIK3CA_p.E545K_MT | 13 | PIK3CA_p.E545K_WT | 80 |
| 8 | RNF43_p.G659X_MT | 7 | RNF43_p.G659X_WT | 74 |
| 9 | TP53_p.Y220C_MT | 21 | TP53_p.Y220C_WT | 88 |
| 10 | KRAS_p.G12V_MT | 2 | KRAS_p.G12V_WT | 69 |
| 11 | TP53_p.R248Q_MT | 10 | TP53_p.R248Q_WT | 77 |

Figure 4A:
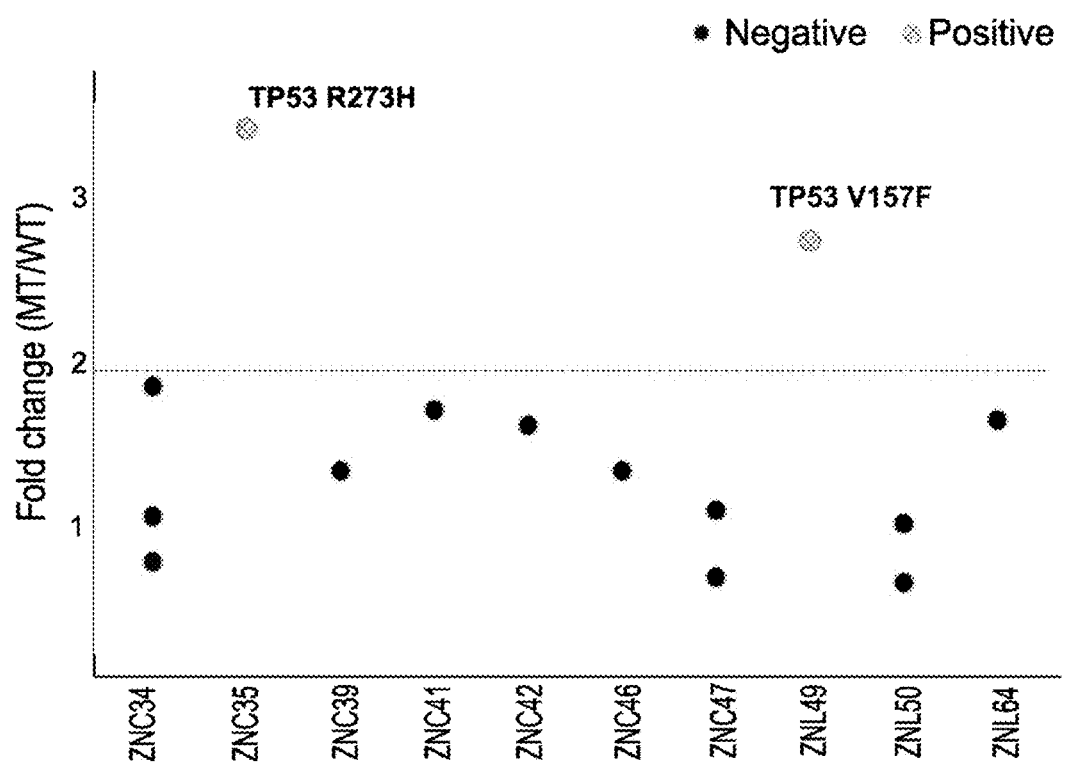
FIG. 4A is a graph showing the fold change of spots for mutant peptides compared to the corresponding wild-type peptides in patients with IDs ZNC34, ZNC35, ZNC39, ZNC41, ZNC42, ZNC46, ZNC47, ZNL49, ZNL50, and ZNL64.
Figure 4B:
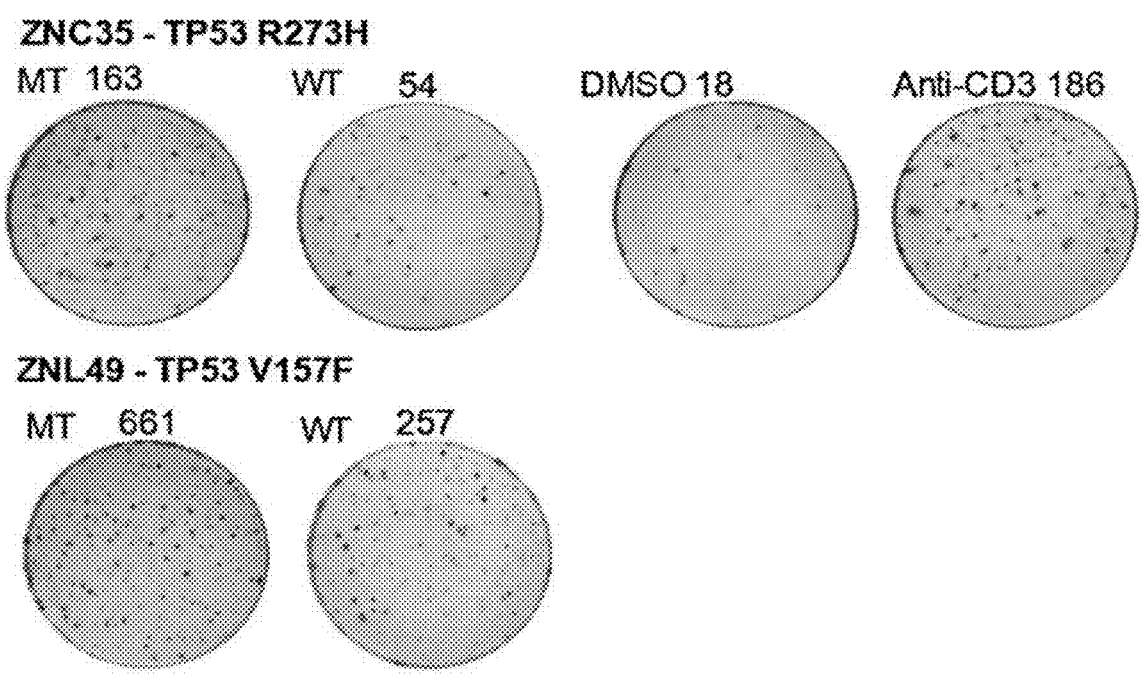
FIG. 4B is an image of spots from PBMCs of patients with IDs ZNC35 and ZNL49, which are determined to be immunogenic peptides.

Performing similarly to step 105 described in method 100, screening the stimulated PBMC in patients with IDs ZNC34, ZNC35, ZNC39, ZNC41, ZNC42, ZNC46, ZNC47, ZNL49, ZNL50, and ZNL64 based on response of T cells is measured by interferon-γ (IFN-γ) secretion to mutant peptides, which is more than twofold higher compared to its corresponding wild-type peptides. The results showed that stimulated PBMC in patients with IDs 35 and 49 had the fold change of spots for mutant peptides compared to the corresponding wild-type peptides (as shown in FIG. 4A), collecting T cells from patients IDs ZNC35 and ZNL49 from wells containing T cells stimulated with immunogenic neoantigens and the corresponding wild-type peptides (as shown in FIG. 4B), in which the immunogenic neoantigen in patient IDs ZNC35 and ZNL49 are respectively TP53_p.R273H and TP53_p.V157F.

Figure 5:
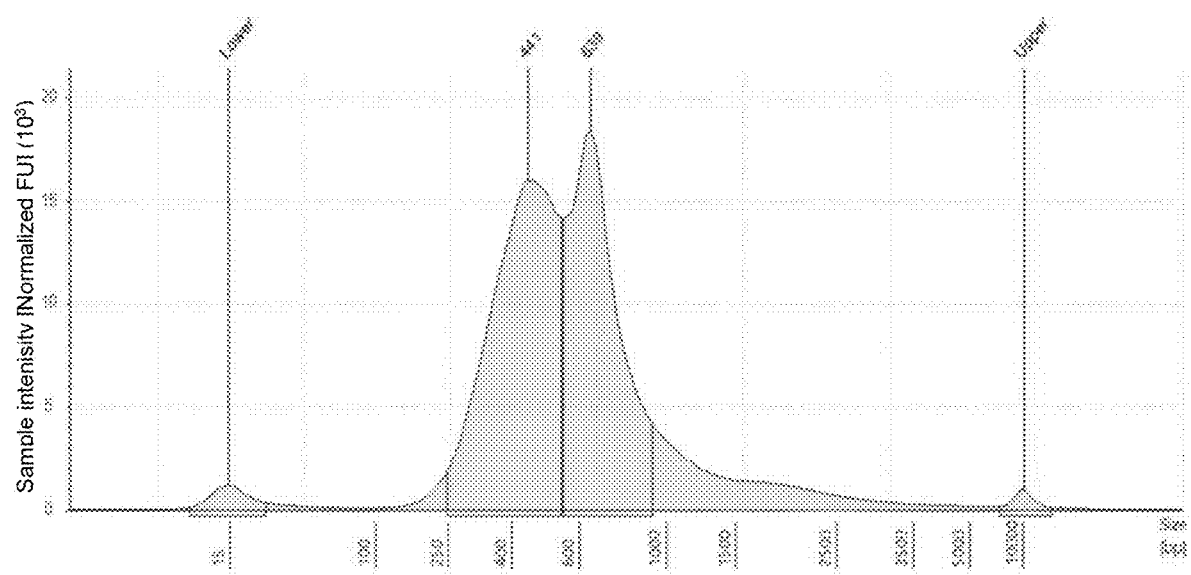
FIG. 5 is an image showing the results of cDNA length was measured using the Tapestation for the Gene Expression library.
Figure 6:
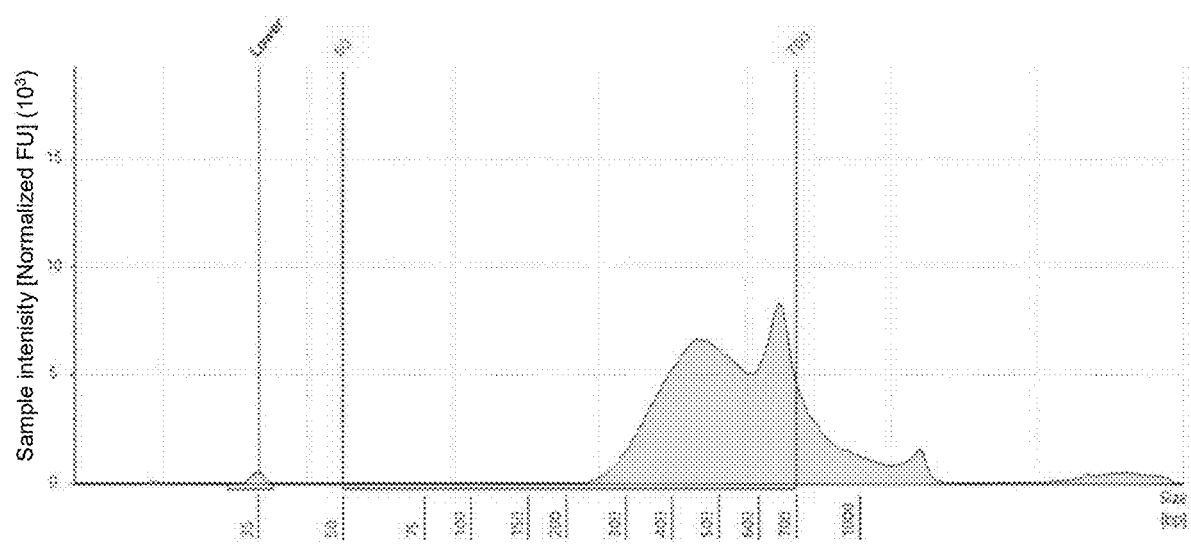
FIG. 6 is Tapestation for the VDJ library.
Figure 7:
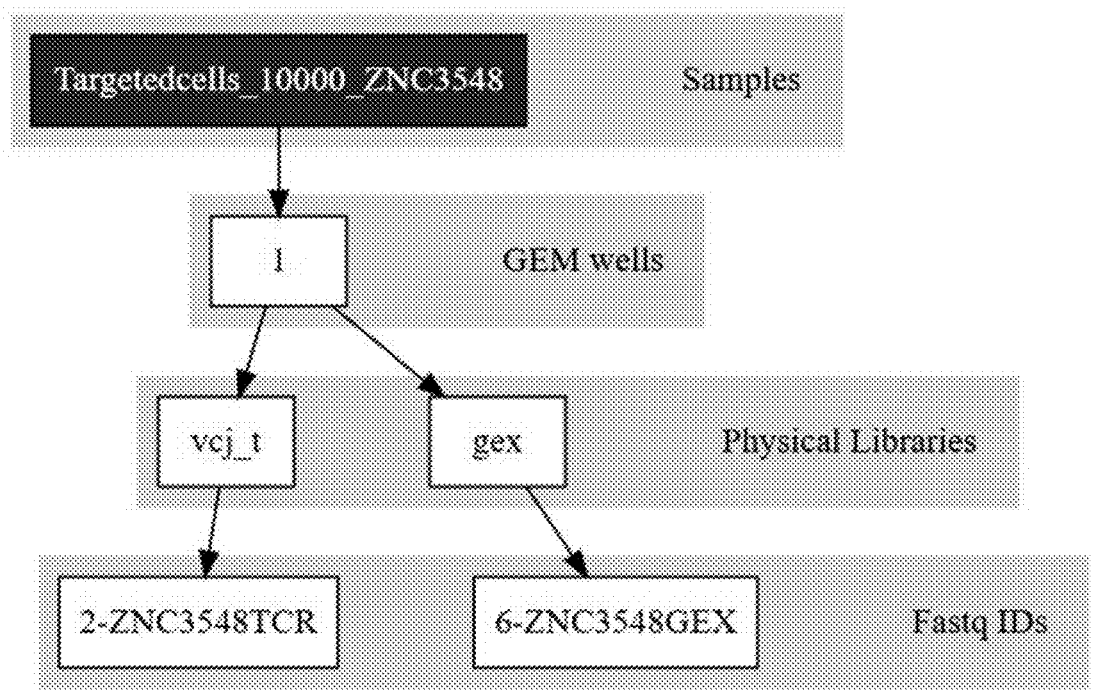
FIG. 7 is an image showing single-cell TCR and gene expression sequencing of the experimental scheme for neoantigen-specific TCR from Patient ID ZNC35.
Figure 9:
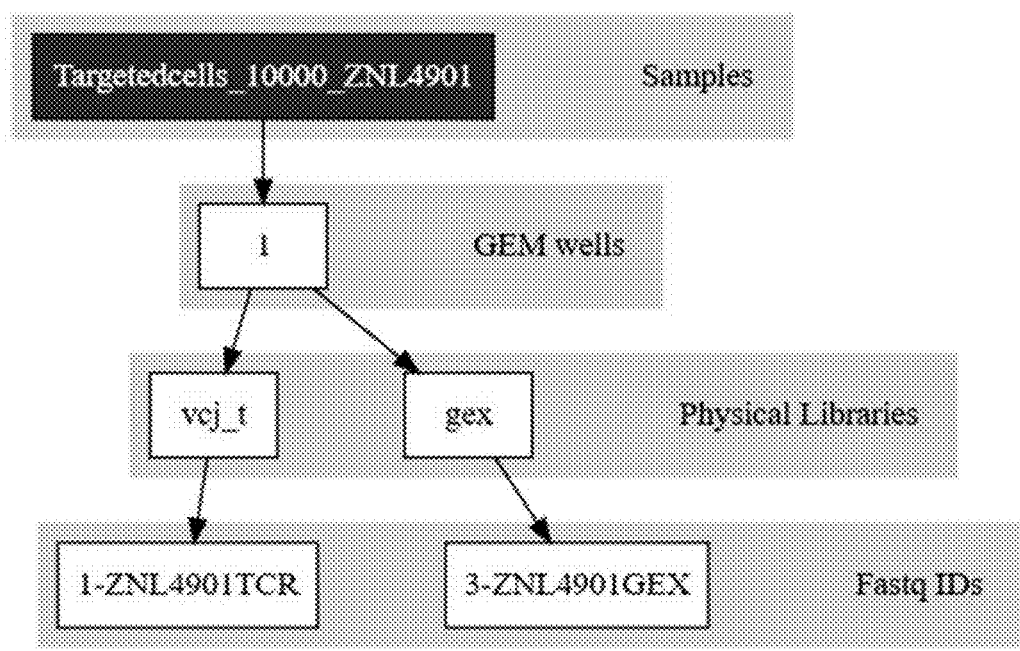
FIG. 9 is an image showing single-cell TCR and gene expression sequencing of the experimental scheme for neoantigen-specific TCR from Patient ID ZNL49.

Performing similarly to sub-steps (a1)-(a7) of step 106 described in method 100, identifying the clonotype-purified cell, in which the experimental data are illustrated in FIG. 5 to FIG. 10 include:

- the results of cDNA length was measured using the Tapestation for the gene expression library (as shown in FIG. 5);
- the results of cDNA length was measured using the Tapestation for the VDJ—T cell library (as shown in FIG. 6);
- the results of single cell TCR and gene expression sequencing of the experimental scheme for neoantigen specific TCR from patient ID ZNC35 (as shown in FIG. 7); the quality control (QC) results for the gene expression library and the VDJ library following sequencing from patient ID ZNC35, in which metrics such as library size, read quality, and cell number distribution were evaluated to ensure the integrity and reliability of the sequencing data (as shown in FIG. 8A-8B);
- the results of single cell TCR and gene expression sequencing of the experimental scheme for neoantigen specific TCR from patient ID ZNL49 (as shown in FIG. 9); the quality control (QC) results for the gene expression library and the VDJ library following sequencing from patient ID ZNL49, in which metrics library size, read quality, and cell number distribution were evaluated to ensure the integrity and reliability of the sequencing data (as shown in FIG. 10A-10B).

Figure 11A:
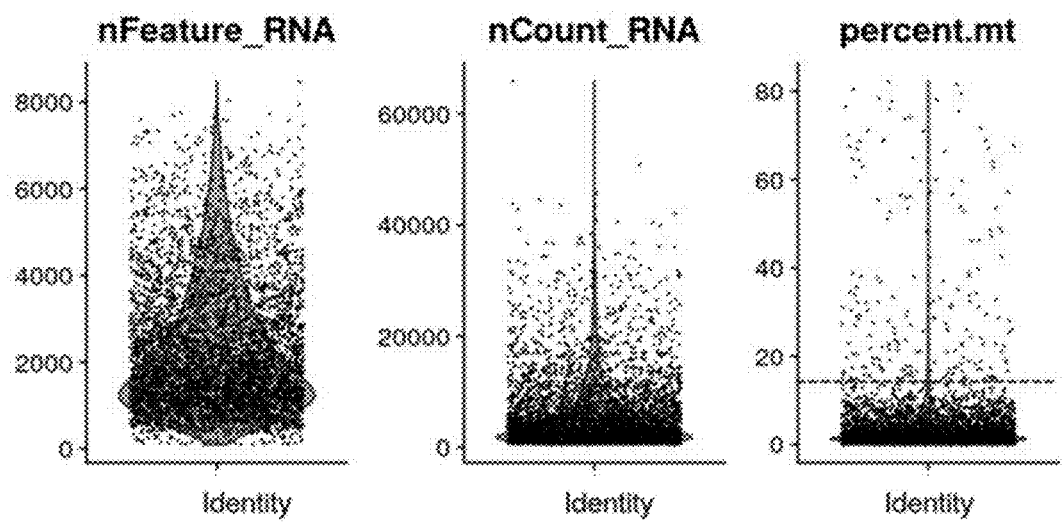
FIG. 11A is an image showing quality control of selected clonotypes for further analysis of patient ID ZNC35.
Figure 11B:
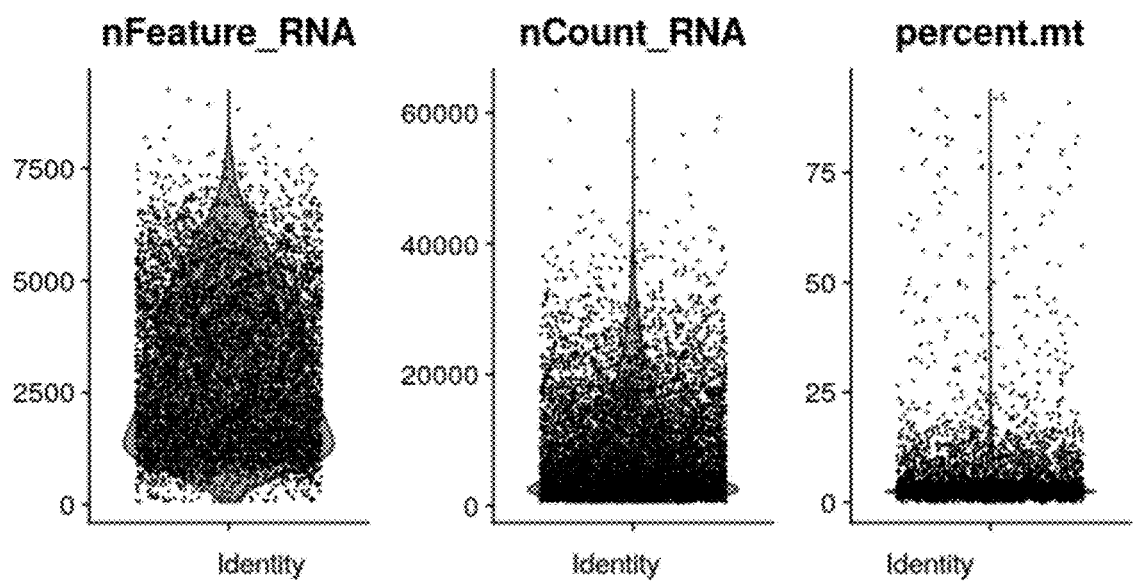
FIG. 11B is an image showing quality control of selected clonotypes for further analysis of patient ID ZNL49.
Figure 12:
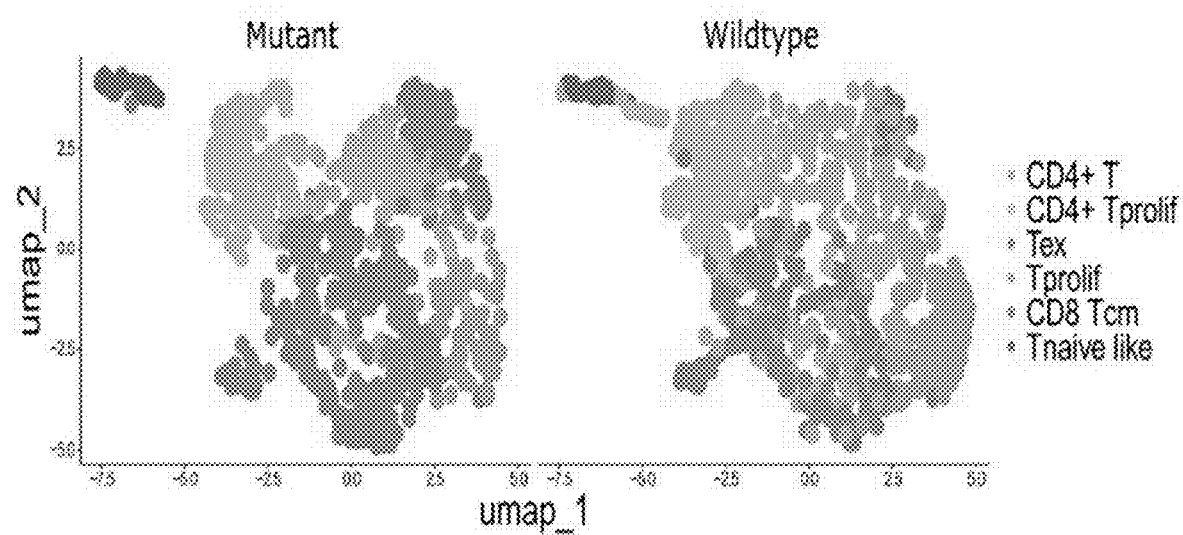
FIG. 12 is an image showing UMAP of clusters of T cell subsets of patient ID ZNC35.
Figure 13:
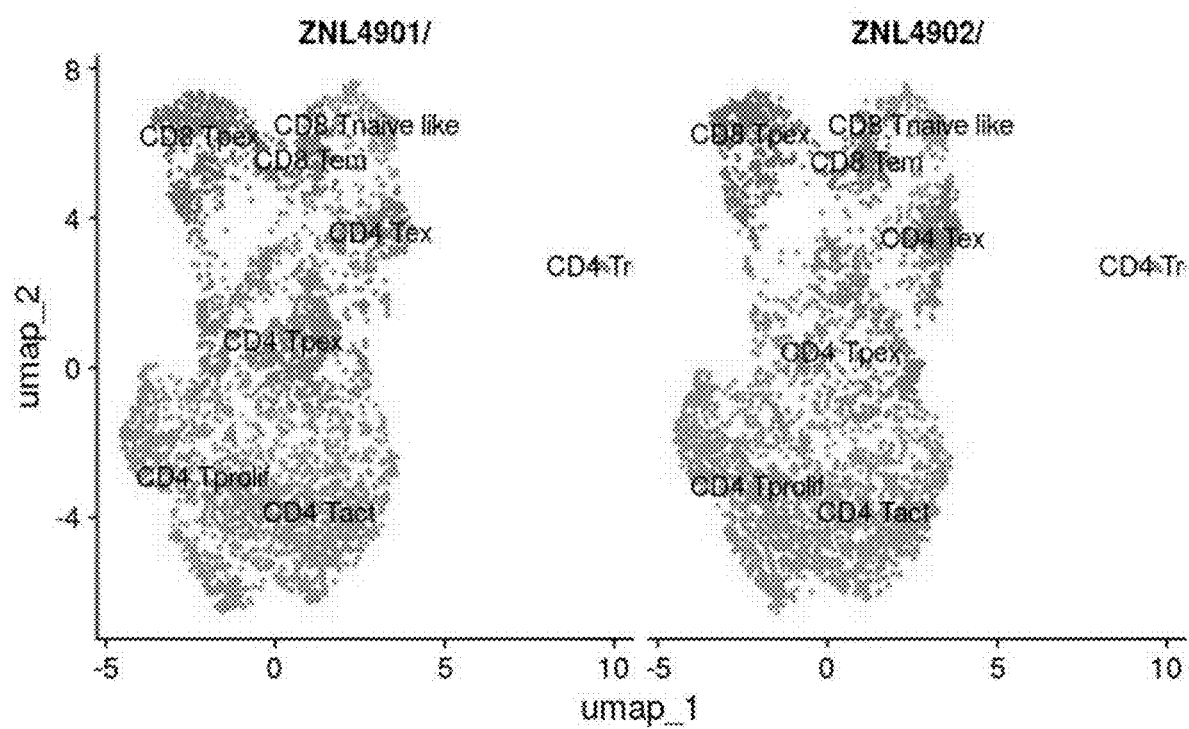
FIG. 13 is an image showing UMAP of clusters of T cells subsets of patient ID ZNL49.
Figure 14:
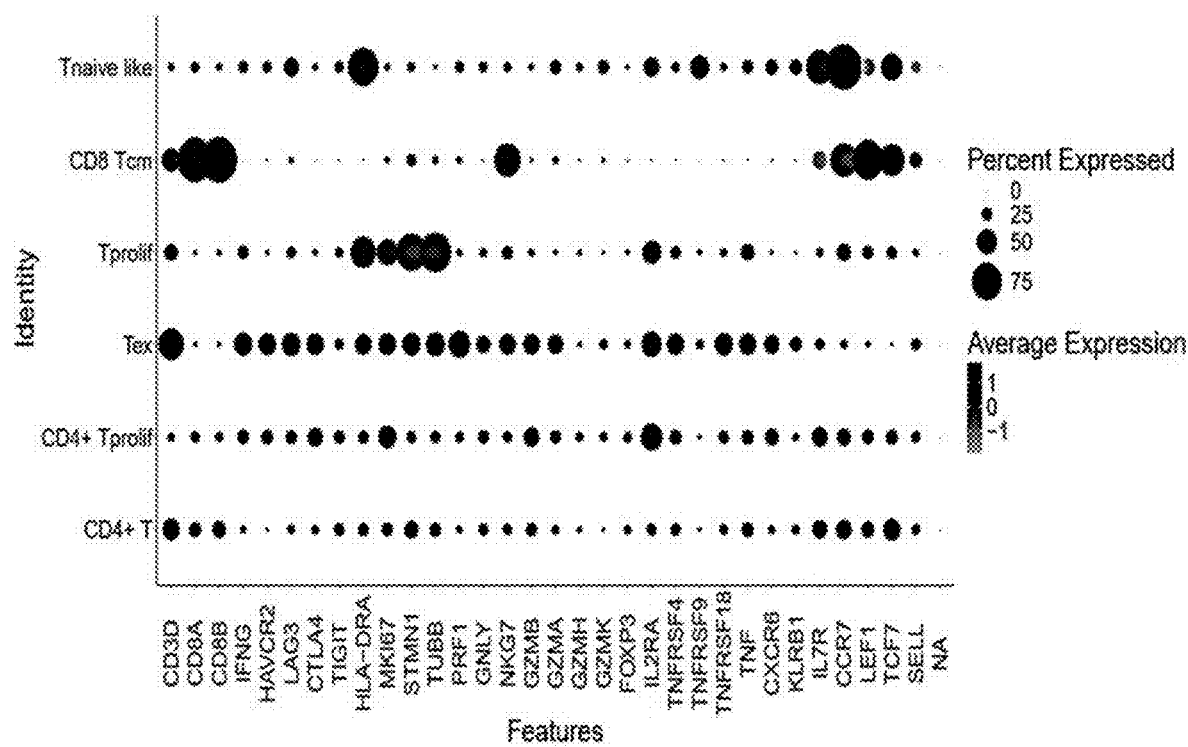
FIG. 14 is an image showing expression of top −20 genes in patient ID ZNC35.
Figure 15:
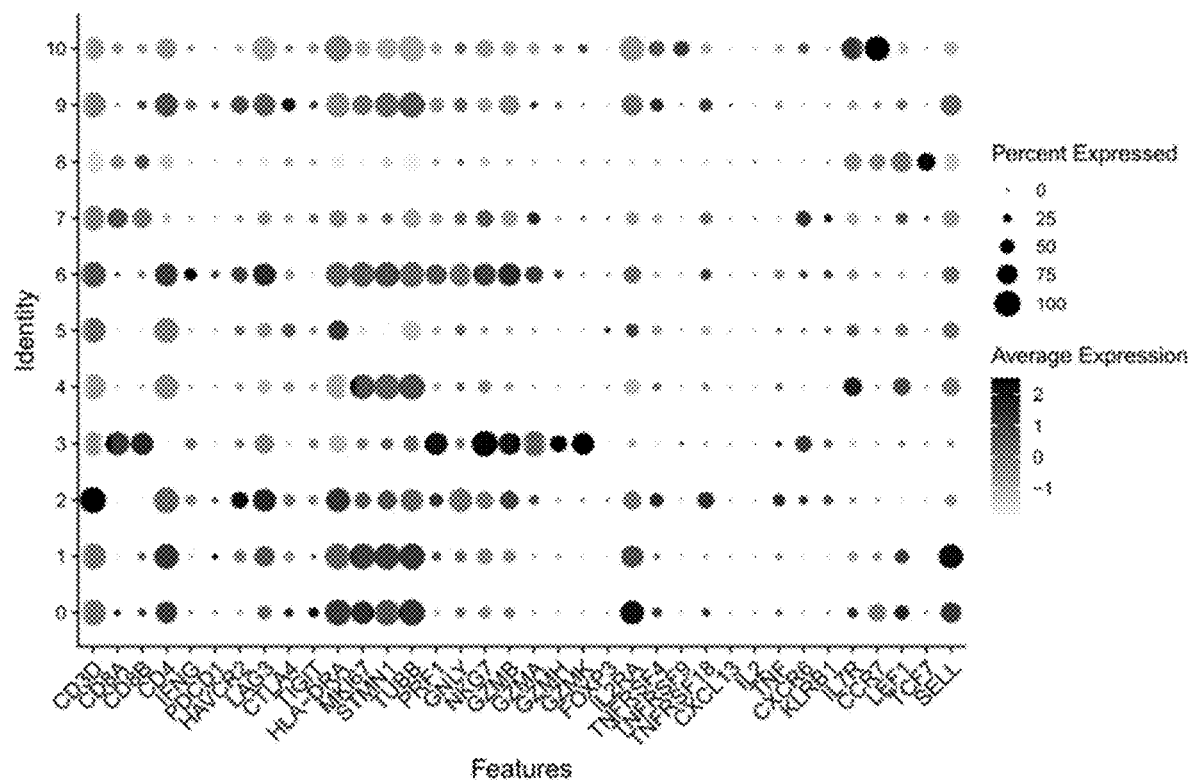
FIG. 15 is an image showing expression of top 20 genes in patient ID ZNL49.
Figure 16:
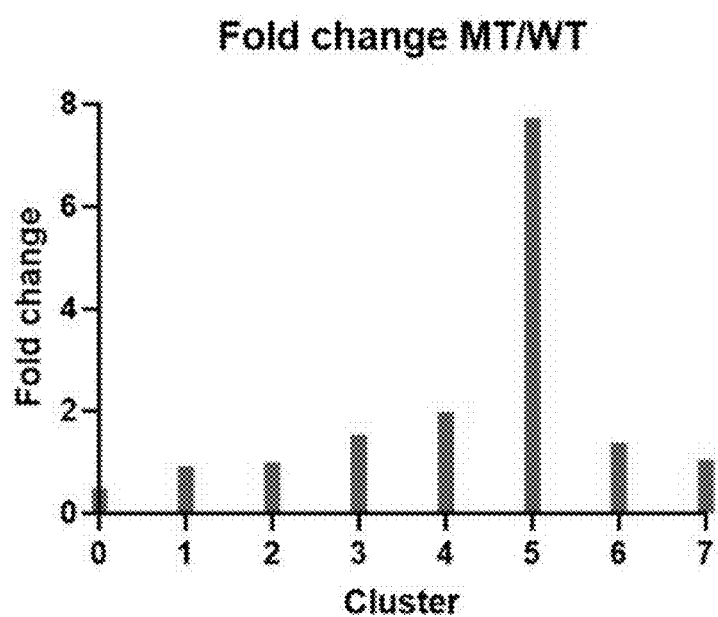
FIG. 16 is an image showing the fold change of clusters in the mutant group compared to clusters in the wild type group of patient ID ZNC35.
Figure 17:
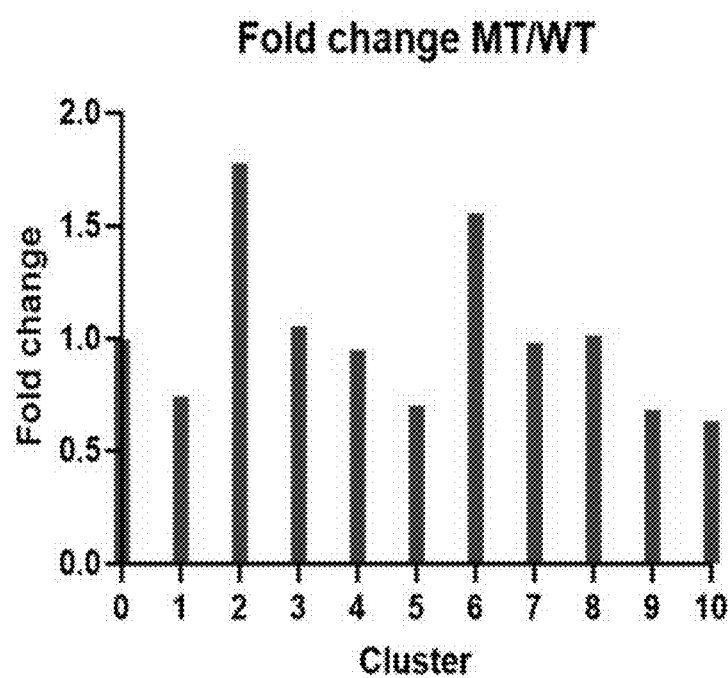
FIG. 17 is an image showing the fold change of clusters in the mutant group compared to clusters in the wild type group of patient ID ZNL49.
Figure 18:
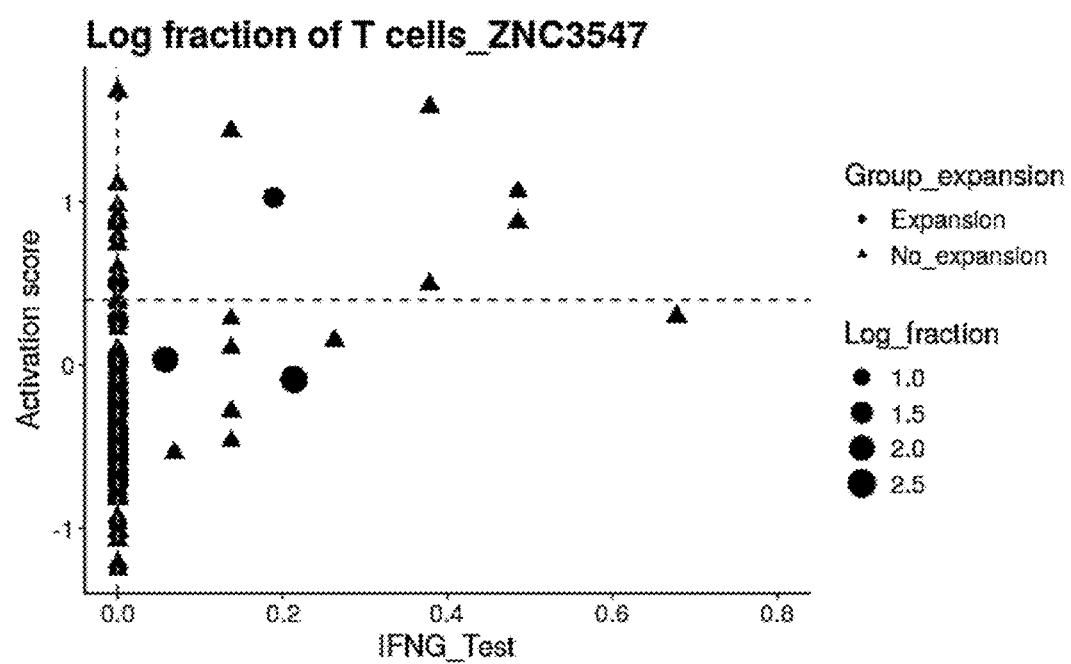
FIG. 18 is an image showing the TCR clonotypes based on their fraction, expansion, their IFNG expression and T cell activation score of TP53_R273H in patient ID ZNC35.
Figure 19:
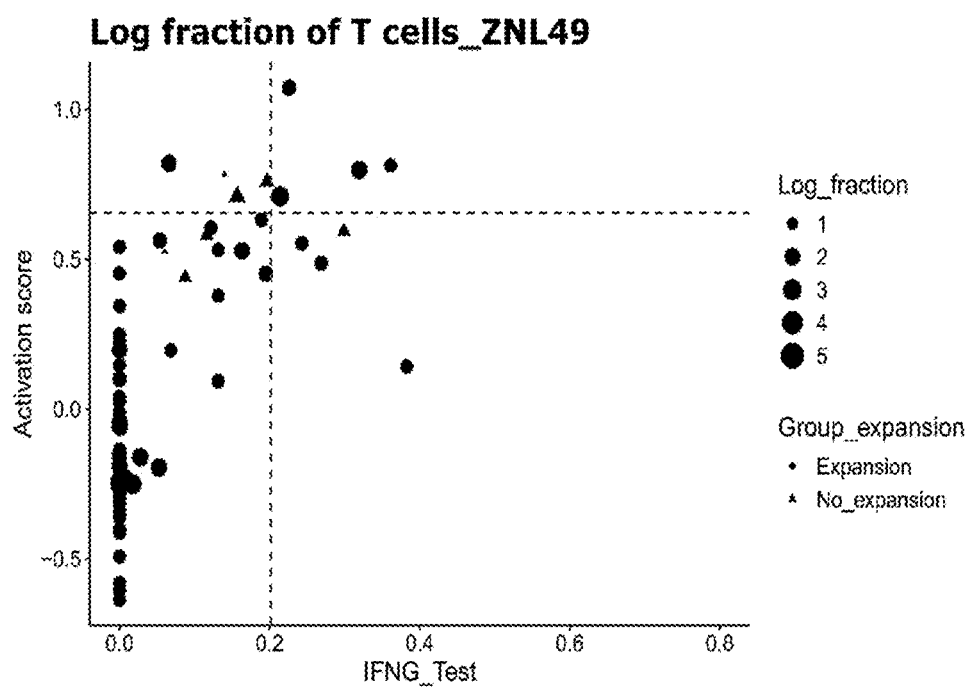
FIG. 19 is an image showing the TCR clonotypes based on their fraction, expansion, their IFNG expression and T cell activation score of TP53_V157F in patient ID ZNL49.

Performing similarly to sub-steps (b1)-(b5) of step 107 described in method 100, ranking the clonotypes based on their IFNG expression and T cell activation score, and their ratio size to identify the TCR candidates for shared neoantigen;

in which result of quality control of selected clonotypes based on 200<nFeature_RNA <6000, and percent.mt<15% from patient IDs ZNC35 and ZNL49 (as shown in FIG. 11A-11B);

wherein the performing bioinformatics analysis from patient IDs ZNC35 and ZNL49 further comprises clustering the TCR clonotypes, in which the clustering comprises grouping the TCR clonotypes by CD8 or CD4 expression, gene function of differentially expressed genes, and the level of expression of each TCR, which performed through Uniform Manifold Approximation and Projection (or UMAP) to visualize patterns of clustering in high-dimensional data (as shown in FIG. 12-13);

the results average expression of 10 genes of top 20 genes in patient IDs ZNC35 and ZNL49 associated with T cell activation (as shown in FIG. 14-15), in which the 10 genes associated consisting of IFNG, IL2, TNF, IL2RA, CD69, TNFRSF9, GZMB, GZMA, GZMK, and PRF1;

sub-step (b4), defining the clonotype as expanded in the Mutant group if the clonotype size ratio (Mutant/Wildtype) is ≥2; otherwise, it is considered non-expanded. The results showed the clusters as expanded in the mutant group compared to the wild type group in patient IDs ZNC35 and ZNL49 referred FIG. 16-17;

sub-step (b5), the result of ranking the clonotypes based on their fraction, expansion, their IFNG expression and T cell activation score of TP53_R.273H and TP53_V.157F in patient IDs ZNC35 and ZNL49 (as shown in FIG. 18-19). Referring a list of the isolated and identified TCR candidate for shared neoantigen TP53_R.273H in patient ID ZNC35 is listed in Table 7 below, and a list of the isolated and identified TCR candidate for shared neoantigen TP53_V.157F in patient ID ZNL49 is listed in Table 8 below.

TABLE 7

The list of the isolated and identified TCR candidate for shared neoantigen TP53_R.273H in patient ID ZNC35

| No. | TCR candidate for shared neoantigen TP53_R.273H | SEQ ID No. |
|---|---|---|
| 1 | TCR12.1_ZNC35348 | 135 |
| 2 | TCR32_ZNC3548 | 136 |

TABLE 8

The list of the isolated and identified TCR candidate for shared neoantigen TP53_R.273H in patient ID ZNC35

| No. | TCR candidate for shared neoantigen TP53_R.273H | SEQ ID No. |
|---|---|---|
| 1 | TCR179_ZNL4901 | 137 |
| 2 | TCR314_ZNL4901 | 138 |
| 3 | TCR61_ZNL4901 | 139 |
| 4 | TCR6_ZNL4901 | 140 |
| 5 | TCR1034_ZNL4901 | 141 |
| 6 | TCR1_ZNL4901 | 142 |

Performing similarly to step 108 described in method 100, validating the function of the TCR candidate for shared neoantigen through T cell activation bioassay using NFAT and using PBMCs to identify the neoantigen-reactive TCRs.

A first method: validating the function of the T cell receptors (TCRs) using jurkat (JKT) del beta/CD8 with nuclear factor of activated T-cells (NFAT) reporter gene comprising steps performed in the following specific order:

(d1) generating of JKT del beta/CD8/NFAT/TCR12.1 comprising:
  establishing JKT del beta stably expressing CD8 to obtain a stable JKT/CD8 cells;
  establishing JKT del beta/CD8 (JKT/CD8) expressing NFAT reporter gene (JKT/CD8/NFAT) to obtain a JKT/CD8 expressing NFAT;
  establishing JKT/CD8/NFAT cells expressing an identified TCR candidate to obtain a JKT/CD8/NFAT cells expressing TCR12.1; and
  validating the expression of the TCR on the JKT/CD8/NFAT cells by staining with a constant beta-mouse antibody;

(d2) measuring luminescence and comparing intensity between mutant and wild type peptide of the JKT/CD8/NFAT cells expressing TCR12.1 candidate to assess a TCR function, comprising:
  pulsing K562 cells expressing HLA-1 molecules, selected from the group consisting of HLA-A1101, HLA-A0206, HLA-B5401, HLA-C0102, and HLA-C0702, with peptides corresponding to TP53_R.273H;
  coculturing the peptide-pulsed K562 cells with the JKT/NFAT/TCR12.1 cells expressing the identified TCR candidate at a 2:1 effector-to-target (E:T) ratio in a 96-well plate; and
  incubating the coculture at 37° C. with 5% $CO_2$ for 6 hours.

The TCR according to the first method may be considered to have antigenic specificity for mutated TP53 peptide if a Jurkat del beta cell expressing the NFAT-luciferase reporter and the TCR produces at least twice as much luminescent signal when cocultured with HLA molecule-positive target cells pulsed with a mutated TP53 peptide, compared to the luminescent signal observed in a negative control. The negative control is prepared by performing steps (d1)-(d2) similarly, with the difference being that:

Jurkat del beta cells expressing the NFAT-luciferase reporter and the TCR, cocultured with (a) wild-type peptide and applicable HLA molecule-positive target cells pulsed with the same concentration of a wild-type peptide, or (b) DMSO; or untransduced Jurkat del beta cells (derived from Jurkat del beta cells that do not express TCR) cocultured with (a) wild-type peptide and applicable HLA molecule-positive target cells pulsed with the same concentration of a wild-type peptide, or (b) DMSO.

A second method: validating the function of identified T cell receptors (TCRs) using JKT del beta/CD8 cells to obtain a functional validation of TCRs, comprising:

(e1) generating of JKT del beta/CD8/TCR12.1 comprising:
  establishing JKT del beta stably expressing CD8 to obtain a stable JKT/CD8 cells the establishment;
  establishing JKT del beta/CD8 (JKT/CD8) cells expressing an identified TCR candidate to obtain a JKT/CD8 cells expressing TCR12.1; and
  validating the expression of the TCR on the JKT/CD8 cells by staining with a constant beta-mouse antibody;

(e2) measuring cytotoxicity of the JKT/CD8 cells expressing TCR 12.1 candidate to assess a TCR function, comprising:
  pulsing K562 cells expressing HLA-1 molecules, selected from the group consisting of HLA-A1101, HLA-A0206, HLA-B5401, HLA-C0102, and HLA-C0702, with peptides corresponding to TP53_R.273H;
  staining the peptide-pulsed K562 cells with carboxyfluorescein succinimidyl ester (CFSE);

coculturing the peptide-pulsed K562 cells with the JKT/CD8 cells expressing TCR12.1 candidate at a 5:1 effector-to-target (E:T) ratio in a 96-well plate;
incubating the coculture at 37° C. with 5% $CO_2$ for 6 hours;
collecting, washing, and staining the cells with a dead/live marker; and (e3) measuring activation markers IL2 or CD69 on the JKT/CD8 cells expressing TCR candidate to validate a TCR functionality, comprising:
pulsing K562 cells expressing HLA-1 molecules with peptides corresponding to the mutated TP53 peptide;
coculturing the peptide-pulsed K562 cells with the JKT/CD8 cells expressing TCR12.1 candidate at a 5:1 effector-to-target (E:T) ratio in a 96-well plate;
incubating the coculture at 37° C. with 5% $CO_2$ for 24 hours;
collecting, washing, and staining the JKT/CD8 cells with antibodies specific to IL2 or CD69.

The TCR according to the second method may be considered to have antigenic specificity for mutated TP53 if a jurkat del beta cell expressing the TCR secretes at least twice as much CD69 when cocultured with HLA molecule-positive target cells pulsed with a mutated TP53 peptide, compared to the IFN-γ secretion observed in a negative control. The negative control is prepared by performing steps (e1)-(e3) similarly, with the difference being that:
a jurkat del beta cells expressing the TCR, coculture with (a') wild type peptide, applicable HLA molecule positive target cells (HLA-A1101, HLA-A0206, HLA-B5401, HLA-C0102, HLA-C0702) pulsed with the same concentration of an wild type peptides or (b') DMSO; or
untransduced jurkat del beta cell (derived from a jurkat del beta cells, which do not express TCR) cocultured with (a') wild type peptide, applicable HLA molecule positive target cells pulsed with the same concentration of an wild type peptides or (b') DMSO, in which CD69 expression is measured by, for example, flow cytometry after co-culture with target cells pulsed mutated TP53.

Figure 20:
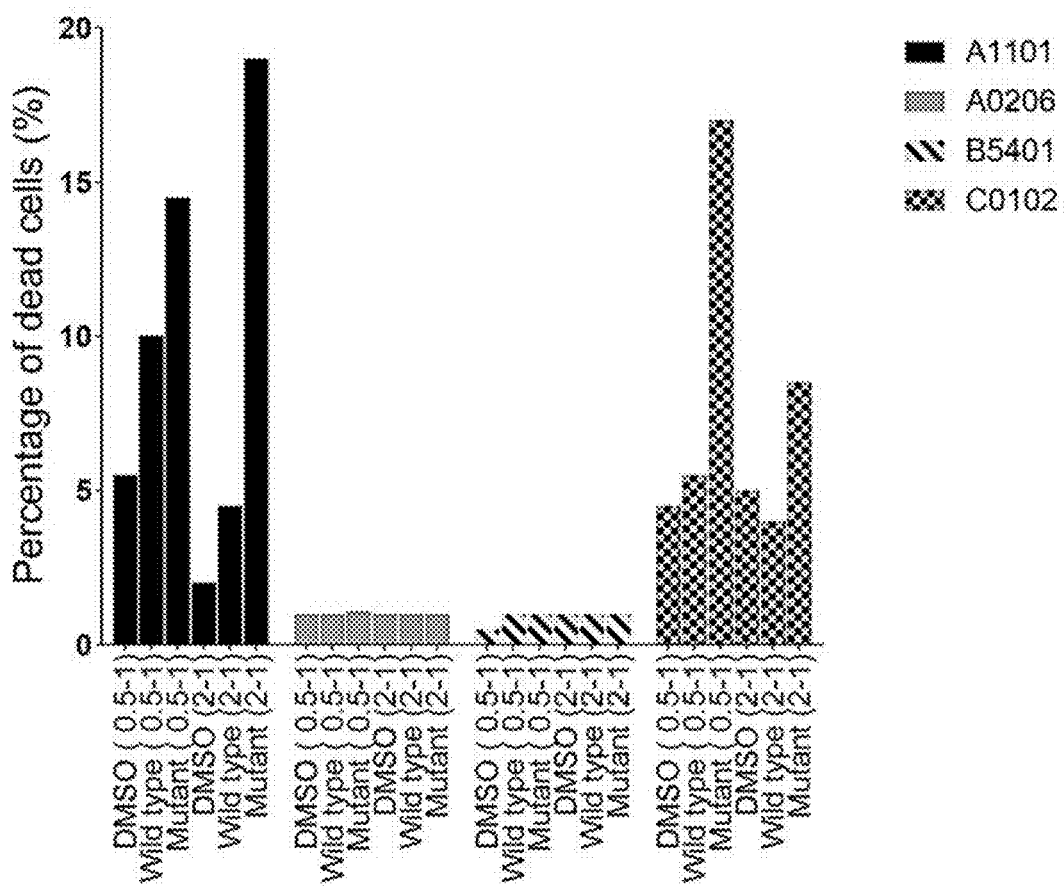
FIG. 20 is an image showing of the killing ability of TCR-transduced JKT/CD8 cells assessed at effector-to-target (E:T) ratios respectively 0.5:1 and 2:1, in which target cells (K562) expressing different HLA-I molecules, (HLA-A1101, HLA-A0206, HLA-B5401, and HLA-C0102)
Figure 21:
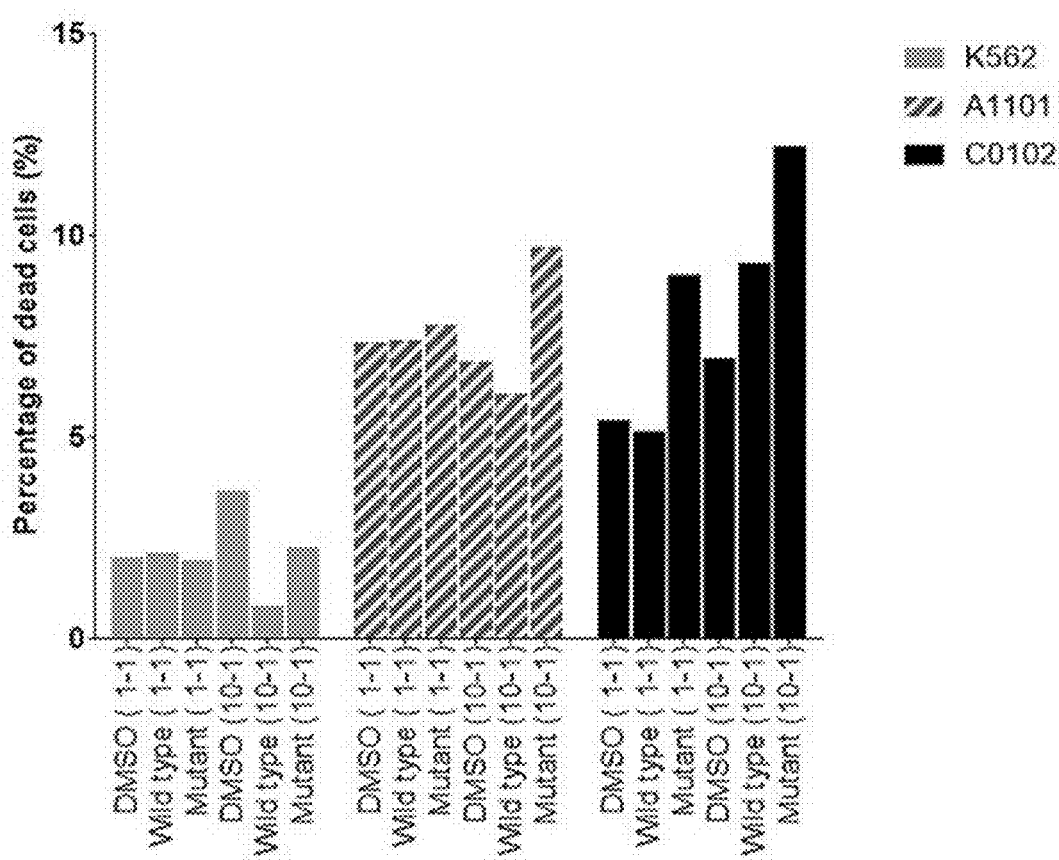
FIG. 21 is an image showing of the killing ability of TCR-transduced JKT/CD8 cells represents target cells (K562) not expressing HLA-I molecules and expressing HLA-I molecules (HLA-A1101 and HLA-C0102) assessed at different target-to-effector (T:E) ratios (1:1 and 1:10)

The test results by the second method include:
the results showed of TCR-Transduced JKT/CD8 cells to K562 expressing monoallelic HLA-A1101 that the fluorescent signal of the positive control sample had a positive CD8+ ratio (17.21%) and a positive CD4+ ratio (1.35%) higher than the negative control by 1.62% and 0.20%, respectively;
the results showed of TCR-Transduced JKT/CD8 cells to K562 expressing monoallelic HLA-B5401 that the fluorescent signal of the positive control sample had a positive CD8+ ratio (3.21%) and a positive CD4+ ratio (0.43%) higher than the negative control by 2.06% and 0.18%, respectively;
the results showed of TCR-Transduced JKT/CD8 cells to K562 expressing monoallelic HLA-A0206 that the fluorescent signal of the positive control sample had a positive CD8+ ratio (3.66%) lower than the negative control by 4.87%, but a positive CD4+ ratio (0.51%) higher than the negative control by 0.23%;
refer to FIG. 20 illustrates the killing ability of TCR-transduced JKT/CD8 cells assessed at different effector-to-target (E:T) ratios respectively 0.5:1 and 2:1, in which each plot represents target cells (K562) expressing different HLA-I molecules, (HLA-A1101, HLA-A0206, HLA-B5401, and HLA-C0102);
refer to FIG. 21 illustrates the killing ability of TCR-transduced JKT/CD8 cells assessed at different target-to-effector (T:E) ratios (1:1 and 1:10), in which each plot represents target cells (K562) expressing different HLA-I molecules, including no HLA-1, HLA-C0102, and HLA-A1101; and
the results showed the killing ability of TCR-transduced JKT/CD8 cells to K562 expressing monoallelic HLA-A1101 higher than untransduced JKT/CD8 cells, the killing ability of TCR-transduced JKT/CD8 cells to K562 expressing monoallelic HLA-B5401 also higher than untransduced JKT/CD8 cells, and the killing ability of TCR-transduced JKT/CD8 cells to K562 expressing monoallelic HLA-A0206 also higher than untransduced JKT/CD8 cells.

Finally, a third method: validating the function of an identified T cell receptor (TCR) using peripheral blood mononuclear cells (PBMCs) to obtain a functional validation of TCRs, comprising:
(f1) generating of TCR12.1-PBMC with efficiency of 50% comprising:
establishing PBMCs expressing identified TCR candidate (PBMCs/TCR12.1);
transducing PBMCs obtained from healthy donors with the lentivirus supernatants; and
validating the expression of the TCR on the transduced PBMCs by staining the cells with a constant beta-mouse antibody;
(f2) measuring cytotoxic activity of the TCR-expressing PBMCs to evaluate a TCR function, the measurement comprising:
pulsing K562 cells expressing HLA-I molecules, selected from the group consisting of HLA-A1101, and HLA-C0102 with peptides corresponding to the mutated TP53 peptide;
staining the peptide-pulsed K562 cells with carboxyfluorescein succinimidyl ester (CFSE);
coculturing the peptide-pulsed K562 cells with the TCR-expressing PBMCs at a 5:1 effector-to-target (E:T) ratio in a 96-well plate;
incubating the coculture at 37° C. with 5% $CO_2$ for 6 hours;
collecting, washing, and staining the cells with a dead/live marker; and
(f3) measuring functional markers IFNg or CD107a on the TCR-expressing PBMCs to validate a TCR functionality, comprising:
pulsing K562 cells expressing HLA-I molecules with peptides corresponding to the mutated TP53 peptide;
coculturing the peptide-pulsed K562 cells with the TCR-expressing PBMCs at a 5:1 effector-to-target (E:T) ratio in a 96-well plate;
incubating the coculture at 37° C. with 5% $CO_2$ for 24 hours;
collecting, washing, and staining the TCR-expressing PBMCs with antibodies specific to IFNg or CD107a.

The TCR according to the third method may be considered to have antigenic specificity for mutated TP53 if a T cell expressing the TCR secretes at least twice as much IFN-γ when cocultured with HLA molecule-positive target cells pulsed with a mutated TP53 peptide, compared to the IFN-γ secretion observed in a negative control. The negative control is prepared by performing steps (f1)-(f3) similarly, with the difference being that:
T cells expressing the TCR, coculture with (aa) wild type peptide, applicable HLA molecule positive target cells (HLA-A1101, HLA-A0206, HLA-B5401, HLA-C0102, HLA-C0702) pulsed with the same concentration of an wild type peptides or (bb) DMSO; or untransduced T cells (derived from PBMCs, which do not express TCR) cocultured with (aa) wild type peptide, applicable HLA molecule positive target cells pulsed with the same concentration of an wild type peptides or (bb) DMSO. The number of cells secreting IFNg may be measured by methods known in the art such as, for example, enzyme-linked immunospot (ELISpot) assay.

Figure 22A:
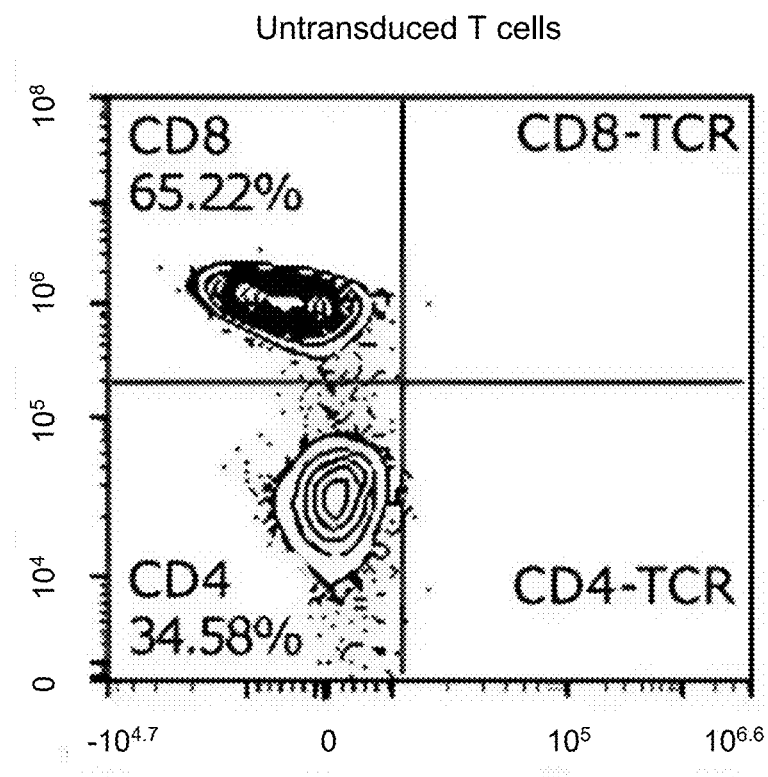
FIG. 22A is an image showing expression of the transduced TCR in PBMCs from healthy donor 1 before transduction by flow cytometry using multimer technologies and CD8, CD4, and mouse constant TCR beta staining.
Figure 22B:
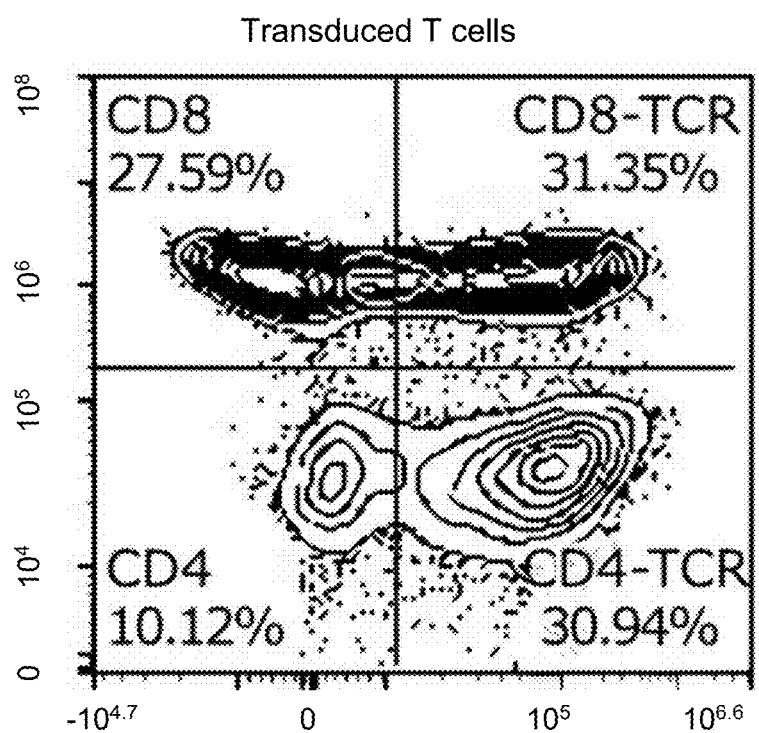
FIG. 22B is an image showing expression of the transduced TCR in PBMCs from healthy donor 1 after transduction by flow cytometry CD8 and CD4, mouse constant TCR beta staining.
Figure 23:
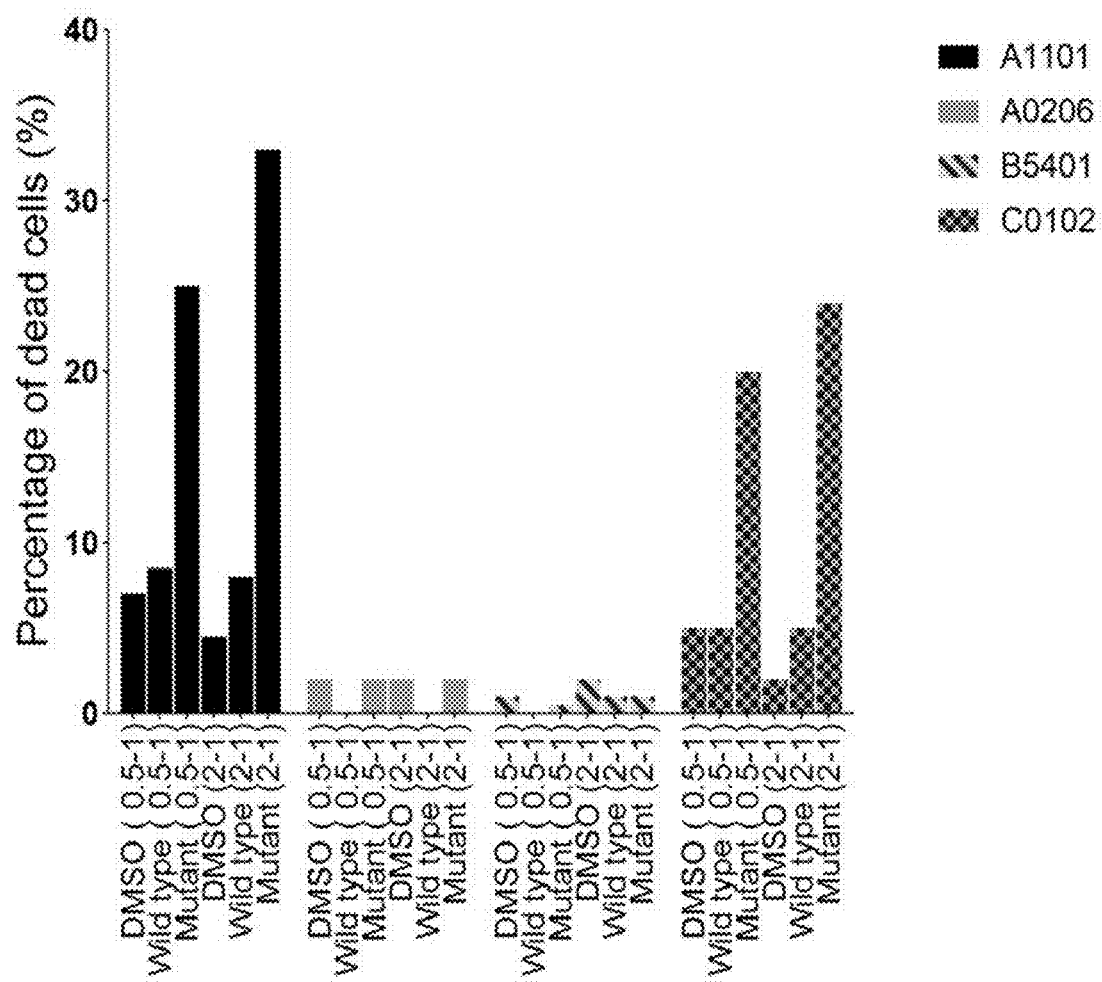
FIG. 23 is an image showing of the killing ability of TCR-transduced T cells assessed at effector-to-target (E:T) ratios respectively 0.5:1 and 2:1, in which target cells (K562) expressing different HLA-I molecules (HLA-A1101, HLA-A0206, HLA-B5401, and HLA-C0102)
Figure 24:
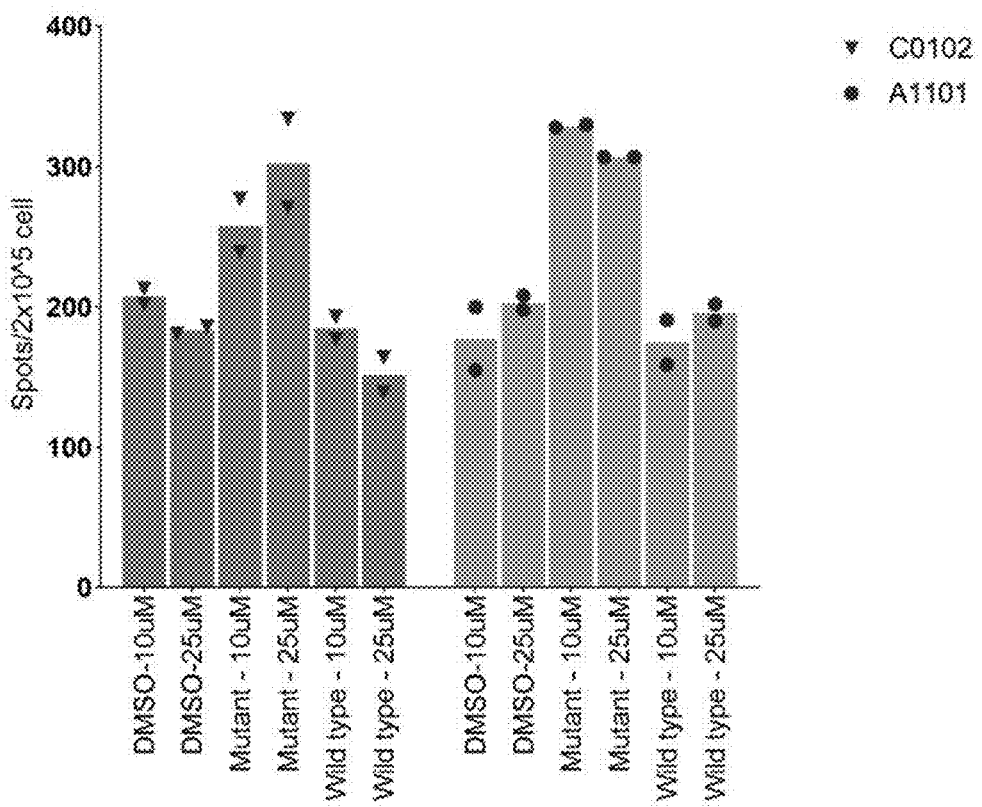
FIG. 24 is an image showing of capacity to secrete IFN-γ of the TCR-transduced T cells which cocultured with K562 expressing monoallelic HLA-A1101 or HLA-C0102 pulsed with DMSO, wild type peptides, mutant peptides with different concentration of peptides by Elispot.
Figure 25:
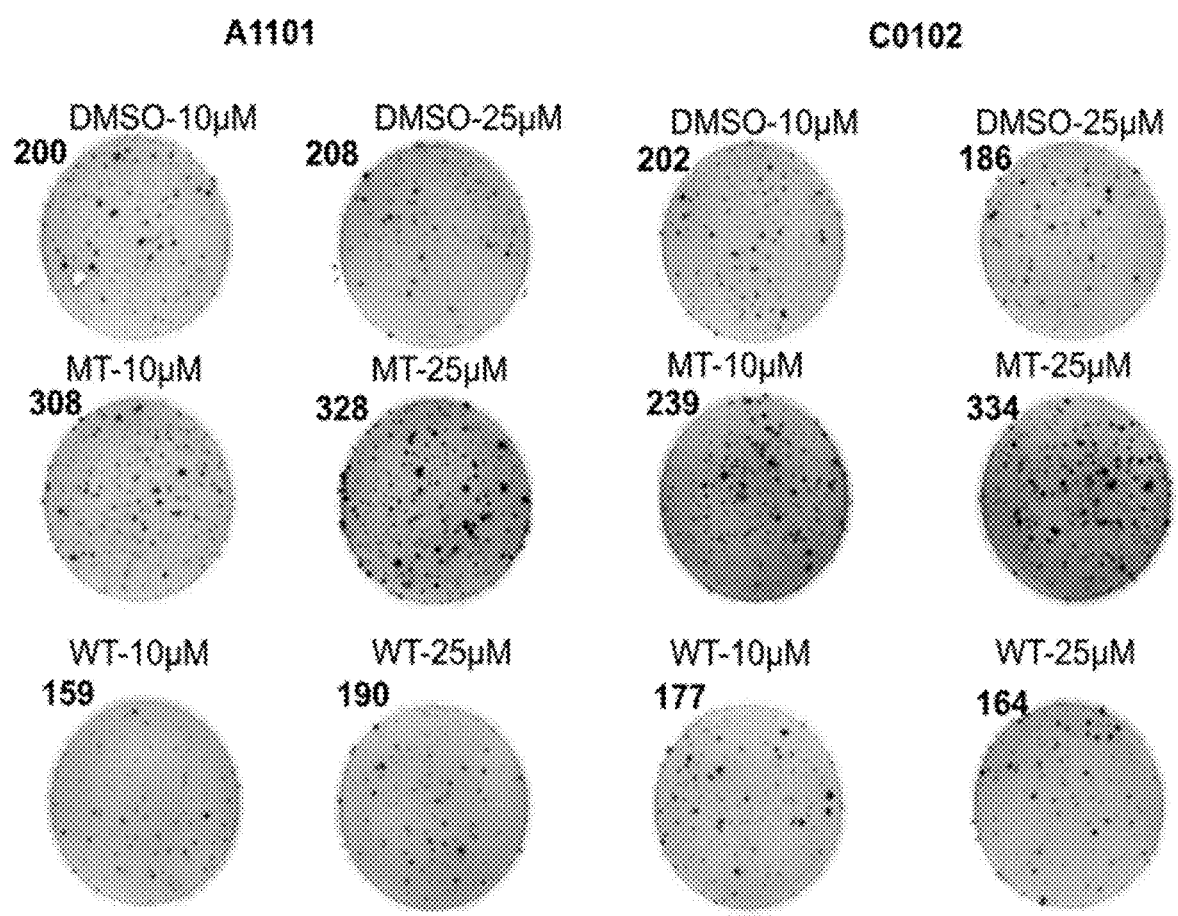
FIG. 25 is an image showing a representative ELISpot image for IFN-γ secretion, highlighting the immunogenic activity of the TCR-transduced T cells of healthy donor 1.

The efficiency of TCR transduction into PBMCs of healthy donor 1, in which the results showed of TCR-transduced PBMCs that the fluorescent signal of the positive control sample had a positive CD8+ ratio (31.35%) and a positive CD4+ ratio (30.94%) higher than the negative control by 0.05% and 0.10%, respectively (as shown in FIG. 22A-22B). Refer to FIG. 23 illustrates the killing ability of TCR-transduced T cells assessed at different effector-to-target (E:T) ratios respectively 0.5:1 and 2:1, in which each plot represents target cells (K562) expressing different HLA-I molecules (HLA-A1101, HLA-A0206, HLA-B5401, and HLA-C0102); and their capacity to secrete IFN-γ of the TCR-transduced T cells which cocultured with K562 expressing monoallelic HLA-A1101 or HLA-C0102 pulsed with DMSO, wild type peptides, mutant peptides (as shown in FIG. 24). Refer to FIG. 25 shows a representative ELISpot image for IFN-γ secretion, highlighting the immunogenic activity of the TCR-transduced T cells.

Figure 26:
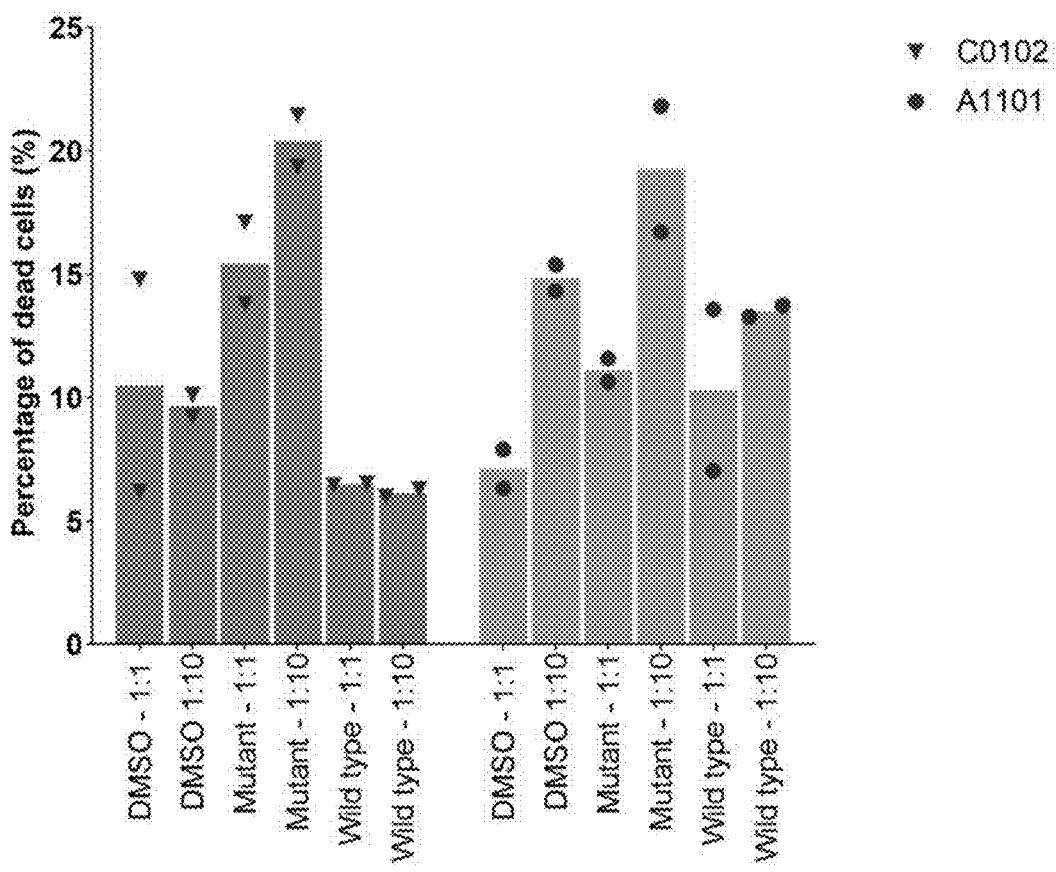
FIG. 26 is an image showing of the killing ability of TCR-transduced T cells of healthy donor 1 assessed at different target-to-effector (T:E) ratios 1:1 and 1:10, in which target cells (K562) expressing different HLA-I molecules, including HLA-I is HLA-A1101 or HLA-C0102 pulsed with DMSO, wild type peptides, mutant peptides.

The TCR according to the third method may be considered to have antigenic specificity for mutated TP53 if T cells expressing the TCR kill target cells expressing HLA-A1101, or HLA-C0102 as measured by, for example, flow cytometry after co-culture with target cells pulsed mutated TP53. Refer to FIG. 26 illustrates the killing ability of TCR-transduced T cells assessed at different target-to-effector (T:E) ratios (1:1 and 1:10), in which each plot represents target cells (K562) expressing different HLA-I molecules, including HLA-I is HLA-A1101 or HLA-C0102 pulsed with DMSO, wild type peptides, mutant peptides.

Figure 27A:
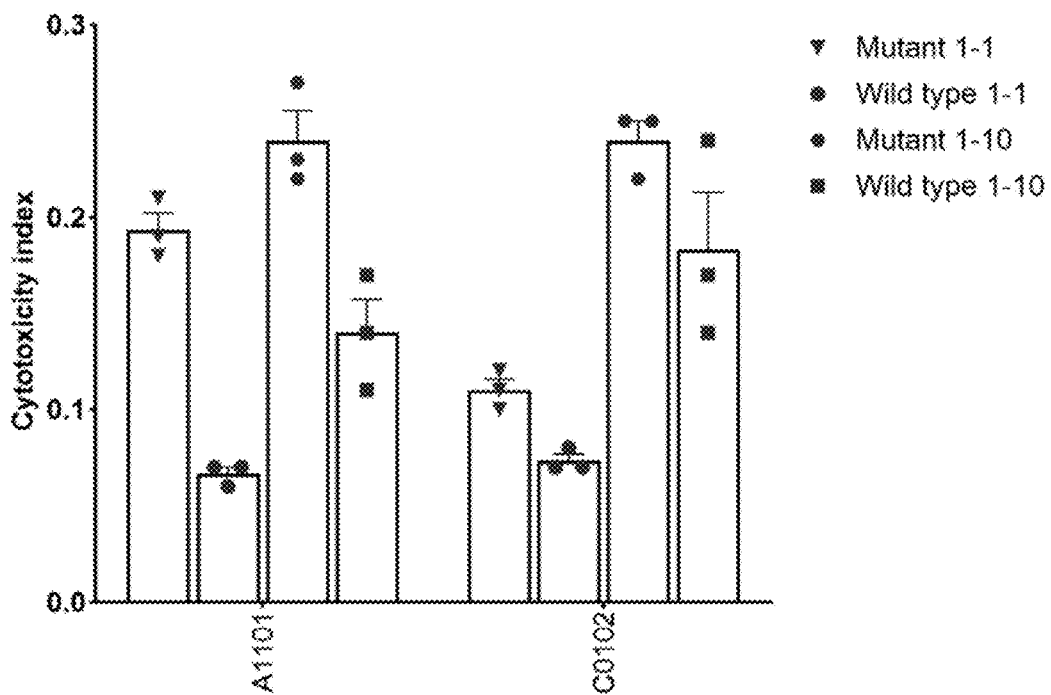
FIG. 27A is an image showing the killing ability of TCR-transduced T cells from healthy donor 2, assessed at different target-to-effector (T:E) ratios (1:1 and 1:10). The targets express monoallelic HLA-A11:01 or HLA-C01:02 and were pulsed with the mutant peptide, the wild-type peptide.
Figure 27B:
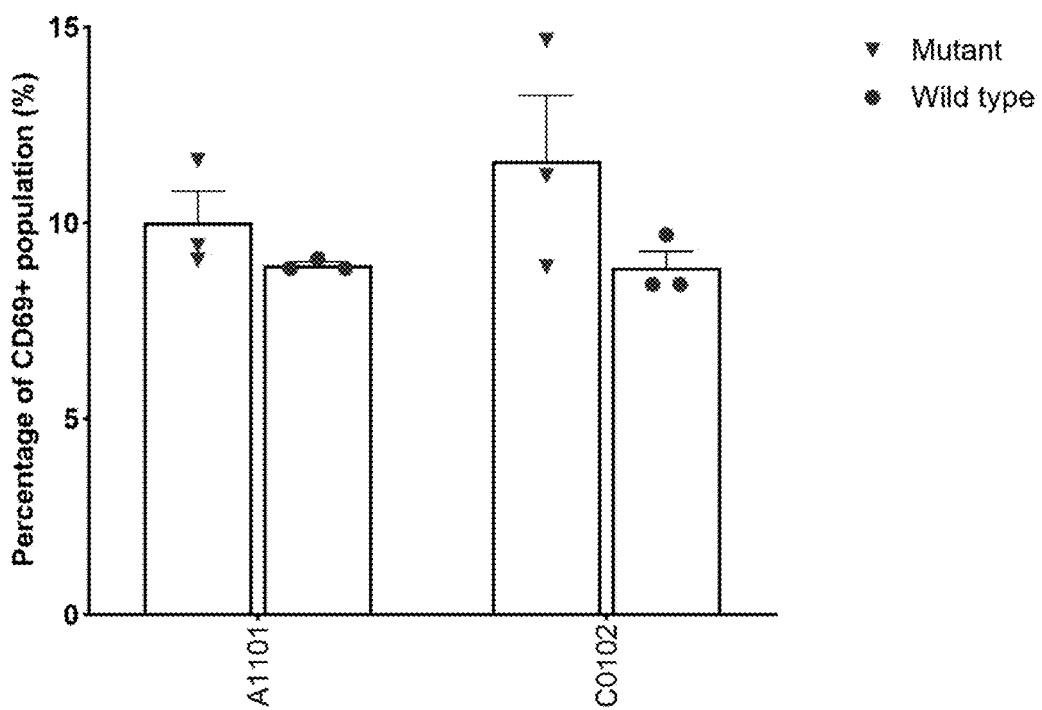
FIG. 27B is an image showing CD69 expression of the TCR-transduced T cells of healthy donor 2. The targets express monoallelic HLA-A1101 or HLA-C0102 and were pulsed with the mutant peptide, the wild type peptide.

The killing ability of TCR-transduced into T cells of healthy donor 2 assessed at different target-to-effector (T:E) ratios (as shown in FIG. 27A), and the CD69 expression of TCR-transduced T cells cocultured with target cells pulsed with peptides, highlighting their activation status (as shown in FIG. 27B).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, element components, and/or groups thereof.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order, or steps may be added, deleted, or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method for identifying a shared neoantigen-reactive T cell receptor (TCR), comprising steps performed in the following specific order:
   (A) collecting and processing sample of a subject with a cancer, comprising:
      isolating peripheral blood mononuclear cells (PBMCs) from peripheral blood sample from the subject with cancer; and
      employing next-generation genomic and transcriptomic sequencing on a sample of tumor tissue and white blood cells, and using bioinformatic analysis to obtain a plurality of mutation sequences and a plurality of wild-type sequences corresponding to the mutant sequences;
   (B) selecting the mutation sequences at step (A) presented in a collection of 67 off-the-shelf peptides to obtain a shared neoantigen; wherein the collection of 67 off-the-shelf peptides consists of KRAS_p.G13D, KRAS_p.G12V, KRAS_p.G12A, KRAS_p.G12D, KRAS_p.G12C, CDX2_p.V306X, RNF43_p.G659X, TP53_p.R282W, TP53_p.R273H, TP53_p.R248Q, TP53_p.R175H, GNAS_p.R201H, PIK3CA_p.E545K, BRAF_p.V640E, TCF7L2_p.R471C, ATM_p.A2301X, POU2AF1_p.A226V, KRAS_p.G12S, CHD4_p.K73X, TP53_p.E286K, TP53_p.Y220C, TP53_p.C176F, TP53_p.A159P, TP53_p.V157F, CIC_p.T1740M, ELK4_p.S359X, ARID1A_p.K1071X, BARD1_p.K171X, PIK3CA_p.V344G, PIK3CA_p.E542K, AKAP9_p.SE1650-1651 SX, TCF7L2_p.H198X, ATM_p.V60X, BCL9L_p.Q452X, NCOR2_p.P975X, KRAS_p.A146T, BRCA2_p.Q1782X, CDK12_p.R663C, TP53_p.R273C, SMAD4_p.G30X, SMAD4_p.R361H, MTOR_p.S2215F, ATP1A1_p.G98X, ARID1A_p.S764SX, ARIDIA_p.G1848X, ASXL1_p.G643X, GNAS_p.R201C, ERG_p.446-447X, AMER1_p.F173X, DCTN1_p.R1173H, PIK3CA_p.R88Q, PIK3CA_p.R357Q, PIK3CA_p.E545A, PIK3CA_p.E970K, FAT4_p.L3V, FBXW7_p.S582L, FBXW7_p.R465H, PDGFRA_p.R151H, APC_p.M1413X, APC_p.KR1462-1463X, IL7R_p.K119X, IL6ST_p.K529X, BRAF_p.D634N, BRAF_p.G509V, EGFR_p.L858R, AKAP9_p.K37X, and UBR5_p.R1331C;
   (C) synthesizing a long peptide corresponding to a panel of shared neoantigen and its corresponding wild type peptides;
   (D) stimulating the PBMCs with the long synthetic peptide to obtain a stimulated PBMC, comprising the following steps:
      (i) thawing frozen PBMCs in activated immune cell medium-v media supplemented with 10% fetal bovine serum (FBS) and 1 μg/mL deoxyribonuclease I (DNase I) solution;
      (ii) allowing $10^5$ PBMCs to rest in 96-round bottom well-plate containing activated immune cell medium-v media supplemented with 10% FBS, 10 mM N-2-hydroxyethylpiperazine-N'-2-ethanesulfonic acid (HEPES), and 50 μM β-mercaptoethanol overnight before stimulation with synthesized long peptide at a concentration of 5 μM in a humidified incubator at 37° C. with 5% $CO_2$;
      (iii) further stimulating PBMCs with 2000 IU/mL granulocyte-macrophage colony-stimulating factor (GM-CSF) and 1000 IU/mL interleukin-4 (IL-4) for 24 hours;
      (iv) adding 100 ng/mL LPS and 10 ng/mL IFN-y to the PBMCs along with the peptide for an additional 12 hours; and
      (v) restimulating PBMCs by adding 10 ng/mL interleukin-7 (IL-7), 10 ng/mL interleukin-15 (IL-15), and 10 ng/mL interleukin-21 (IL-21) to the PBMCs, in which the step (v) is repeated three times and each time is 3 days apart;
   (E) screening the stimulated PBMC based on induction of IFN-γ secretion of neoantigen-specific T cells, wherein the mutant peptides induced twofold higher T cell responses than corresponding wild-type sequences;
   (F) isolating a neoantigen-specific T cell from the screened stimulated PBMC to identify a clonotype-purified cell, comprising steps (a1) to (a7):
      (a1) determining the viability of the stimulated PBMC using a hemocytometer to ensure viability above 90%, and adjusting a cell concentration to between 700-1,200 cells per microliter to obtain a uniform PBMC suspension;
      (a2) mixing the uniform PBMC suspension at step (a1) with a reverse transcription (RT) master mix to obtain a cell-master mix solution, then loading the cell-master mix solution onto a microfluidic device configured to partition individual cells into emulsions for unique nucleic acid barcoding, wherein the loading is performed along with barcoded 5' gel beads and partitioning oil to obtain single-cell gel beads in emulsion (GEMs); and
      (a3) performing cell lysis and barcoded reverse transcription of RNA within each of the GEMs to obtain a barcoded complementary DNA (cDNA);
      (a4) producing and validating cDNA of gene expression library and VDJ library, comprising:
         recovering the barcoded cDNA from the GEMs at step (a3) to obtain a cDNA sample;
         amplifying the cDNA sample using polymerase chain reaction (PCR) to obtain an amplified cDNA; and
         assessing the quality of the amplified cDNA using sensitivity-based screening systems to obtain a validated cDNA;
      (a5) constructing sequencing libraries, comprising:
         utilizing the validated cDNA at step (a4) to prepare 5' gene expression libraries;
         indexing each library with a sample indexing system to obtain an indexed gene expression library; and
         sequencing the indexed gene expression library on a sequencing platform to generate at least 30,000 read pairs per cell with paired-end reads of 2×300 base pairs;
      (a6) enriching and sequencing V(D)J regions, and RNA transcriptomic profile comprising:
         using the libraries generated in step (a5) to amplify full-length variable (V), diversity (D), and joining (J) segments of T cell receptor (TCR) alpha and beta chains using an enrichment system to obtain an enriched TCR product;
         quantifying the enriched TCR product obtained from the amplification using sensitivity-based quantification systems to produce a quantified enriched TCR product;

preparing sequencing libraries using 50 ng of the quantified enriched TCR product to produce a TCR sequencing library; and sequencing the TCR sequencing library on a sequencing platform to generate paired-end reads of 2×300 base pairs with a depth of 5,000 read pairs per cell; and (a7) performing bioinformatics analyses on the single cell gene expression data to identify the clonotype-purified cell, comprising:

retaining cells with available clonotype information; and excluding cells with mitochondrial genome-derived reads exceeding 15%, more than 7,000 detected genes, or more than two TRA (T-cell receptor alpha locus) or TRB (T-cell receptor beta locus) sequences to obtain the clonotype-purified cell;

(G) identifying a TCR candidate for shared neoantigen by performing steps (b1) to (b5):

(b1) isolating CD3+ T cells from both mutant and wild-type groups by a combination of positive selection for CD3+ cells and filtering based on gene expression and mitochondrial gene expression;

(b2) defining a T cell activation score based on the average expression of 10 genes associated with T cell activation for each T cell, in which the 10 genes associated consist of interferon gamma (IFNG), interleukin-2 (IL-2), tumor necrosis factor (TNF), interleukin-2 receptor alpha (IL2RA), cluster of differentiation 69 (CD69), TNF receptor superfamily member 9 (TNFRSF9), granzyme B (GZMB), granzyme A (GZMA), granzyme K (GZMK), and perforin 1 (PRF1);

(b3) normalizing the size of TCR clonotypes stimulated by mutant sequences relative to the corresponding wild-type sequences; wherein, if any TCR clonotype is stimulated only by mutant sequences and is not found in the sample stimulated by the corresponding wild-type sequences, its size is calculated by taking the smallest size of the TCR clonotype stimulated by the wild-type sequences;

(b4) calculating a ratio size of each TCR clonotype from group which is stimulated by mutant sequences compared to the corresponding wild-type sequences; and (b5) ranking the clonotypes based on their IFNG expression and T cell activation score at step (b2), and their ratio size at step (b4) to identify the TCR candidate for shared neoantigen;

(H) evaluating antigenic specificity of the TCR candidate for shared neoantigen through T cell activation bioassay using Nuclear Factor of Activated T cells (NFAT) system and using PBMCs or jurkat (JKT) del beta/CD8 to identify a shared neoantigen-reactive TCR, comprising the following steps;

(c1) co-culturing a) a reporter T cell comprising a TCR candidate for shared neoantigen expression cassette, and b) an antigen presenting cell (APC) that expresses the shared neoantigen sequence and a human leukocyte antigen (HLA) sequence from the subject with cancer;

wherein the reporter T cell is a jurkat del beta cell; and wherein the TCR candidate for shared neoantigen expression cassette comprises a TCR candidate sequence reconstructed from TCR α and β chain sequences;

(c2) identifying a positive reporter signal in the reporter T cell to identify the neoantigen-reactive TCR;

wherein the shared neoantigen-reactive TCR comprises a sequence selected from the group consisting of SEQ ID NOs:135 to 142.

2. The method of claim 1, wherein step (c1) the HLA sequence is encoded by any one of the following loci: HLA-A, HLA-B, and HLA-C.

3. The method of claim 1, wherein step (c1) the HLA sequence is selected from the group consisting of HLA-A1101, HLA-A0206, HLA-B5401, HLA-C0102, HLA-B0705, HLA-C1203, HLA-B1532, and HLA-C0702.

4. The method of claim 1, wherein step (c1) the APC is a K562 cell which expresses a CD80 molecule.

5. The method of claim 1, wherein the cancer is selected from lung cancer, and colorectal cancer.

6. The method of claim 1, wherein at step (c1) the reporter T cell and the APC are co-cultured in a ratio of 2:1 or 5:1 or 0.5:1 with 5% $CO_2$ at 37° C. for 6 hours or 24 hours.

7. The method of claim 1, wherein the shared neoantigen-reactive TCR binds to a shared neoantigen/HLA complex;

wherein the shared neoantigen comprises TP53_p.R273H, and TP53_p.V157F;

wherein the HLA is selected from the group consisting of HLA-A1101, HLA-A0206, HLA-B5401, HLA-C0102, HLA-B0705, HLA-C1203, HLA-B1532, and HLA-C0702.

8. The method of claim 7, wherein the shared neoantigen-reactive TCR binds to the shared neoantigen/HLA complex;

in which the shared neoantigen is TP53_p.R273H, wherein the TP53_p.R273H comprises a sequence selected from the group consisting of SEQ ID NOs:9, 160, 162, 164, and 166; and in which the HLA is selected from the group consisting of HLA-A1101, HLA-A0206, HLA-B5401, HLA-C0102, and HLA-C0702.

9. The method of claim 8, wherein the HLA is selected from the group consisting of HLA-A1101, and HLA-C0102.

10. The method of claim 7, wherein the shared neoantigen-reactive TCR binds to the shared neoantigen/HLA complex;

in which the shared neoantigen is TP53_p.V157F, wherein the TP53_p.V157F comprises a sequence selected from the group consisting of SEQ ID NOs:24, 168, 170, 172, and 174; and in which the HLA is selected from the group consisting of HLA-A1101, HLA-B0705, HLA-C0702, HLA-C1203, and HLA-B1532.

11. The method of claim 10, wherein the HLA is HLA-A1101.

12. A shared neoantigen-reactive T cell receptor (TCR) comprising a sequence selected from the group consisting of SEQ ID NOs:135 to 142, wherein the neoantigen-reactive TCR is identified by a method comprising the following steps:

(A) collecting and processing sample of a subject with a cancer, comprising:

isolating peripheral blood mononuclear cells (PBMCs) from peripheral blood sample from the subject with cancer; and employing next-generation genomic and transcriptomic sequencing on a sample of tumor tissue and white blood cells, and using bioinformatic analysis to obtain a plurality of mutation sequences and a plurality of wild-type sequences corresponding to the mutant sequences;

wherein the cancer is selected from lung cancer, and colorectal cancer;

(B) selecting the mutation sequences at step (A) presented in a collection of 67 off-the-shelf peptides to obtain a shared neoantigen; wherein the collection of 67 off-the-shelf peptides consists of KRAS_p.G13D, KRAS_p.G12V, KRAS_p.G12A, KRAS_p.G12D, KRAS_p.G12C, CDX2_p.V306X, RNF43_p.G659X, TP53_p.R282W, TP53_p.R273H, TP53_p.R248Q, TP53_p.R175H, GNAS_p.R201H, PIK3CA_p.E545K, BRAF_p.V640E, TCF7L2_p.R471C, ATM_p.A2301X, POU2AF1_p.A226V, KRAS_p.G12S, CHD4_p.K73X, TP53_p.E286K, TP53_p.Y220C, TP53_p.C176F, TP53_p.A159P, TP53_p.V157F, CIC_p.T1740M, ELK4_p.S359X, ARID1A_p.K1071X, BARD1_p.K171X, PIK3CA_p.V344G, PIK3CA_p.E542K, AKAP9_p.SE1650-1651 SX, TCF7L2_p.H198X, ATM_p.V60X, BCL9L_p.Q452X, NCOR2_p.P975X, KRAS_p.A146T, BRCA2_p.Q1782X, CDK12_p.R663C, TP53_p.R273C, SMAD4_p.G30X, SMAD4_p.R361H, MTOR_p.S2215F, ATP1A1_p.G98X, ARID1A_p.S764X, ARIDIA_p.G1848X, ASXL1_p.G643X, GNAS_p.R201C, ERG_p.446-447X, AMER1_p.F173X, DCTN1_p.R1173H, PIK3CA_p.R88Q, PIK3CA_p.R357Q, PIK3CA_p.E545A, PIK3CA_p.E970K, FAT4_p.L3V, FBXW7_p.S582L, FBXW7_p.R465H, PDGFRA_p.R151H, APC_p.M1413X, APC_p.KR1462-1463X, IL7R_p.K119X, IL6ST_p.K529X, BRAF_p.D634N, BRAF_p.G509V, EGFR_p.L858R, AKAP9_p.K37X, and UBR5_p.R1331C;

(C) synthesizing a long peptide corresponding to a panel of shared neoantigen and its corresponding of wild type peptides;

(D) stimulating the PBMCs with the long synthetic peptide to obtain a stimulated PBMC, comprising the following steps:
  (i) thawing frozen PBMCs in activated immune cell medium-v media supplemented with 10% fetal bovine serum (FBS) and 1 µg/mL deoxyribonuclease I (DNase I) solution;
  (ii) allowing $10^5$ PBMCs to rest in 96-round bottom well-plate containing activated immune cell medium-v media supplemented with 10% FBS, 10 mM N-2-hydroxyethylpiperazine-N'-2-ethanesulfonic acid (HEPES), and 50 µM β-mercaptoethanol overnight before stimulation with synthesized long peptide at a concentration of 5 µM in a humidified incubator at 37° C. with 5% C02;
  (iii) further stimulating PBMCs with 2000 IU/mL granulocyte-macrophage colony-stimulating factor (GM-CSF) and 1000 IU/mL interleukin-4 (IL-4) for 24 hours;
  (iv) adding 100 ng/mL LPS and 10 ng/mL IFN-y to the PBMCs along with the peptide for an additional 12 hours; and
  (v) restimulating PBMCs by adding 10 ng/mL interleukin-7 (IL-7), 10 ng/mL interleukin-15 (IL-15), and 10 ng/mL interleukin-21 (IL-21) to the PBMCs, in which the step (v) is repeated three times and each time is 3 days apart;

(E) screening the stimulated PBMC based on induction of IFN-γ secretion of neoantigen-specific T cells, wherein the mutant peptides induced twofold higher T cell responses than corresponding wild-type sequences;

(F) isolating a neoantigen-specific T cell from the screened stimulated PBMC to identify a clonotype-purified cell, comprising steps (a1) to (a7):
  (a1) determining the viability of the stimulated PBMC using a hemocytometer to ensure viability above 90%, and adjusting a cell concentration to between 700-1,200 cells per microliter to obtain a uniform PBMC suspension;
  (a2) mixing the uniform PBMC suspension at step (a1) with a reverse transcription (RT) master mix to obtain a cell-master mix solution, then loading the cell-master mix solution onto a microfluidic device configured to partition individual cells into emulsions for unique nucleic acid barcoding, wherein the loading is performed along with barcoded 5' gel beads and partitioning oil to obtain single-cell gel beads in emulsion (GEMs); and
  (a3) performing cell lysis and barcoded reverse transcription of RNA within each of the GEMs to obtain a barcoded complementary DNA (cDNA);
  (a4) producing and validating cDNA of gene expression library and VDJ library, comprising:
    recovering the barcoded cDNA from the GEMs at step (a3) to obtain a cDNA sample;
    amplifying the cDNA sample using polymerase chain reaction (PCR) to obtain an amplified cDNA; and
    assessing the quality of the amplified cDNA using sensitivity-based screening systems to obtain a validated cDNA;
  (a5) constructing sequencing libraries, comprising:
    utilizing the validated cDNA at step (a4) to prepare 5' gene expression libraries;
    indexing each library with a sample indexing system to obtain an indexed gene expression library; and
    sequencing the indexed gene expression library on a sequencing platform to generate at least 30,000 read pairs per cell with paired-end reads of 2×300 base pairs;
  (a6) enriching and sequencing V(D)J regions, and RNA transcriptomic profile comprising:
    using the libraries generated in step (a5) to amplify full-length variable (V), diversity (D), and joining (J) segments of T cell receptor (TCR) alpha and beta chains using an enrichment system to obtain an enriched TCR product;
    quantifying the enriched TCR product obtained from the amplification using sensitivity-based quantification systems to produce a quantified enriched TCR product;
    preparing sequencing libraries using 50 ng of the quantified enriched TCR product to produce a TCR sequencing library; and
    sequencing the TCR sequencing library on a sequencing platform to generate paired-end reads of 2×300 base pairs with a depth of 5,000 read pairs per cell; and
  (a7) performing bioinformatics analyses on the single cell gene expression data to identify the clonotype-purified cell, comprising:
    retaining cells with available clonotype information; and
    excluding cells with mitochondrial genome-derived reads exceeding 15%, more than 7,000 detected genes, or more than two TRA (T-cell receptor alpha locus) or TRB (T-cell receptor beta locus) sequences to obtain the clonotype-purified cell;

(G) identifying a TCR candidate for shared neoantigen by performing steps (b1) to (b5):
(b1) isolating CD3+ T cells from both mutant and wild-type groups by a combination of positive selection for CD3+ cells and filtering based on gene expression and mitochondrial gene expression;
(b2) defining a T cell activation score based on the average expression of 10 genes associated with T cell activation for each T cell, in which the 10 genes associated consist of interferon gamma (IFNG), interleukin-2 (IL-2), tumor necrosis factor (TNF), interleukin-2 receptor alpha (IL2RA), cluster of differentiation 69 (CD69), TNF receptor superfamily member 9 (TNFRSF9), granzyme B (GZMB), granzyme A (GZMA), granzyme K (GZMK), and perforin 1 (PRF1);
(b3) normalizing the size of TCR clonotypes stimulated by mutant sequences relative to the corresponding wild-type sequences; wherein, if any TCR clonotype is stimulated only by mutant sequences and is not found in the sample stimulated by the corresponding wild-type sequences, its size is calculated by taking the smallest size of the TCR clonotype stimulated by the wild-type sequences;
(b4) calculating a ratio size of each TCR clonotype from group which is stimulated by mutant sequences compared to the corresponding wild-type sequences; and
(b5) ranking the clonotypes based on their IFNG expression and T cell activation score at step (b2), and their ratio size at step (b4) to identify the TCR candidate for shared neoantigen;

(H) evaluating antigenic specificity of the TCR candidate for shared neoantigen through T cell activation bioassay using Nuclear Factor of Activated T cells (NFAT) system and using PBMCs or jurkat (JKT) del beta/CD8 to identify a shared neoantigen-reactive TCR, comprising the following steps;
(c1) co-culturing a) a reporter T cell comprising a TCR candidate for shared neoantigen expression cassette, and b) an antigen presenting cell (APC) that expresses the shared neoantigen sequence and a human leukocyte antigen (HLA) sequence from the subject with cancer, in which the APC is a K562 cell which expresses a CD80 molecule;
wherein the reporter T cell is a jurkat del beta cell; and
wherein the TCR candidate for shared neoantigen expression cassette comprises a TCR candidate sequence reconstructed from TCR α and β chain sequences;
(c2) identifying a positive reporter signal in the reporter T cell to identify the neoantigen-reactive TCR; wherein the shared neoantigen-reactive TCR comprises a sequence selected from the group consisting of SEQ ID NOs:135 to 142.

13. The shared neoantigen-reactive TCR of claim 12, wherein the shared neoantigen-reactive TCR binds to a shared neoantigen/HLA complex;
wherein the shared neoantigen comprises TP53_p.R273H, and TP53_p.V157F;
TP53_p.R273H comprises a sequence selected from the group consisting of SEQ ID NOs:9, 160, 162, 164, and 166;
TP53_p.V157F comprises a sequence selected from the group consisting of SEQ ID NOs:24, 168, 170, 172, and 174;
wherein the HLA is selected from the group consisting of HLA-A1101, HLA-A0206, HLA-B5401, HLA-C0102, HLA-B0705, HLA-C1203, HLA-B1532, and HLA-C0702.

14. The shared neoantigen-reactive TCR of claim 13, wherein the shared neoantigen-reactive TCR binds to the shared neoantigen/HLA complex;
in which the shared neoantigen is TP53_p.R273H; and
in which the HLA is selected from the group consisting of HLA-A1101, and HLA-C0102.

15. The shared neoantigen-reactive TCR of claim 13, wherein the shared neoantigen-reactive TCR binds to the shared neoantigen/HLA complex;
in which the shared neoantigen is TP53_p.V157F; and
in which the HLA is HLA-A1101.

16. The shared neoantigen-reactive TCR of claim 12, wherein at step (c1) the reporter T cell and the APC are co-cultured in a ratio of 2:1 or 5:1 or 0.5:1 with 5% $CO_2$ at 37° C. for 6 hours or 24 hours.

\* \* \* \* \*